Oct. 22, 1963   C. O. HUFFMAN ETAL   3,107,834
GLASS CUTTING APPARATUS
Filed Jan. 19, 1959   16 Sheets-Sheet 1

INVENTORS
CHARLES O. HUFFMAN
WILLIAM F. GALEY and
BY GEORGE W. MISSON

Oscar L. Spencer
ATTORNEY

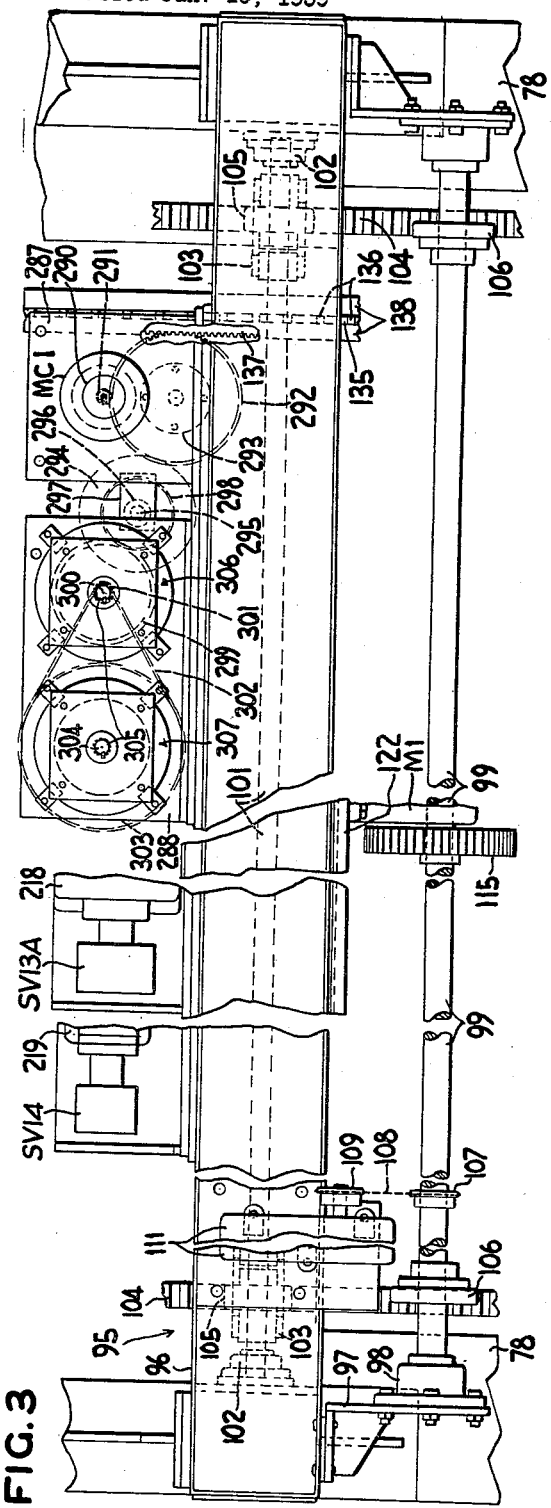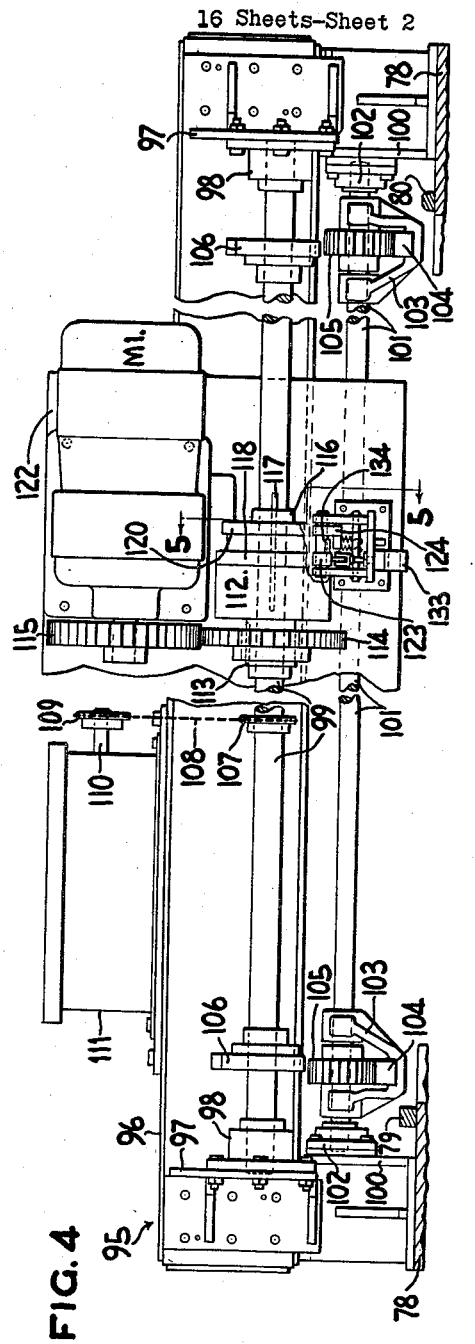

Oct. 22, 1963
C. O. HUFFMAN ETAL
3,107,834
GLASS CUTTING APPARATUS
Filed Jan. 19, 1959
16 Sheets-Sheet 3
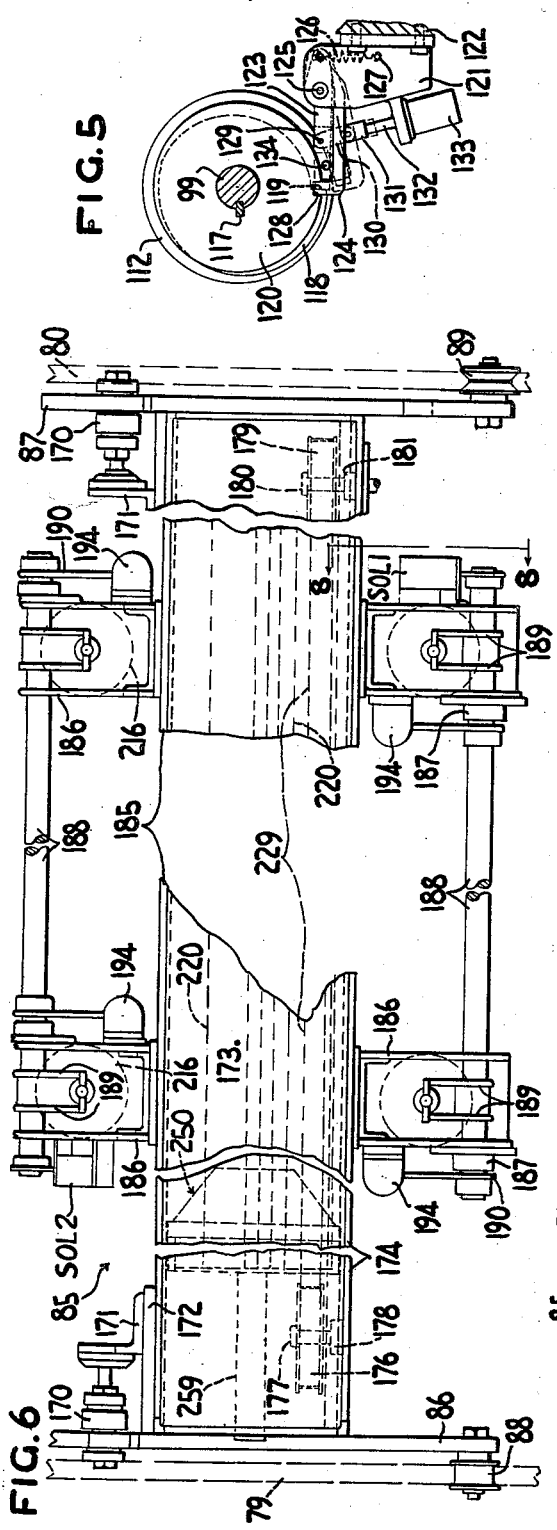
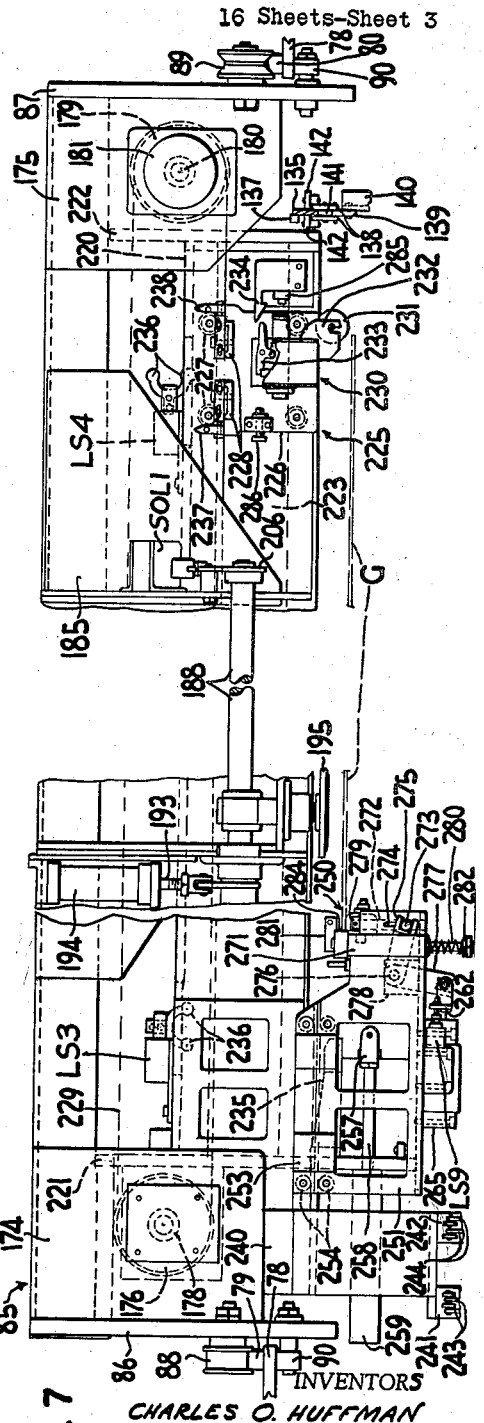
INVENTORS
CHARLES O. HUFFMAN
WILLIAM F. GALEY and
BY GEORGE W. MISSON
Oscar Spencer
ATTORNEY Oct. 22, 1963

C. O. HUFFMAN ET AL 3,107,834

GLASS CUTTING APPARATUS

Filed Jan. 19, 1959

INVENTORS
CHARLES O. HUFFMAN,
WILLIAM F. GALEY and
GEORGE W. MISSON

BY

Oscar L. Spencer
ATTORNEY

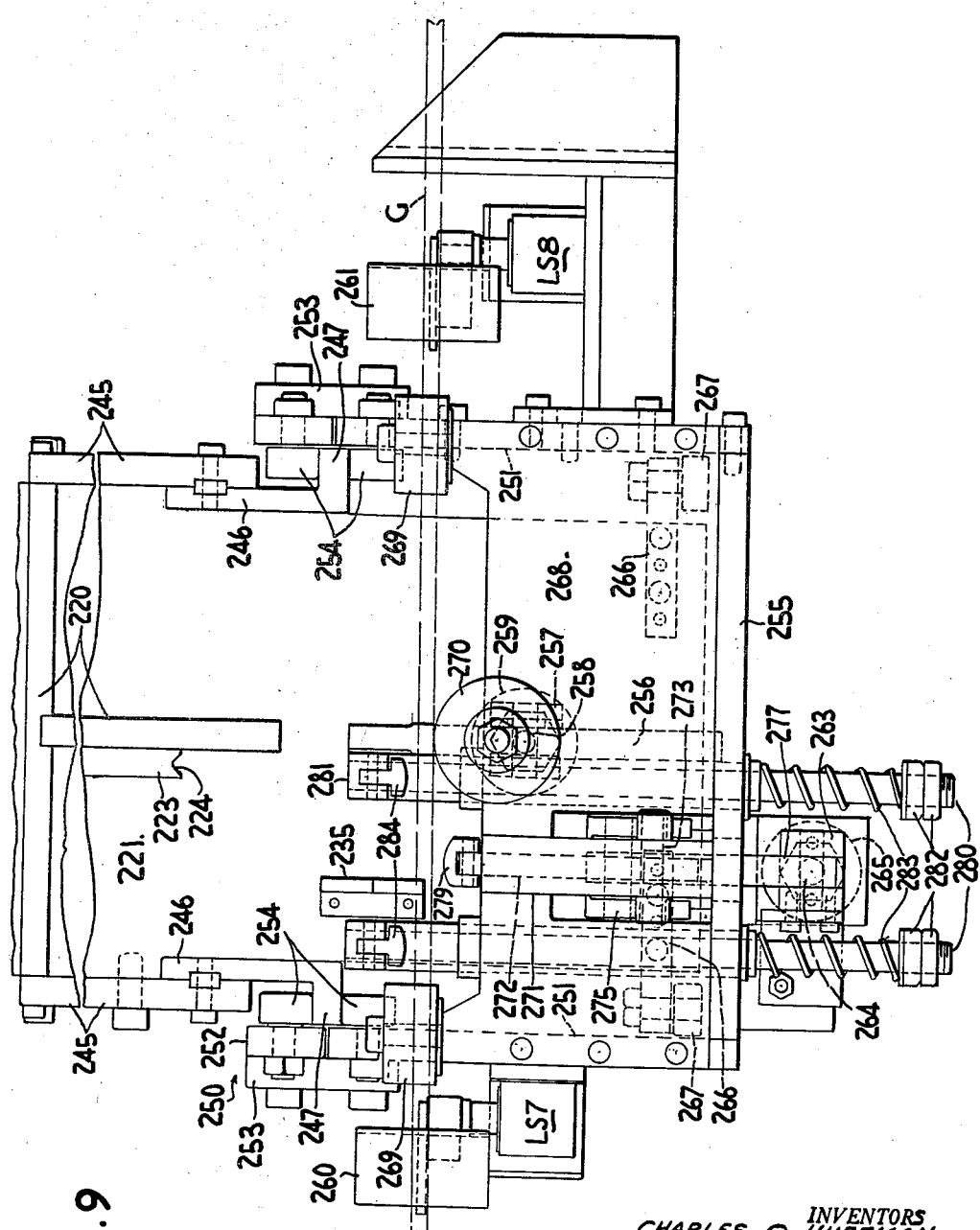

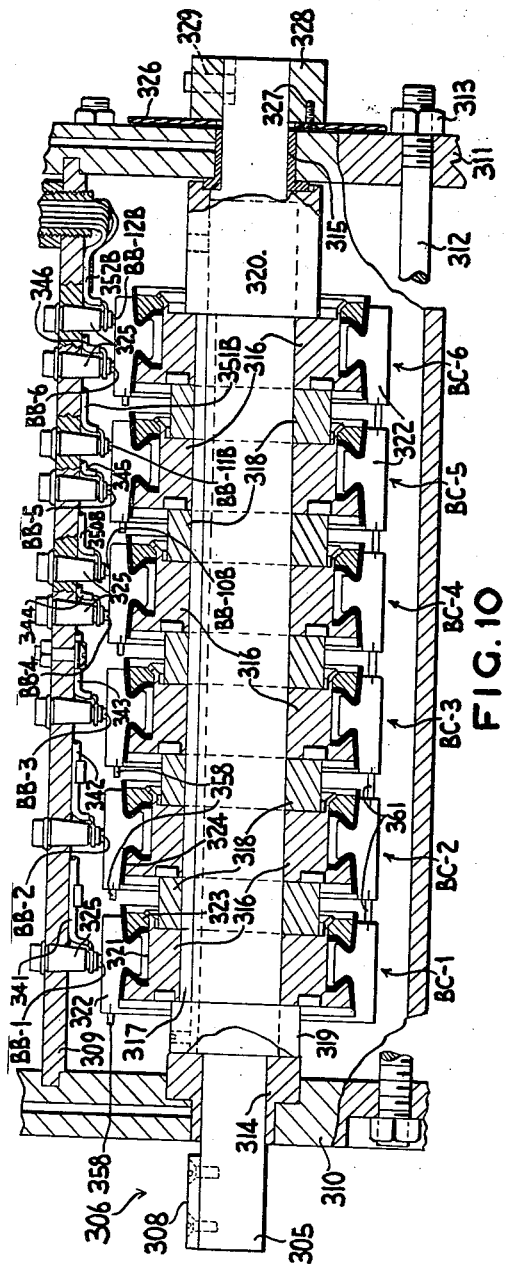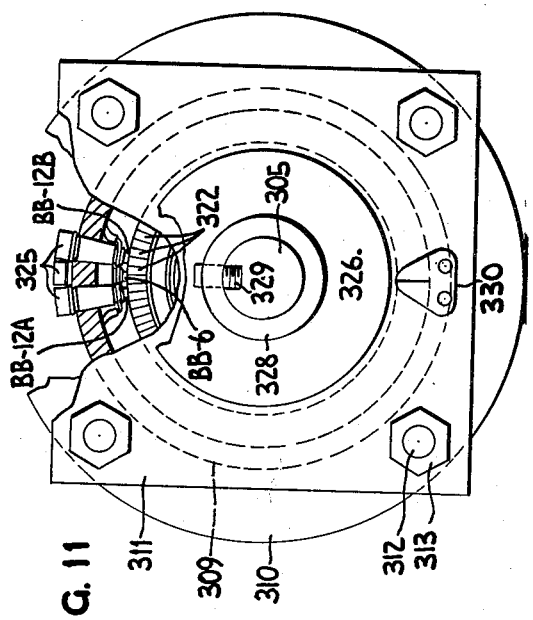

Oct. 22, 1963 — C. O. HUFFMAN ETAL — 3,107,834
GLASS CUTTING APPARATUS
Filed Jan. 19, 1959 — 16 Sheets-Sheet 10

INVENTORS
CHARLES O. HUFFMAN
WILLIAM F. GALEY and
BY GEORGE W. MISSON

ATTORNEY

Oct. 22, 1963  C. O. HUFFMAN ETAL  3,107,834
GLASS CUTTING APPARATUS
Filed Jan. 19, 1959  16 Sheets—Sheet 11

BINARY ADDER CIRCUIT TO CONVERT DECIMAL DIGITAL NUMBER TO A BINARY DIGITAL NUMBER THAT IS INDICATED BY COILS CR51 TO CR57

INVENTORS
CHARLES O. HUFFMAN
WILLIAM F. GALEY and
BY GEORGE W. MISSON

Oscar H. Spencer
ATTORNEY

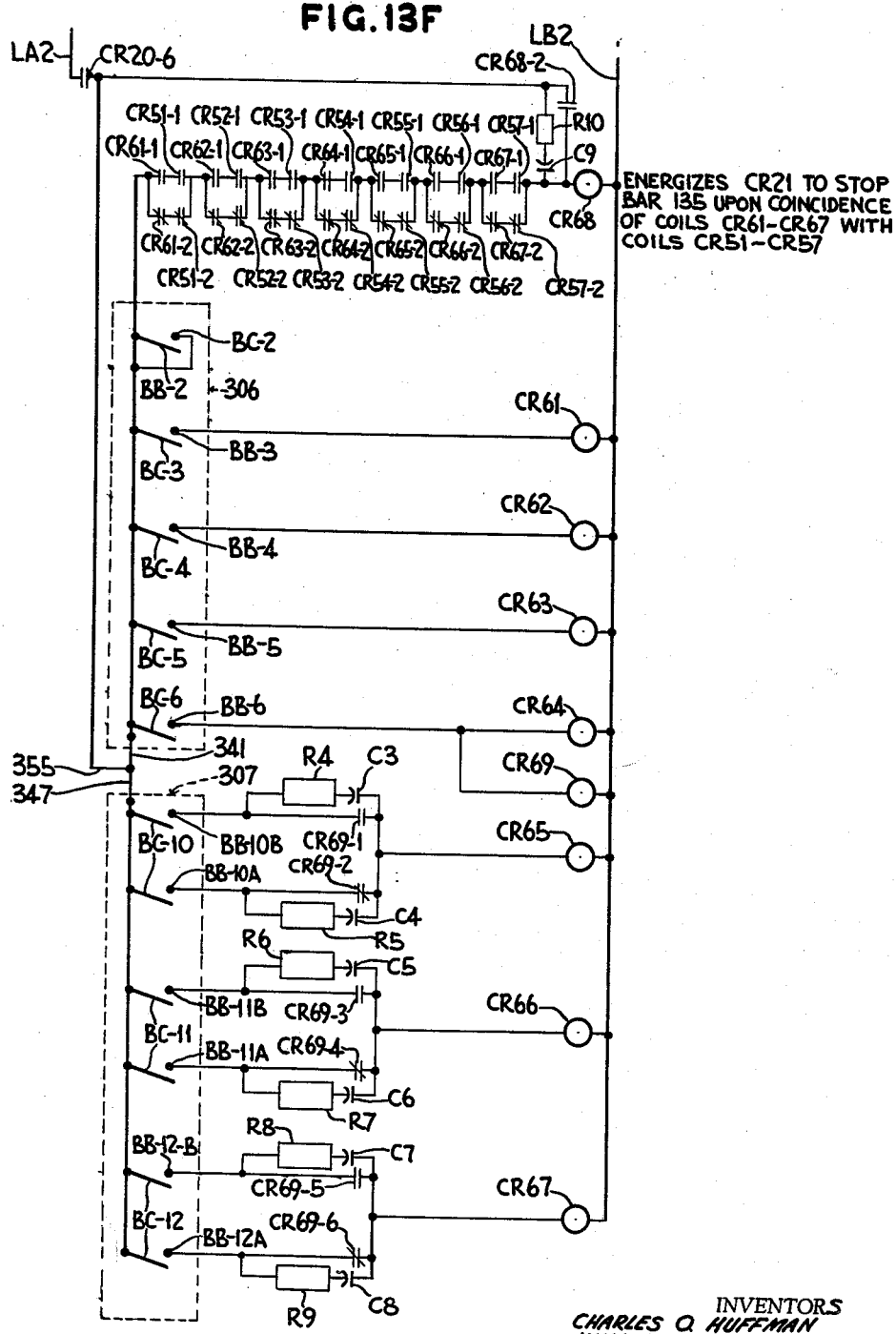

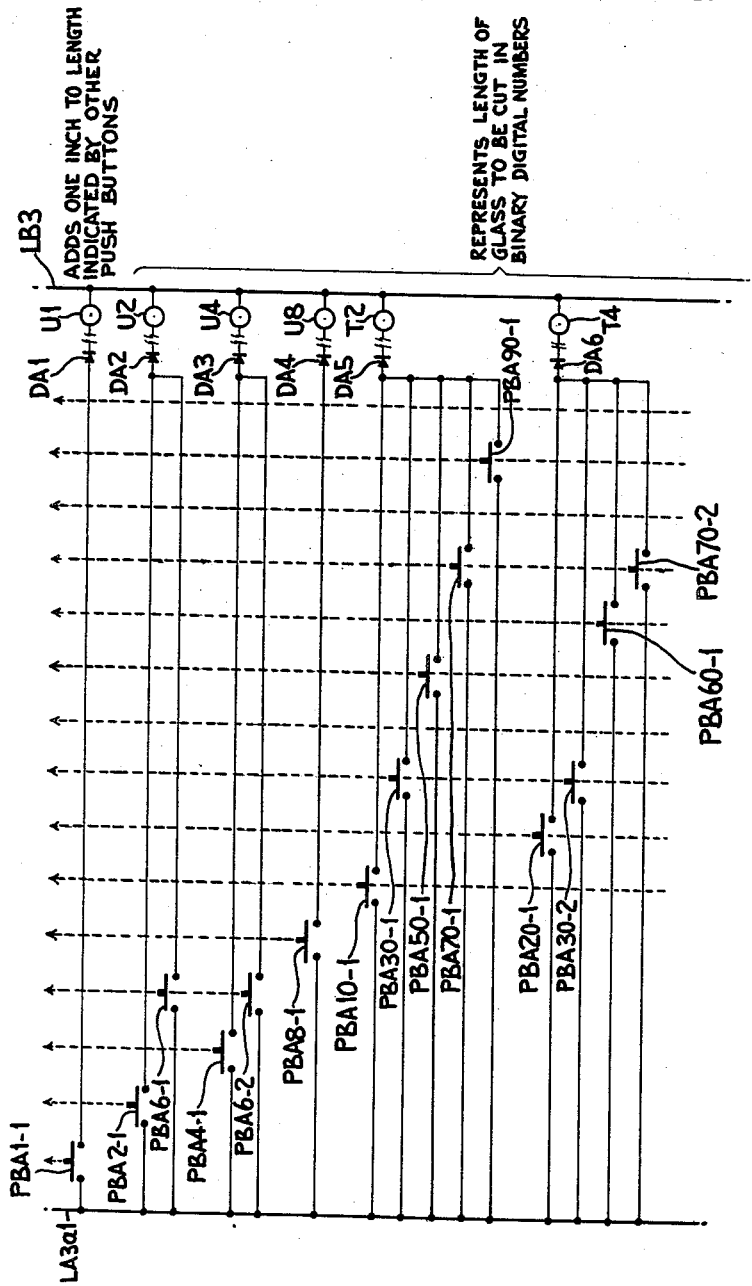

Oct. 22, 1963   C. O. HUFFMAN ETAL   3,107,834
GLASS CUTTING APPARATUS
Filed Jan. 19, 1959   16 Sheets-Sheet 14

INVENTORS
CHARLES O. HUFFMAN
WILLIAM F. GALEY and
BY GEORGE W. MISSON

Oscar L Spencer
ATTORNEY

Oct. 22, 1963    C. O. HUFFMAN ETAL    3,107,834
GLASS CUTTING APPARATUS
Filed Jan. 19, 1959    16 Sheets—Sheet 15

INVENTORS
CHARLES O. HUFFMAN
BY WILLIAM F. GALEY and
GEORGE W. MISSON

Oscar L. Spencer
ATTORNEY

Oct. 22, 1963   C. O. HUFFMAN ETAL   3,107,834
GLASS CUTTING APPARATUS
Filed Jan. 19, 1959   16 Sheets-Sheet 16

FIG. 17
LEGEND

| ILLUSTRATIVE REFERENCE CHARACTER | SYMBOL | TYPE OF UNITS |
|---|---|---|
| CR1, A1, T1, $^A$N, HUN | —◯— | COIL OF RELAY |
| TR1 | —◯—⌁⊡— | TIMER RELAY |
| MCR1 | —◯— | MOTOR STARTER COILS |
| CR1-1 | —⊢⊢— | NORMALLY OPEN CONTACT OF RELAY |
| TR1-1 | —⊢⊢— | NORMALLY OPEN CONTACT OF TIMER RELAY |
| CR1-1 | —⊬— | NORMALLY CLOSED CONTACT OF RELAY |
| TR1-1 | —⊼— | NORMALLY CLOSED CONTACT OF TIMER RELAY, TIME OPENING UPON ENERGIZATION OF COIL OF TIMER RELAY |
| LS1 | —⟍•— | NORMALLY OPEN, TRIPPED CLOSED, LIMIT SWITCH |
| PB1 | —•⎯•— | NORMALLY OPEN PUSH-BUTTON SWITCH |
| SV1 | —⋀— | SOLENOID OF SOLENOID OPERATED VALVE |
| R1 | —▭— | RESISTOR |
| R1 | —▭— | VARIABLE RESISTOR |
| C1 | —⇥⊢— | CAPACITOR |
| SW1 | —⟍•— | SELECTOR SWITCH |
| SW1-1 | —•⟍•— | CONTACT OF SELECTOR SWITCH |
| DA1 | —▶⊢— | DIODE |
| CS1 | —⊣⊢— | CAM OPERATED SWITCH |
| SS1 | ⟲ | STEPPING SWITCH |
| MC1 | —⊚— | ELECTRIC CLUTCH COIL |
| VCSW | —•⊤•— | VACUUM CONTROLLED SWITCH |

INVENTORS
CHARLES O. HUFFMAN
WILLIAM F. GALEY and
BY GEORGE W. MISSON

*Oscar L. Spencer*
ATTORNEY

United States Patent Office 3,107,834
Patented Oct. 22, 1963

3,107,834
GLASS CUTTING APPARATUS
Charles O. Huffman, Ingram, William F. Galey, Saxonburg, and George W. Misson, Fox Chapel, Pa., assignors to Pittsburgh Plate Glass Company, Allegheny County, Pa., a corporation of Pennsylvania
Filed Jan. 19, 1959, Ser. No. 787,510
17 Claims. (Cl. 225—96.5)

This invention relates to an apparatus for cutting transversely a moving glass sheet or a moving continuous ribbon of glass and especially relates to an apparatus for automatically cutting the glass transversely in accordance with a program of cutting.

The apparatus has a belt conveyor for supporting and transporting a glass sheet from a feeding conveyor to a receiving conveyor. A carriage supporting a cutter assembly above the glass sheet or ribbon is mounted on a supporting structure. The carriage also supports vacuum cups that are lowered onto the moving glass sheet or ribbon so that the latter moves the carriage in the direction of movement of the glass. During this movement a motor drives the cutter assembly in scoring position across the glass sheet or ribbon to provide a transverse score line on the glass.

A bridge is mounted on the supporting structure above the belt conveyor and upstream of the carriage. The bridge supports a drive means that with a rapid acceleration moves the carriage from its home position in the direction of travel of the glass prior to the lowering of the vacuum cups. The bridge also supports hydraulic means connected to the carriage to provide a force on the carriage in the direction of travel of the glass so as to relieve part of the load of the vacuum cups that carry the carriage with the glass.

A pair of transversely spaced racks is preferably connected to the carriage and the racks engage gears mounted on a shaft extending transversely and supported by the bridge. This construction ensures that the two ends of the carriage move in the direction of the glass at the same speed, thereby maintaining the direction of travel of the cutter assembly on the carriage normal to the direction of movement of the glass.

The apparatus further includes an elongated bar on which is supported an arm that is moved by the leading edge of the glass downstream of the carriage in its home position. The movement of the arm operates a limit switch, movable with the bar, to initiate the movement of the carriage, the lowering of the vacuum cups and the movement of the cutter assembly across the carriage. The operation of the limit switch also initiates the operation of one or both of two types of snapper assemblies.

One of the snapper assemblies has a snapping head that is raised into abutment with the glass sheet after the scoring operation to provide a force directly below the score line at the margin of the glass. This snapper assembly includes moment devices above the glass and on each side of the score line to resist upward movement of the glass sheet. The other snapper device has means for raising the roll of the belt conveyor, that is at the downstream end of the top run of the belt, when the score line on the glass is directly above the roll.

To cut different lengths of glass sheets from a large glass sheet or a ribbon of glass, the bar having the arm and limit switch is driven by a power means that also drives a pair of binary drums. The apparatus includes electrical devices to control automatically the movement of the bar to different positions for the arm on it in accordance with a program of lengths of glass to be cut. The binary drums are constructed and are connected in the electrical circuits to indicate when the bar has been driven to the correct position for the arm to be hit at the proper moment by the glass to initiate a cycle of operations for cutting.

The apparatus also has means to lower the downstream portion of the belt conveyor by lowering the roll that is raised to provide a snapping action on the glass. The lowering is initiated if the trailing edge of a glass sheet is closer than a predetermined distance from the cutting line when the switch on the bar is operated. The lowering of the roll drops the last sheet cut from a larger glass sheet to a cullet hopper. This prevents the transfer of the small last glass sheet, which is essentially a rear edge trim sheet, by the receiving conveyor to subsequent cutting stations where larger glass sheets are cut into smaller sheets by cutting in the other direction, e.g., as described in our copending application Serial No. 769,223, filed October 23, 1958, and entitled "Glass Cutting Apparatus."

The apparatus of the present invention is illustrated by the following description of a preferred embodiment and by the drawings in which similar parts are designated by the same numerals and in which:

FIG. 3 is a plan view of the bridge of the apparatus;

FIG. 4 is an elevation of the bridge;

FIG. 5 is a fragmentary cross section of the bridge taken along line 5—5 of FIG. 4 to show some details of the construction of the one-revolution clutch and the latch for it;

FIG. 6 is a plan view of the carriage of the apparatus;

FIG. 7 is an elevation of the carriage;

FIG. 9 is an elevation of the glass snapper assembly that provides for a snapping force on a scored glass sheet at one of its margins;

FIG. 10 is a longitudinal cross section of one of the two binary drum switches used in the apparatus;

FIG. 11 is a plan view, partially broken away, of one of the binary drum switches;

FIG. 12 is a schematic wiring diagram for a motor that drives the one-revolution clutch;

FIGS. 13A, 13B, 13C, 13D, 13E and 13F are schematic diagrams of the electrical controller system of the apparatus;

FIGS. 14A and 14B are schematic drawings of one of the banks of programs shown fragmentarily in FIG. 13D;

FIG. 17 is a legend for the wiring diagrams of FIGS. 13 and 14.

Figure 1:
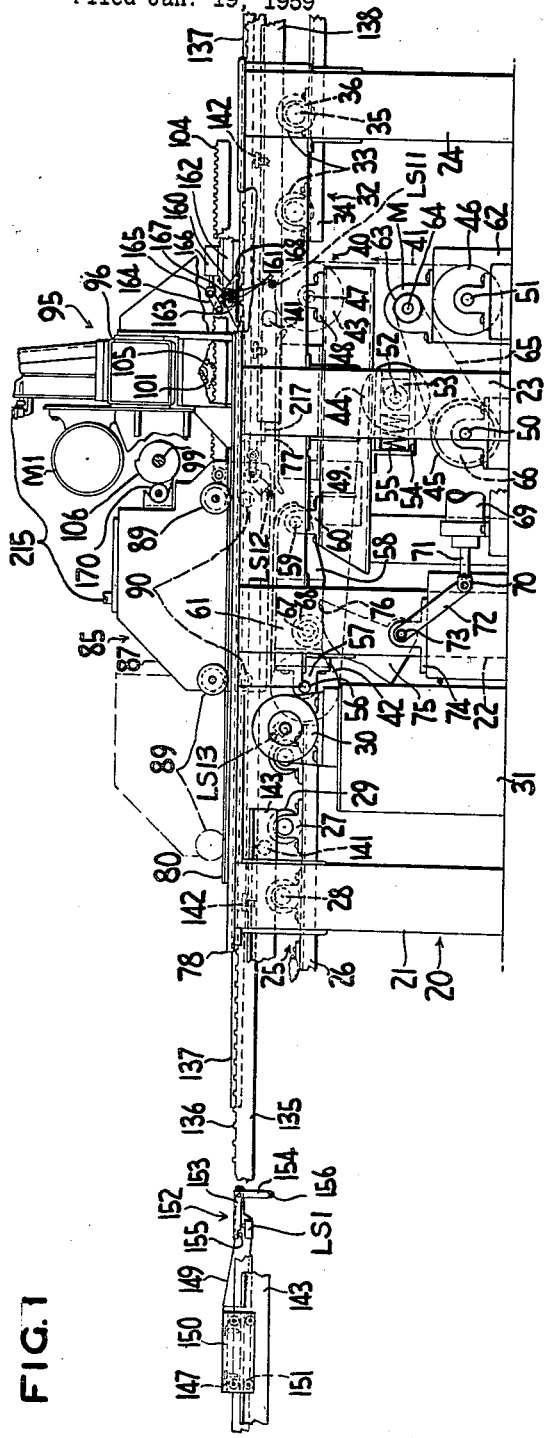
FIG. 1 is an elevation of the apparatus.

The apparatus of the preferred embodiment has a supporting structure generally indicated at 20 that includes pairs of transversely spaced upright supports 21, 22, 23 and 24.

A receiving conveyor generally indicated at 25 has a pair of horizontal, transversely spaced angle irons 26 which support pairs of bearings 27 in which are journalled shafts 28 supporting rolls 29. The angle irons 26 are supported near one end by upright supports 21. The rolls 29 of conveyor 25 are driven by gears (not shown) mounted on shafts 28. A drive arrangement is provided to operate separately sections of conveyor 25 so that the rolls 29 in each section may be rotated alternatively at a fast speed and at a slow speed. The rolls 29 in the section adjacent upright support 21 are driven by a motor 30 through a gear arrangement (not shown). The motor 30 is mounted on a stand 31 of the supporting structure 20.

A feeding conveyor generally indicated at 32 has a number of rolls 33. A pair of horizontal, transversely spaced angle irons 34 is supported near one end by upright supports 24. The shafts 35 on which rolls 32 are mounted are journaled in bearings 36, which are driven by a motor means (not shown).

A belt conveyor generally indicated at 40 is positioned between receiving conveyor 25 and feeding conveyor 32. The belt conveyor 40 has a pair of belts 41. Each of belts 41 passes over an idler pulley 42 and an idler pulley 43. Between pulleys 42 and 43 each belt 41 has a top horizontal run. Each belt 41 passes around an idler pulley 44, a drive pulley 45 and an idler pulley 46.

The shafts 47 of idler pulleys 43 are journaled in bearings 48 mounted on horizontal channel irons 49 of supporting structure 20. The channel irons 49 are supported by upright supports 23. The drive pulleys 45 and the idler pulleys 46 and their shafts 50 and 51, respectively, are similarly journaled in bearings mounted on supporting structure 20. The shafts 52 of idler pulleys 44 are journaled in bearing blocks 53 mounted in slides 54 supported by channel irons 49 and upright supports 23. The bearing blocks 53 are biased to the right (as viewed in FIG. 1) by springs 55. The shafts 56 of idler pulleys 42 are journaled in bearings 57 mounted on the free end of two pairs of plates 58 supported at their other end by a shaft 59, which is journaled in bearings 60 mounted on channel irons 49. A pair of plates 61 is mounted on plates 58. The right-hand end (as viewed in FIG. 1) of each of plates 61 curves downwardly. The plates 61 support belts 41 for a part of their top run. The one end of plates 61 is downwardly curved so that, when plates 58 are moved downwardly about shaft 59, as described later, the plates 61 will not raise belts 41 at any portion of their top run.

A motor M is mounted on a stand 62 of supporting structure 20. A sprocket 63 on a shaft 64 of motor M drives a chain 65 that engages a sprocket 66 keyed on a shaft 50 to drive pulleys 45.

A shaft 67 is supported by plates 58. Cam followers 68 are rotatably mounted on shaft 67. A hydraulic cylinder 69 mounted on supporting structure 20 has a clevis 70 mounted on piston rod 71 of cylinder 69. A link 72 is pivotally connected at one end to clevis 70. At the other end link 72 is keyed on a shaft 73, which is rotatably supported by bearings 74. Cam plates 75 are also keyed on shaft 73. The cam surfaces of cam plates 75 abut cam followers 68. With piston rod 71 at its intermediate home position, cam plates 75 abut followers 68 so that the top surfaces of plates 61, except, of course, for the down-turned end portion, are in a horizontal plane.

The hydraulic cylinder 69 is connected to an oil pressure source through a valve and piping arrangement that includes two four-way, solenoid, spring-biased valves (not shown). The energization of solenoid SV1 (FIG. 13B) of one of these valves operates hydraulic cylinder 69 to retract piston rod 71. This moves cam plates 75 about the axis of shaft 73 in a counterclockwise direction (as viewed in FIG. 1) to raise followers 68 and thus to move plates 58 and 61 about the axis of shaft 59. This raises pulleys 42. It is done when the score line on the glass sheet is directly above the axis of rotation of pulleys 42 to run the cut along the score line. Thus the energization of solenoid SV1 results in a snapping action on the scored glass sheet through the raising of pulleys 42. Upon the deenergization of solenoid SV1, the spool of the valve associated with it by the action of its spring returns to its other position. This changes the fluid flow to and from cylinder 69 and rod 71 extends to its home position. The extending movement of rod 71 pivots cam plates 75 about the axis of shaft 73 in the clockwise direction. This lowers plates 61 to their normal position.

The energization of solenoid SV2 of the other valve extends piston rod 71 from its home position to pivot cam plates 75 about the axis of shaft 73 in a clockwise direction (as viewed in FIG. 1) from their home position. This pivots plates 58 about the axis of shaft 59 in a counterclockwise direction (as viewed in FIG. 1) to lower plates 61. The lowering of plates 61 lowers pulleys 42 and the downstream portion of the top run of belts 41. Any glass sheet on the downstream portion of belts 41 is conveyed off belts 41 to a cullet hopper (not shown) between and below belt conveyor 40 and receiving conveyor 25. Upon the deenergization of solenoid SV2, the spool of the valve associated with it is moved by the valve's spring to the other position. This reverses the feed of oil to cylinder 69 to move rod 71 to its intermediate or home position, thereby pivoting plates 75 to raise followers 68 and to pivot plates 58. This returns plates 61 to their normal position in which all of the flat portion of their top surfaces is in the horizontal plane.

Each of cam plates 75 has a shoulder 76 at the top end of its cam surface to prevent movement of plate 75 substantially beyond the point desired for snapping action; otherwise, further movement would place cam plate 75 entirely beyond follower 68 and would cause plates 58 to drop because followers 68 would be behind plates 75 instead of abutting the cam front surface.

The operation of hydraulic cylinder 69 to raise pulleys 42 for the snapping action through the energization of solenoid SV1 occurs either during each cycle of an operation of cutting or during those cycles of operation of cutting other than a front edge trim or a rear edge trim. The rear edge trim involves the last cycle of cutting operation to obtain two glass sheets, in which the trailing sheet has dimensions such that it should be dropped to the cullet hopper and not be conveyed on receiving conveyor 25. The circuit arrangements to energize solenoid SV1 and to provide a choice between these alternatives for the raising of pulleys 42 from their intermediate or home position are described later as part of the description of the electrical controller for the entire apparatus. Also described later are the circuits to energize at the proper time solenoid SV2 to lower pulleys 42 from their home position in order to drop the rear edge trim glass sheet to the cullet hopper.

During the raising and lowering of pulleys 42 from their home position, as described above, the distance between the bottom of pulleys 42 and the top of pulleys 44 changes. To compensate for this change and to take up the slack of belts 41 when this distance decreases, the pulleys 44 are mounted, as described above, in bearing blocks 53, which are movable in slides 54 and blocks 53 are urged to the right (as viewed in FIG. 1) by springs 55.

The top run of belts 41 is supported between plates 61 and pulleys 43 by a pair of plates 77 of supporting structure 20.

The supporting structure 20 has a pair of plates 78 mounted on the pairs of upright supports 21, 22, 23 and 24. The plates 78 are thus transversely spaced and extend longitudinally. A support rail 79 and a guide rail 80 are mounted on plates 78.

A carriage generally indicated at 85 has end plates 86 and 87. The end plate 86 supports a pair of double-flanged wheels 88 that ride on rail 79 and the end plate supports a pair of V-shaped wheels 89 that ride on rail 80. The top surface of rail 79 is flat and the top portion of rail 80 in cross section has a truncated inverted V-shape. This construction for rails 79 and 80 and wheels 88 and 89 compensates for expansion and contraction of the apparatus and prevents movement of carriage 85 transversely of the direction of travel on rails 79 and 80. A pair of wheels 90 is rotatably mounted on each of plates 86 and 87. The wheels 90 abut the undersurface of plates 78 and cooperate with wheels 88 and 89 to prevent vertical movement of carriage 85.

As seen in FIGS. 3 and 4, the apparatus has a fixed bridge generally indicated at 95, which is mounted on plates 78 to the right of carriage 85 (as viewed in FIG. 1). The bridge 95 includes a horizontal rectangular tubular member 96 extending across and above belt conveyor 40. A pair of brackets 97 is supported by tubular member 96 near the ends, and brackets 97 support bearings 98 in which are journaled a shaft 99. The bridge 95 also includes a pair of support brackets 100 that support tubular member 96 on plates 78. A shaft 101 is journaled in bearings 102 mounted on brackets 100. A pair of saddle members 103 journaled on shaft 101 slidably support a pair of racks 104, each connected at one end to one of plates 86 and 87 of carriage 85. The racks 104 mesh with gears 105 which are rotatably mounted on shaft 101. With this arrangement plates 86 and 87 must move at the same speed during the movement of carriage 85 between the home position shown in full lines in FIG. 1 and the maximum forward position shown in phantom in FIG. 1.

A pair of cam discs 106 is keyed on shaft 99. The initial rotation of discs 106 serves to accelerate movement of carriage 85 away from its home position. A sprocket 107 is also keyed on shaft 99. A chain 108 engages sprocket 107 and a sprocket 109 keyed on a shaft 110 of a cam switch 111. A single-revolution clutch 112 has a driving sleeve 113 on which is keyed a gear 114 meshing with a gear 115 driven by an electric motor M1. The driven hub 116 is connected by a key 117 to shaft 99 that extends through clutch 112. A trip cam 118 of clutch 112 has a shoulder 119. The clutch 112 has a spring (not shown) that biases trip cam 118 in a counterclockwise direction (as viewed in FIG. 5). Also keyed on shaft 99 is a disc 120 adjacent trip cam 118.

A bracket 121 is mounted on a plate 122 that also supports motor M1. The plate 122 is mounted on tubular member 96. A bar 123 and a latch 124 are pivotally mounted on bracket 121 by a shaft 125 intermediate their ends. Springs 126 are connected at one end to a rollpin 127 supported by bracket 121 and to one end of each of bar 123 and latch 124. One spring 126 biases the other end of bar 123 upwardly so that in its normal position it abuts shoulder 119 of trip cam 118. The other spring 126 biases latch 124 upwardly into a peripheral notch 128 in disc 120. The bar 123 is pivotally connected between shaft 125 and its end abutting shoulder 119 by a pin 129 to a link 130. The pin 129 is in a slot in link 130 which extends upwardly through a slot in bar 123. The link 130 is connected pivotally to a clevis 131 on the end of a piston rod 132 of an air cylinder 133 mounted on bracket 121.

The motor M1 is operated continuously, thereby rotating continuously the driving sleeve 113, but with bar 123 in the position indicated in FIG. 5, the trip cam 118 is prevented from being moved by a spring (not shown) to the position in which clutch 112 drives hub 116. The operation of air cylinder 133 is controlled by a four-way, spring-biased valve (not shown) having a solevoid SV3. The energization of solenoid SV3 at the proper point of the sequence of operation of cutting, as described later, operates the valve to flow air to and from cylinder 133 to retract rod 132. This lowers the bar 123 at its end that abuts shoulder 119. The trip cam 118 is then free to be moved by the spring (not shown) in a counterclockwise direction (as viewed in FIG. 5) to operate clutch 112 so as to rotate hub 116, shaft 99 and disc 120 counterclockwise (as viewed in FIG. 5). This is possible because a pin 134 extending horizontally from bar 123 and just above latch 124 forces latch 124 downwardly. This occurs simultaneously. The downward movement of pin 134 moves latch 124 out of notch 127. When air cylinder 133 is operated in the reverse direction to extend rod 132 shortly thereafter by the deenergization of solenoid SV3, bar 123 is raised by clinder 133 until bar 123 abuts trip cam 118. As trip cam 118 continues to rotate, bar 123 is continually raised by cylinder 133 to maintain abutment with the cam surface of cam 118 until it is in the position shown in FIG. 5 when it is abutted by shoulder 119 of trip cam 118. With the raising of bar 123, latch 124 is raised by spring 126 and it drops into notch 128 at the same time that shoulder 119 of trip cam 118 abuts bar 123. This disengages the single-revolution clutch 112 from drive shaft 99. The spring 126 connected to clutch stop arm or bar 123 lifts bar 123 in case cylinder 133 fails to operate to return bar 123 to its raised position.

The apparatus has an elongated bar 135 that extends longitudinally of the apparatus. The bar 135 has equally spaced knobs 136 on its top surface. A rack 137 is mounted on bar 135 with the teeth extending horizontally. The length of the rack 137 is such that it can be used to move the left end of bar 135 between desired positions.

A pair of horizontal bars 138 is connected to a number of plates 139 mounted on upright supports 140 of supporting structure 20 (FIG. 7). The bars 138 extend to the right (as viewed in FIG. 1) from a position between upright supports 23. The horizontal bars 138 support between them longitudinally spaced rollers 141 which support bar 135. Longitudinally spaced sets of pairs of rollers 142 are mounted on bars 138 with their axes in a vertical position. The rollers 142 abut the side faces of bar 135. The rollers 141 and 142 serve to guide bar 135.

Figure 2:
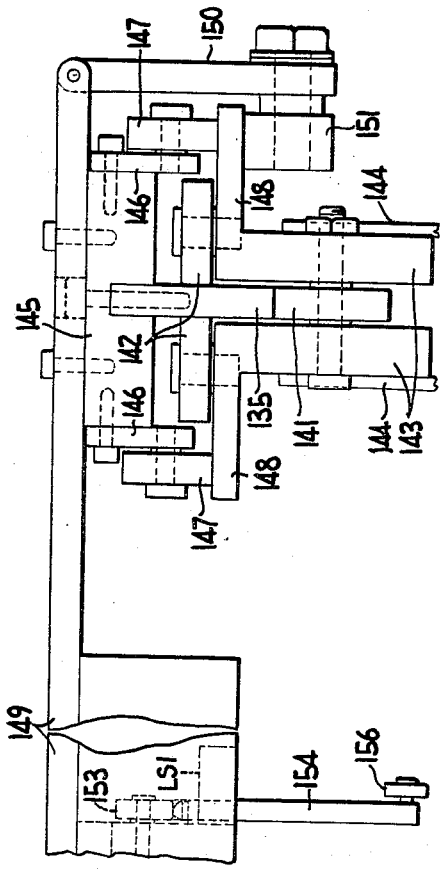
FIG. 2 is a fragmentary end elevation of the apparatus showing the measuring bar, the arm supported by the arm and tripped by the glass, the limit switch moved by the bar, and the manner of supporting the arm and switch from the end of the measuring bar.

The other end portion of bar 135 is similarly supported by longitudinally spaced sets of pairs of rollers 142 and by rollers 141, which are rotatably mounted on a transversely spaced pair of angle irons 143 supported by longitudinally spaced plates 144 of supporting structure 20 (FIGS. 1 and 2). A plate 145 (FIG. 2) is mounted on bar 135 at the left-hand end, as viewed in FIG. 1. A pair of plates 146 is mounted on plate 145 and each of plates 146 supports a pair of rollers 147, which ride on flanges 148 of angle irons 143. A side arm 149 is mounted on plate 145. A plate 150, which rotatably supports a pair of rollers 151, is pivotally connected to one end of side arm 149. By this construction the side arm 149 is moved horizontally with bar 135 without vertical movement.

The other end of side arm 149 is above receiving conveyor 25. A limit switch LS1 is mounted on side arm 149 at this end. A limit switch L-shaped tripping assembly generally indicated at 152 is pivotally mounted at this end of side arm 149. The tripping assembly 152 has arms 153 and 154 and the relative weight of these arms is such that, in the normal position for tripping assembly 152, arm 153 abuts stop pin 155 on side arm 149 and arm 154 is vertically disposed. The bottom portion of arm 154 is in the path of a glass sheet on reeciving conveyor 25. With arms 153 and 154 in this position, arm 153 abuts and opens limit switch LS1. When a moving glass sheet hits arm 154, it moves arm 154 to the left and upwardly. This raises arm 153 from switch LS1 which closes. The roller 156 mounted on arm 154 provides rolling engagement with the glass sheet until its trailing edge has completely passed. Then arm 154 drops to the position shown in FIG. 1 and arm 153 opens limit switch LS1.

A pawl 160 is pivotally mounted on an offset end portion of a shaft 161 which is supported by plate 162 of supporting structure 20. The shaft 161 has conntcted on its other end a crank arm 163 which is pivotally connected to a link 164. The link 164 is connected at its other end to the clevis end of a piston rod 165 of an air cylinder 166 mounted on plate 162. A flat spring 167 on plate 162 is abutted by the top of pawl 160 in the pawl's raised position. The retraction of piston rod 165 lowers pawl 160 so that its bottom pair of extensions 168 are between knobs 136 of bar 135. The pawl 160 is lowered to this position just as bar 135 stops its movement from left to right, as viewed in FIG. 1, so that extensions 168 are abutted by knobs 136 immediately to their right, as viewed in FIG. 1. This insures accurate positioning of arm 154 downstream of carriage 85 in its home position.

When the carriage 85 is in its home position, a pair of cam followers 170 on carriage 85 abuts cam discs 106. As seen in FIG. 6, the cam followers 170 are rotatably supported by plates 86 and 87 and by brackets 171, which are mounted on plates 172 connected to one of the flanges of a channel iron 173. The channel iron 173 is part of carriage 85 and at its ends are connected plates 86 and 87.

As seen in FIGS. 6 and 7, the other flange of channel iron 173 supports at its end portions a plate 174 and a plate 175. An idler tape pulley 176 is keyed on a shaft 177 rotatably mounted on plate 174 by a bearing 178. A driven tape pulley 179 is keyed on a shaft 180 rotatably supported by a bearing 178 mounted on plate 175. The shaft 180 is driven by a hydraulic motor 181 mounted on plate 175. The motor 181 is connected to a hydraulic pump (not shown) that provides oil under pressure through a double-solenoid, spring-centered, four-way valve (not shown) having a solenoid SV4A and a solenoid SV4B. The energization of solenoid SV4A moves the spool of the valve from its intermediate position to the position for feeding the oil under pressure to motor 181. This drives tape pulley 179 in a clockwise direction, as viewed in FIG. 7. The energization of solenoid SV4B operates motor 181 in the reverse direction.

The valve and piping arrangement between the hydraulic motor 181 and the double-solenoid valve includes a solenoid valve (not shown) having a solenoid valve SV5 in a piping circuit in parallel with a portion of the main piping that has a restricted cross section. The pipe with the restricted cross section limits the rate of flow of oil from hydraulic motor 181 to the double-solenoid valve so that motor 181 operates at a slow speed. When solenoid SV5 is energized to operate its associated valve for by-passing the restricted portion of the main piping, motor 181 operates at fast forward speed. Similarly, the other main line between the double-solenoid valve and hydraulic motor 181 has a portion with a restricted cross section which is by-passed by a piping arrangement that includes a solenoid valve having a solenoid SV6. When the spool of the valve is in the spring-biased position, oil cannot flow through the by-pass piping arrangement so that fluid flows from motor 181 to the double-solenoid valve at slow speed. When solenoid SV6 is energized, fluid flows from motor 181 at fast speed and motor 181 operates at fast speed in its reverse direction. Also in parallel with the portions of the main piping having the restricted cross sections are other by-pass pipings that include check valves disposed so that fluid can flow from the double solenoid valve to motor 181 without any restriction. The only restriction is in the flow of fluid from motor 181 back to the double solenoid valve, as described above. This combination of piping and valve arrangement is conventional.

Figure 8:
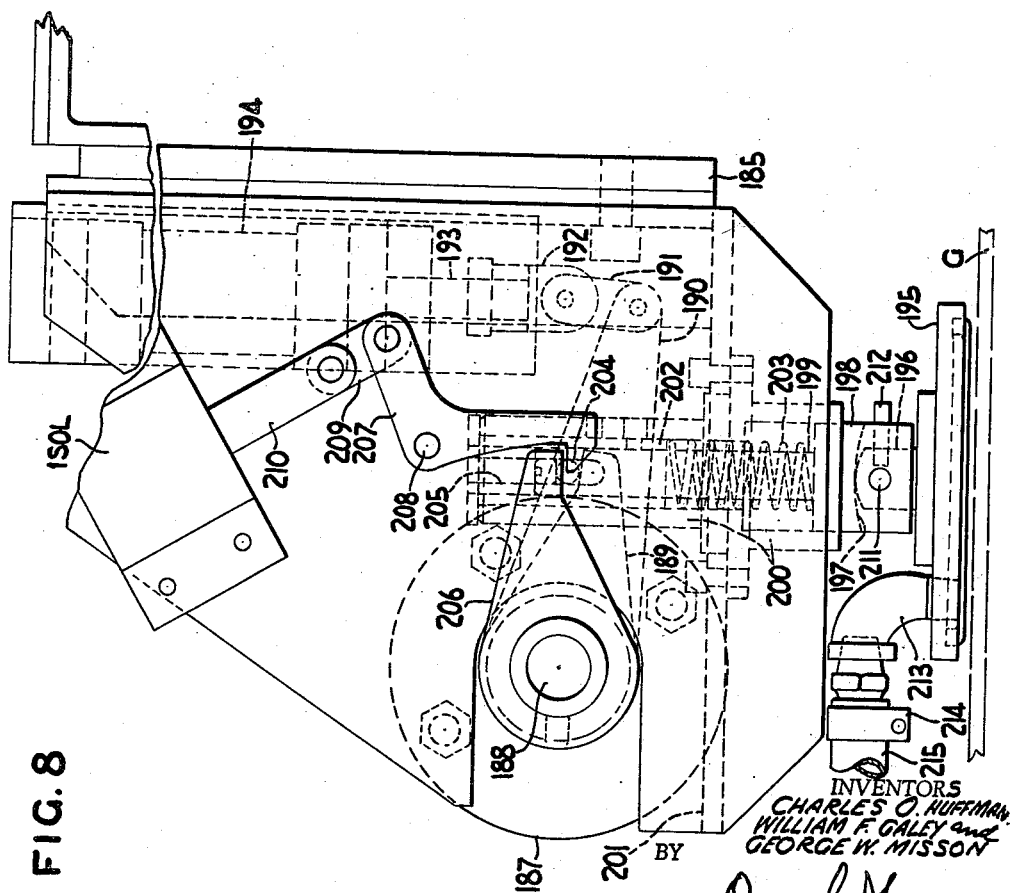
FIG. 8 is a fragmentary cross section of the carriage taken along line 8—8 of FIG. 6.

A pair of plates 185 is mounted on the vertical flanges of channel iron 173 intermediate its ends. On one of plates 185 is a number of support brackets 186 on which are mounted flanged bearings 187. A shaft 188 is journaled in bearings 187. Pairs of crank arms 189 are fixed on shaft 188. Also fixed on shaft 188 are crank arms 190 pivotally connected to their free end, as seen in FIG. 8, to links 191, each of which is pivotally connected at its other end to a clevis 192 mounted on a piston rod 193 of an air cylinder 194 mounted on bracket 186.

A set of front vacuum cups 195 is mounted on carriage 85 by brackets 186 in the following manner. Each of the front vacuum cups 195 has an integral upstanding plate 196 in a slot 197 in the bottom of an enlarged bottom portion 198 of a shaft 199. The shaft 199, including part of enlarged portion 198, is in a housing 200 extending through and supported by a base plate 201 of bracket 186. A sleeve 202 within the top portion of housing 200 surrounds the top portion of shaft 199. Between the bottom of sleeve 202 and the enlarged portion 198 of shaft 199 is a spring 203 surrounding shaft 199 above its enlarged portion 198. A pin 204 through shaft 199 projects through vertical slots 205 in sleeve 202 and housing 200 on opposite sides of shaft 199.

The pairs of crank arms 189 have their free ends below pins 204. The retraction of piston rods 193 by the operation of air cylinders 194 rotates shaft 188 counterclockwise, as viewed in FIG. 8. This raises the free ends of arms 189 to lift pins 204 thereby raising shafts 199 and vacuum cups 195. The air cylinders 194 are connected to a source of air under pressure through a solenoid, spring-biased valve (not shown) on carriage 85. When the solenoid SV7 of the valve is deenergized, the spring moves the spool of the valve so that compressed air is fed to cylinders 194 for the retraction of rods 193 to raise cups 195.

A crank arm 206 fixed on one end of shaft 188 is engaged by a latch 207 pivotally supported at an intermediate point by a pin 208 mounted on one of brackets 186. The latch 207 has an arm that is pivotally connected to one end of a link 209 which is connected at its other end to a movable shaft 210 of a solenoid SOL1. The latch 207 is in the position shown in FIG. 8 when solenoid SOL1 is deenergized. In this position the latch 207 prevents the downward movement of the end of arm 206 and thereby prevents the clockwise rotation (as viewed in FIG. 8) of shaft 188 for the lowering of front vacuum cups 195. To permit lowering of cups 195 onto the glass, latch 207 is moved out of the way by pivoting it about pin 208 through the energization of solenoid SOL1. This permits arm 206 to lower by the rotation of shaft 188 and the lowering of arm 189 so that pin 208 and shaft 199 can move downwardly. Before the removal of latch 207 from under arm 206, vacuum cups 195 are only a short distance, e.g., about 1/16 inch above glass sheet G.

Each of the integral upstanding plates 196 is connected to the associated and enlarged portion 198 of shaft 199 by a pin 211 which is held in position by set screw 212 in plate 196. The mounting of front vacuum cups 195 by pins 211 allows the vacuum cups 195 to properly seat on glass sheet G when cups 195 are lowered through the unlatching movement of latch 207 by the energization of solenoid SOL1. This energization of solenoid SOL1 occurs shortly after the communication of vacuum cups 195 to a vacuum pump through elbows 213 and couplings 214 connecting vacuum cups 195 to flexible pipes 215.

A set of rear vacuum cups 216 is mounted on the other plate 185 through brackets 186. The components for raising and lowering and latching of vacuum cups 216 are the same as those for raising and lowering and latching vacuum cups 195. However, the solenoid used to operate latch 207 for the lowering of rear vacuum cups 216 is designated SOL2 and the valve (not shown) on carriage 85 and that feeds compressed air to air cylinders 194 for the raising of rear vacuum cups 216 has a solenoid SV8 that must be deenergized for this raising action.

The pipes 215 connected through couplings 214 and elbows 213 to front vacuum cups 195 are connected on bridge 95 to the vacuum source through a solenoid, spring-biased valve (not shown) on carriage 85 and having a solenoid SV9. The energization of solenoid SV9 moves the spool of this valve to connect pipe 215 to the vacuum source. Similarly the pipe 215 connected to the rear vacuum cups 216 is connected to the vacuum source through a solenoid, spring-biased valve (not shown) on carriage 85 and having a solenoid SV10 which, when energized, moves the spool of this valve to communicate the pipes 215 connected to rear vacuum cups 216 to the vacuum source.

The pipes 215 connected to front vacuum cups 195 are also connected through a solenoid, spring-biased valve (not shown) on carriage 85 and having a solenoid SV11 to a source of compressed air. When solenoid SV11 is energized the spool of this valve is moved to feed compressed air through pipes 215 into vacuum cups 195. The pipes 215 connected to rear vacuum cups 216 are also connected to the source of compressed air by a piping arrangement that includes a solenoid, spring-biased valve (not shown) on carriage 85 and having a solenoid SV12 which, when energized, moves the spool of this valve to feed the compressed air to pipes 215 connected to rear vacuum cups 216. Of course, the piping arrangements containing the valves having solenoids SV9 and SV11 are both joined to pipes 215 connected to vacuum cups 195 and the piping arrangement including the valves having solenoids SV10 and SV12 are connected to pipes 215 connected to rear vacuum cups 216.

As described later, the electrical controller for the apparatus includes a circuit that maintains solenoid SV8 deenergized to raise rear vacuum cups 216 which are then maintained in the raised position during the use of front vacuum cups 195 to move carriage 85 for the cycle of the cutting operation to provide a rear edge trim. Another circuit deenergizes solenoid SV7 to raise front vacuum cups 195 and maintain them in the maximum raised position during the other cycles of operation of cutting in which rear vacuum cups 216 are used to engage the glass sheet G to move carriage 85.

A pair of hydraulic cylinders 217 is supported between upright supports 23 by plates 78 of supporting structure 20. Their piston rods are connected to plates 86 and 87 of carriage 85. The cylinders 217 are connected to the hydraulic pump (not shown) by a valve and piping arrangement that includes a double-solenoid, spring-centered, four-way valve 218 on bridge 95 (FIG. 3) having a solenoid SV13A and a solenoid SV13B.

The energization of solenoid SV13A moves the spool of valve 218 to the position to operate cylinders 217 for extending their piston rods to provide a force on carriage 85 in the direction of travel of carriage 85 during the cutting operation. This operation of cylinders 217 occurs while either front vacuum cups 159 or rear vacuum cups 216 are on the glass sheet. This force created by the operation of cylinders 217 reduces the load on either vacuum cups 195 or 216 during this movement of carriage 85 with glass sheet G. After the completion of the scoring operation and the snapping operation, as described later, the solenoid SV13A is deenergized.

The energization of solenoid SV13B occurs simultaneously with the deenergization of solenoid SV13A to move the spool of valve 218 in the other direction. This operates the cylinders 217 in the reverse direction. In the piping arrangement between cylinders 217 and valve 218 there is a portion having a restricted cross section to limit the rate of flow of oil from cylinders 217 during the reverse operation. However, in parallel with this portion of the piping with a restricted cross section, there is a piping arrangement that includes a solenoid, two-way valve 219 also on bridge 95 (FIG. 3) and having a solenoid SV14, which is energized whenever carriage 85 is some distance away from its home position.

The deenergization of solenoid SV14 occurs as carriage 85 nears its home position because plate 87 opens a limit switch LS2 (shown only in FIG. 13C) to deenergize solenoid SV14. The spool of valve 219 is moved to the closed position by the spring and oil from cylinders 217 on its return to valve 218 now flows entirely through the portion of the piping with the restricted cross section. As a result, carriage 85, as it approaches its home position, moves at slow speed. Of course, the valve and piping arrangement includes another by-pass piping arrangement to permit full flow of fluid to cylinders 217 from valve 218 for the forward drive of carriage 85. However, the flow of oil is controlled by an adjustable bleed-off mechanism (not shown). As explained below, solenoid SV13B remains energized to keep carriage 85 by means of cylinders 217 at its home position until the initiation of the next cutting operation when solenoid SV13B is deenergized and solenoid SV13A is energized.

Referring to FIG. 7, the carriage 85 has a transverse T-shaped support member 220 connected at its ends to plates 221 and 222 which are supported by plates 172, 174 and 175. A guide plate 223 is mounted on one vertical face of support member 220. Each of the top and bottom faces of guide plate 223 has a groove 224 (FIG. 9).

A cutter support assembly generally indicated at 225 includes a plate 226 on which are journaled pairs of wheels 227 to ride in grooves 224 of guide plate 223. A pair of tape clamps 228 are mounted on the top portion of plate 226 and are clamped to a tape 229 around pulleys 176 and 179. The tape 229 is moved by the rotation of pulley 179 which is driven by motor 181. The cutter support assembly 225 is moved from the right to the left, as viewed in FIG. 7, by the forward drive of motor 181. The reverse drive of motor 181 moves cutter support assembly 225 from left to right, as viewed in FIG. 7.

A cutter assembly generally indicated at 230 is mounted on plate 226. The cutter assembly 230 has a cutter wheel 231 rotatably mounted at one end of a plate 232 which is pivotally mounted intermediate its ends. The construction of cutter assembly 230 is substantially identical to the cutter assemblies used in the apparatus of our copending application referred to above. The construction of that cutter assembly is shown in FIGS. 16–19 of the drawings of that application. In that cutter assembly the plate, that is equivalent of plate 232 of the present cutter assembly, is held in raised position by a latch which is controlled by a solenoid. In the present construction the plate is held in the raised position by a latch 233, which is tripped for unlatching by a cam 234 mounted on T-shaped support member 220. This unlatching occurs when cutter assembly 230 is moved by the operation of motor 181 to the extreme right position of FIG. 7.

The unlatching lowers plate 232 so that cutter wheel 231, when it is beyond the margin of glass sheet G, is held above the horizontal plane of the glass sheet by a secondary latch (not shown) in the preferred embodiment. As in the cutter assembly of the copending application, the present cutter assembly has a roller (not shown). The roller rides up on the edge of the glass sheet G to unlatch the secondary latch and plate 232 moves downwardly the full distance. This brings cutter wheel 231 into scoring position as cutter assembly 230 is moved across glass sheet G.

As the tape 229 moves cutter support assembly 225 and cutter assembly 230 to the far left of carriage 85 (as viewed in FIG. 7), plate 232 of cutter assembly 230 rides up a cam plate 235 which raises the lower end of plate 232 to move the top end of plate 232 to the left and latch 233 drops into latching position. This prevents the lowering of the bottom end of plate 232 and the lowering of cutter wheel 231 when cutter assembly 230 is moved from left to right to its home position during the restoring operation to be described later. At the time that latch 233 moves to operating position the secondary latch (not shown) also moves into position.

A pair of double-pronged limit switches LS3 and LS4 is mounted on T-shaped member 220, which has slots in its top flange through which extend the prongs 236 of switches LS3 and LS4. The prongs 236 of switch LS3 are in a different transverse vertical plane than prongs 236 of switch LS4. A dog 237 and a dog 238 are mounted on plate 226 of cutter support assembly 225. The dogs 237 and 238 are in different transverse vertical planes of carriage 85 so that dog 238 hits either one of prongs 236 of switch LS4 and dog 237 hits one of prongs 236 of switch LS3 during the movement of cutter support assembly 225.

As seen at the left-hand end of FIG. 7, a downwardly extending plate 240 is mounted on carriage 85. The plate 240 supports tab plates 241 and 242. During the movement of carriage 85 away from bridge 95, the tab plate 241 hits a prong 243 of each pair of double-pronged arms of a limit switch LS5 mounted on supporting structure 20. This occurs after the fast acceleration of carriage 85 and after vacuum cups 195 or 216 have been lowered onto the glass sheet along with the communication of the vacuum source with the cups. As explained later, the tripping of switch LS5 starts the operation of hydraulic motor 181 to move cutter assembly 230 transversely across glass sheet G for the scoring operation. The movement of carriage 85, in the direction of the moving glass sheet is stopped when tab plate 242 trips a prong 244 of each pair of double-pronged arms of a limit switch LS6 mounted on supporting structure 20. This closes switch LS6 to initiate the return of carriage 85 to its home position and to initiate other restoring operations, as described later. Limit switches LS5 and LS6 are of the maintained type, as are switches LS3 and LS4.

Referring to FIGS. 7 and 9, carriage 85 supports a pair of spaced plates 245 connected to the T-shaped support member 220 and to plate 221. A pair of angle irons 246 is supported by plates 245. The horizontal flanges 247 of angle irons 246 serve as support rails for a snapper assembly generally indicated at 250. The snapper assembly 250 has a pair of spaced vertical plates 251 to which are joined a pair of narrow plates 252 by brackets 253. Each of plates 251 and narrow plates 252 supports a pair of wheels 254. The wheels 254 rotatably mounted on plates 252 ride on the top surface of flanges 247 and the wheel 254 on plates 251 roll along the under surface of flanges 247.

The plates 252 are joined to a horizontal base plate 255. A vertical plate 256 is mounted on plate 255 midway between plates 252. The plate 256 is connected by a clevis 257 to a piston rod 258 of a hydraulic cylinder 259. The cylinder 259 is connected to the hydraulic pump through a double-solenoid, spring-centered, four-way valve (not shown) mounted on carriage 85 and having solenoids SV15A and SV15B.

The energization of solenoid SV15A moves the spool of this valve to a position to introduce oil into one of the chambers of cylinder 259 and withdraw oil from the other chamber of cylinder 259 so as to extend piston rod 258. This moves plates 256 and the rest of snapper assembly 250 toward the glass sheet G. This advancement of snapper assembly 250 continues until solenoid SV15A is deenergized when the curved plates mounted on pivotally mounted arms 260 and 261 of limit switches LS7 and LS8 are moved by abutment of the glass sheet G. This movement of arms 260 and 261 opens switches LS7 and LS8 supported by brackets mounted on plates 251 of snapper assembly 250. Upon the deenergization of solenoid SV15A the spool returns to its spring-centered position. The advancement of snapper assembly 250 by cylinder 259 ceases.

A side arm 262 is secured to a clevis 263 which is mounted on an end of a piston rod 264 of a hydraulic cylinder 265. The cylinder 265 is supported by and below plate 255. A normally open limit switch LS9 is also supported by and below plate 255. When rod 264 is in its retracted or home position, arm 262 closes switch LS9.

As described later, the solenoid SV15B is energized after the snapping operation to retract snapper assembly 250 by the retraction of piston rod 258. The energization of solenoid SV15B moves the spool of the 4-way valve having solenoids SV15A and SV15B to a position that reverses the flow of oil to and from cylinder 259. This moves snapper assembly 250 away from the glass sheet until the deenergization of solenoid SV15B when a limit switch LS10 (shown only in FIG. 13A) is tripped or opened by snapper assembly 250 as the latter reaches its home or retracted position.

A pair of brackets 266 on plate 221 rotatably mount wheels 267 that abut the opposed vertical faces of plates 251. The wheels 267 cooperate with wheels 254 to guide snapper assembly 250 during its advancing and retracting movement.

A vertical plate 268 mounted on plate 255 is connected also to plates 251 near the end of plate 255 adjacent the glass sheet. A pair of rollers 269 is mounted for rotation about vertical axes on plate 268. The rollers 269 abut glass sheet G when the snapper assembly 250 is at its maximum advanced position as determined by opening of switches LS7 and LS8 through the movement of arms 260 and 261. A roller 270 mounted on plate 268 for rotation about a horizontal axis is positioned to provide rolling support for glass sheet G at one of its margins when the snapper assembly 250 is in its advanced position. Of course, the end of roller 270 under the glass sheet is convexly curved.

A vertical housing 271 is mounted on plate 255 in front of plate 268. A shaft 272 is slidably mounted in housing 271. A horizontal pin 273 through the bottom portion of shaft 272 extends outwardly from shaft 272 through vertical slots 274 in housing 271. A pair of links 275 is fixed on one end to a shaft 276. At the other end links 275 have a notch through which passes the ends of pin 273. A link 277 is fixed at one end on shaft 276 and at the other end is pivotally connected to clevis 263. The shaft 276 is rotatably supported by bearing plates 278 mounted on plate 255. By this construction the extension of piston rod 264 moves link 277 to rotate shaft 276. This moves links 275 to raise their notched ends thereby lifting pin 273 to raise vertical shaft 272. A snapping head 279 is mounted on the top end of vertical shaft 272 and is convexly curved in the direction parallel to the direction of movement of the glass sheet and is rectilinear in the transverse direction. The operation of cylinder 265 to raise snapping head 279 occurs after the scoring operation. The uppermost surface of snapping head 279 is directly in alignment with the scoring line on the glass sheet G above snapping head 279.

A pair of rods 280 having an offset top portion 281 is slidably mounted through vertical holes in plate 268 and plate 255. Each of rods 280 is threaded at the lower end. A pair of nuts 282 is mounted on each shaft at the threaded end. A spring 283 is mounted on each of rods 280 between nuts 282 and plate 255. A downwardly extending moment head 284 is supported by the offset portion 281 of each of rods 280. The lowermost surface of each of moment heads 284 is convexly curved and rectilinear in the same direction as the uppermost surface of snapping head 279. The moment heads 284 are supported by rods 280 in transverse vertical planes of the apparatus on each side of the transverse vertical plane passing through snapping head 279. The moment heads 284 and rods 280 are thus mounted for resiliently resisted upward movement by this construction. The upward movement of snapping head 279 against the glass sheet G below its score line raises the glass sheet slightly up against moment heads 284 which resiliently resist further raising of the glass sheet and provide moments on each side of the score line. The raising of snapping head 279 thus provides a snapping action on the glass along the score line to run the cut along this score line. This separates the glass sheet into two smaller glass sheets. The snapping action occurs at the margin of the glass sheet but the cut runs all the way across to the other edge of the glass sheet.

As described later, in connection with the electrical controller of the apparatus, snapper assembly 250 is operated to run the cuts along the score lines for the front and rear edge trim. The intermediate cuts are run by the use of the other snapping device which includes rolls or pulleys 42 that are raised at the proper moment by the pivotal movement of cam plate 75 as described above. It is also apparent from the circuits to be described later that both the snapper assembly 250 and pulleys 42 with the cam plate 75 and associated equipment can be utilized simultaneously to run the cut along the score line provided by the cutter wheel 231.

Referring to FIG. 7, the carriage at the right end has a stop member 285 that is hit by cutter assembly 230 at the right-hand end of its movement. A bolt 286 mounted on cutter support assembly 225 at its left-hand end hits plate 221 to limit the left-hand end of the movement of cutter support assembly 225.

A solenoid, two-way valve (not shown) is mounted on carriage 85 and has a solenoid SV16. The energization of solenoid SV16 communicates the source of compressed air with a pair of nozzles (not shown) that blow air across snapping head 279 after each snapping operation. These air blasts remove from snapping head 279 glass chips which would cause damage to the undersurface of the glass sheet during the next snapping operation. The energization of solenoid SV16 begins when switch LS9 is closed by side arm 262 and continues until switch LS6 is opened. The deenergization of solenoid SV16 closes its associated valve to stop the flow of air to the nozzles.

Brackets 287 and 288 are mounted on tubular member 96 of bridge 95, as seen in FIG. 3. An electrical clutch MC-1 is mounted on top of bracket 287 and is driven by a hydraulic motor 290. A gear 291 is mounted on the driven shaft of clutch MC-1, and the driving shaft of clutch MC-1 is connected to hydraulic motor 290. A larger gear 292 meshes with a gear 291 and with rack 137. The gear 292 is keyed on a shaft rotatably supported to bracket 287 by a bearing 293.

The gear 292 also meshes with an idler gear 294 keyed on a shaft 295 rotatably journaled in a bearing 296 supported by a plate 297 mounted on brackets 287 and 288. A gear 298 is also keyed on shaft 295 and meshes with a gear 299 keyed on a shaft 300 on which is also keyed a timing gear 301 that drives a timing belt 302. The belt 302 is also around a timing gear 303 keyed on a shaft 304. The shafts 300 and 304 are both supported by bearings (not shown) and are connected to shafts 305 of binary drum switches generally indicated at 306 and 307, respectively, which are mounted on bracket 288. Each of shafts 300 and 304 has a recess at one end to fit over the end of shaft 305. Relative rotation between shaft 305 and either shaft 300 or 304 is prevented by a key 308 (FIG. 10). In the preferred embodiment the diameter of timing gear 303 is eight times that of timing gear 301 so that shaft 305 of binary drum switch 306 rotates eight times faster than shaft 305 of binary drum switch 307.

The hydraulic motor 290 is connected to the hydraulic pump by a valve and piping arrangement that includes a double-solenoid, spring-centered, four-way valve (not shown) having solenoids SV17A and SV17B.

The energization of solenoid SV17A moves the spool from the spring-centered position to the position for feeding oil from the hydraulic pump to motor 290 to operate the latter for forward drive of rack 137 and bar 135. This direction of rotation of motor 290 is counterclockwise, as viewed in FIG. 3, to rotate gear 292 in the clockwise direction for the movement of rack 137 and bar 135 from the right to the left, as viewed in FIG. 1. The energization of solenoid SV17B moves the spool to a position for feeding oil to motor 290 to operate it in the reverse direction, thereby moving bar 135 from the left to the right, as viewed in FIG. 1.

During the energization of solenoid SV17A for the operation of motor 290 in the forward direction, the valve and piping arrangement between motor 290 and the valve having solenoids SV17A and SV17B includes a portion with a variable restricted cross section to limit the speed of forward operation of motor 290. For the reverse direction of motor 290 solenoid SV17B is energized to move the spool of the valve of the double-solenoid valve to position for feeding oil to the hydraulic motor 290 in the reverse direction from the feeding described above to drive motor 290 in the forward direction. The valve and piping arrangement includes a portion with a variable restricted cross section to limit the speed of the reverse or return operation of motor 290. The valve and piping arrangement also includes check valves that by-pass the portions of variable restricted cross section. The check valves are positioned in the by-pass lines so that one of the by-pass lines is used during the forward drive and the other is used during the return drive of motor 290.

The valve and piping arrangement for motor 290 has a solenoid, spring-biased valve SV18 and a solenoid, spring-biased valve SV19. The solenoid SV18 is energized and deenergized simultaneously with solenoid SV17A. When solenoid SV18 is deenergized, it provides oil pressure control and thus cooperates with the double-solenoid valve to provide practically instantaneous stopping of motor 290. Similarly solenoid SV19 is energized and deenergized with solenoid SV17B and solenoid SV19 provides oil pressure control when it is deenergized to cooperate to provide with the double-solenoid valve practically instantaneous cessation of the return drive of motor 290.

The binary drum switches 306 and 307 of the apparatus have the same general construction. The only differences are in the wiring arrangement, which is described later, and the number and location of some commutator brushes. The binary drum shown in FIGS. 10 and 11 is basically drum switch 306 but the pairs of brushes and pairs of brush supports have been added to provide a composite view.

The drum switch 306 has a housing 309. The ends of housing 309 are in circular recesses in a bottom plate 310 and a top plate 311 which are joined by tie rods 312 and nuts 313. The shaft 305 of drum switch 306 extends through plates 310 and 311 and is journalled in plates by bearings 314 and 315.

Each of drum switches 306 and 307 has six commutators. The commutators of drum switch 306 are designated generally in FIG. 10 as binary drum commutators BC-1, BC-2, BC-3, BC-4, BC-5 and BC-6. The commutators for binary drum switch 307 are designated BC-7, BC-8, BC-9, BC-10, BC-11 and BC-12. Each of the commutators has a disc 316 fixed on shaft 305 by a key 317 and separated from one another by spacers 318. The end discs 316 are spaced from bearings 314 and 315 by collets 319 and 320, respectively, fixed on shaft 305. Each disc 316 has a peripheral groove 321 in which are positioned 96 commutator bar sections 322 separated from one another by electrical insulating members (not shown). The bar sections 322 are wedged into position by wedging members 323. The commutator bar sections 322 are electrically insulated from disc 316 and wedging members 323 by an insulating member 324.

In housing 309 of the binary drum switch 306 there are six holes in the same plane of a longitudinal section. In these holes are mounted brush holders 325. Binary drum brushes are mounted in holders 325 to be in electrical contact with an immediately opposing commutator bar section or sections 322 of the binary drum commutators. The brushes that are in contact with commutators BC-1, BC-2, BC-3, BC-4, BC-5 and BC-6 are designated BB-1, BB-2, BB-3, BB-4, BB-5 and BB-6, respectively.

In housing 309 of binary drum switch 307 there is a hole that corresponds in position to that for brush holder 325 supporting brush BB-1 in drum switch 306. In this hole is mounted a holder 325 that supports a brush BB-7. There are no holes in housing 309 of drum switch 307 in positions that correspond to the other holes of drum switch 306. Instead in housing 309 of drum switch 307 there are three pairs of holes in which are mounted brush holders 325 supporting brushes BB-10A, BB-10B, BB-11A, BB-11B, BB-12A and BB-12B. The commutators BC-8 and BC9 are not contacted by brushes. Of course, spacers could be used in lieu of commutators BC-8 and BC–9. The brushes BB–10A and BB–10B contact commutator BC–10, the brushes BB–11A and BB–11B contact commutator BC–11 and brushes BB–12A and BB–12B contact commutator BC–12.

The pairs of holes in housing 309 of drum switch 307 are located so that these pairs of brushes that contact commutators BC–10, BC–11 and BC–12 at any moment in which each brush of one of the pairs contacts only one commutator bar section 322 the bar sections 322 contacted by a pair of brushes are separated from each other by three bar sections and the longitudinal plane passing through brush BB–7 is midway between each pair of brushes.

It is recalled that there are 96 bar sections or contacts 322 for each of the six commutators of each of the drum switches 306 and 307 and that commutators BC–1 through BC–6 are rotated during the driving of bar 135 at eight times the rate of rotation of commutators BC–7 through BC–12. The positions for all of the brushes of drum switches 306 and 307 are such that, when bar 135 is at its home position, commutator brushes BB–1 through BB–7 are in contact with the 1st and 96th commutator bar sections 322 of commutators BC–1 through BC–7, respectively, commutator brushes BB–10A, BB–11A and BB–12A are in contact with the 2nd and 3rd commutator bar sections 322 of commutators BC–10, BC–11 and BC–12, respectively, and brushes BB–10B, BB–11B and BB–12B are in contact with the 94th and 95th commutator bar sections 322 of commutators BC–10, BC–11 and BC–12, respectively.

Each of binary drum switches 306 and 307 has a dial disc 326 fastened by screws 327 to a knob 328 fixed on the top end of shaft 305 by a set screw 329.

In the preferred embodiment of the apparatus the transverse cutting is based upon the cutting of a large glass sheet or a continuous ribbon into lengths that are a multiplicity of a two-inch unit. Accordingly, the gear drive to move bar 135 and to rotate shafts 305 of drum switches 306 and 309 is constructed so that, when the drive rotates shaft 305 of drum switch 306 one complete revolution, bar 135 is moved from right to left, as viewed in FIG. 1, a distance of 32 inches and, when the drive rotates shaft 305 of drum switch 307 one complete revolution, bar 135 is driven from left to right a distance of 256 inches. For this reason, in the preferred embodiment, the dial disc 326 for drum switch 306 has equally spaced radial lines (not shown) at its periphery, and these lines are identified by the following markings: 0, 2, 4, 6, 8, 10, 12, 14, 16, 18, 20, 22, 24, 26, 28, 30 and 32. The numerals "0" and "32" are indicated for the same radial marking. When the dial makes one complete revolution from the zero marking, it indicates a 32-inch movement of bar 135. The dial disc 326 for binary drum 307 is marked with identical, equally spaced radial lines and these lines are identified by the following markings: 0, 16, 32, 48, 64, 80, 96, 112, 128, 144, 160, 176, 192, 208, 224, 240 and 256. The numerals "0" and "256" identify the same radial line. As seen in FIG. 11, each of drums 306 and 307 has an index plate 330. On the plate is an indicator line that is in a plane passing through the axis of shaft 305. With bar 135 at its home position, the radial lines identified as "0" of both dial discs 326 are in alignment with these indicator lines on index plate 330.

Figure 13A:
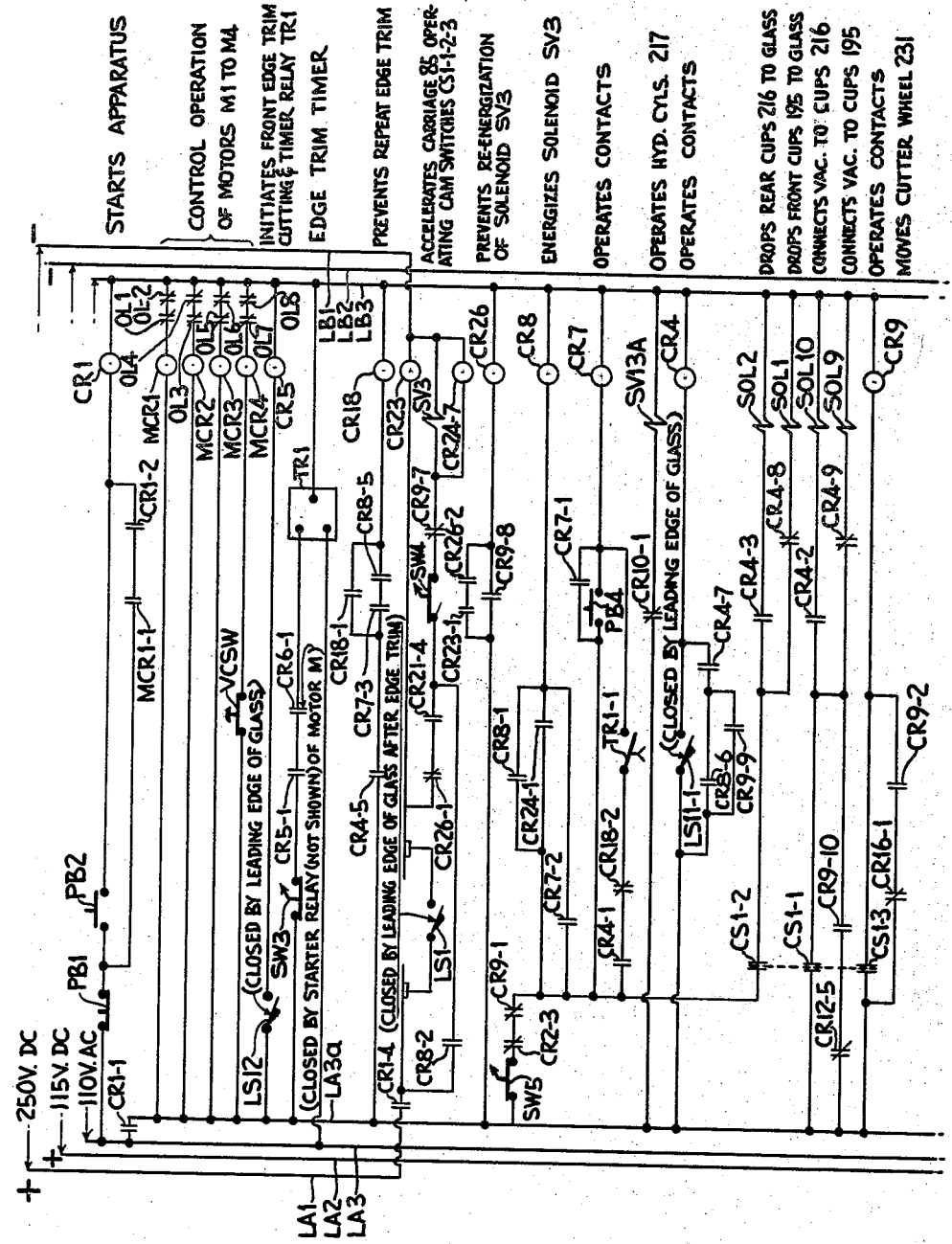
Figure 13B:
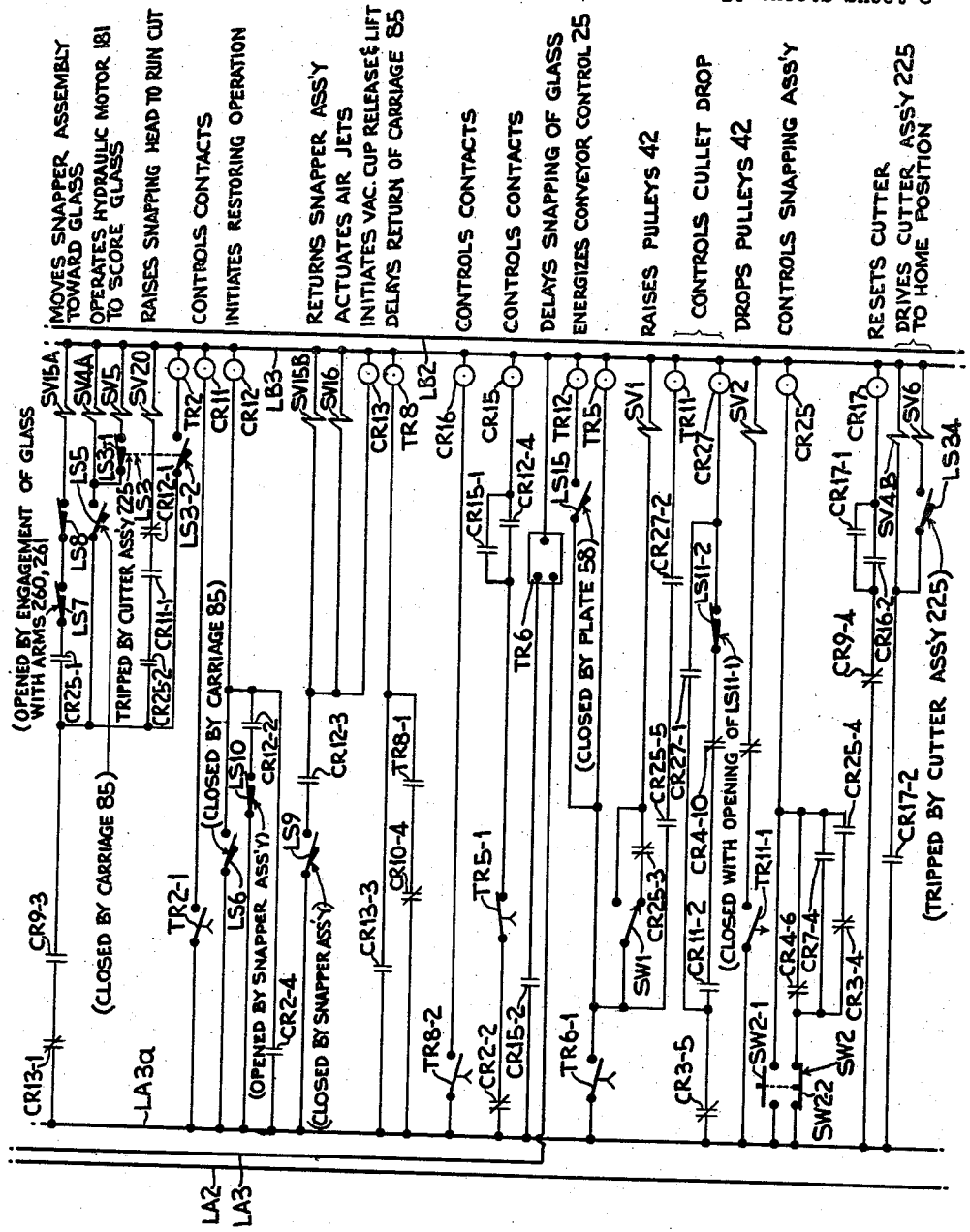
Figures 15, 16:
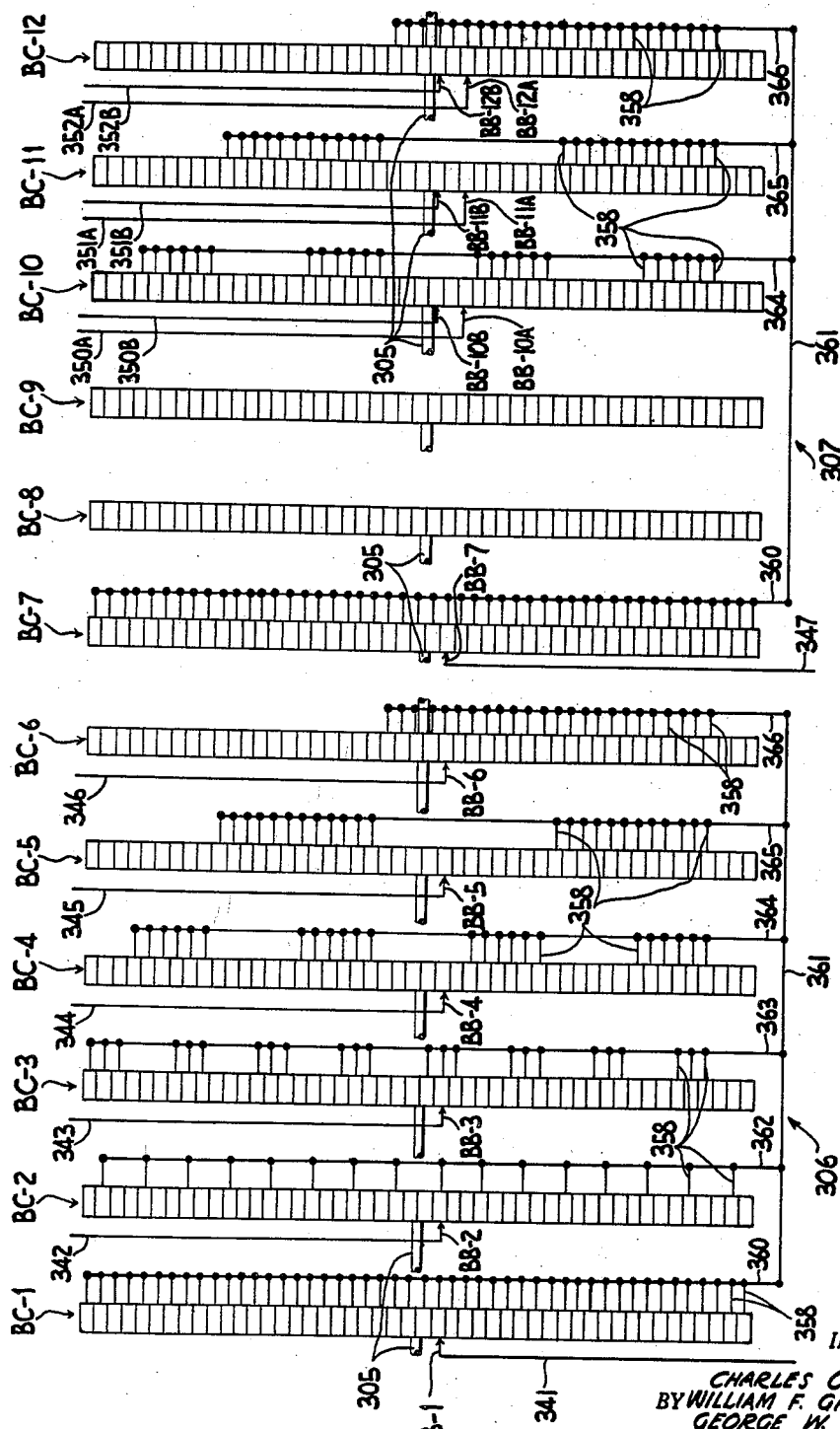
FIGS. 15 and 16 are schematic wiring diagrams of the two binary drum switches of the apparatus.

The brushes BB–1 through BB–7 are connected to wires 341, 342, 343, 344, 345, 346 and 347, respectively. The brushes BB–10A, BB–10B, BB–11A, BB–11B, BB–12A and BB–12B are connected to wires 350A, 350B, 351A, 351B, 352A and 352B, respectively. Wires 341 and 347 are connected to wire 355 (FIG. 13E). Except for wires 341 and 347 all of these wires from drum switches 306 and 307 are connected to coils of relays, as described later in connection with FIG. 13F. All of the 96 commutator sections or contacts 322 of commutator BC–1 are connected to one another as indicated in FIG. 15 through short wires 358 that are connected to wire 360 which goes completely around shaft 305 at the radial distance of contacts 322. A wire 361 is connected to wire 360. The wire 361 is also connected to wires 362, 363, 364, 365 and 366 which are connected by short wires 358 to some of the commutator sections 322 of commutators BC–2, BC–3, BC–4, BC–5 and BC–6, respectively, in a pattern of connection as indicated in FIG. 15.

The number of commutator sections 322 shown in FIG. 15 as rectangles is only 48, but each one rectangle represents two commutator sections 322. For example, the first rectangle at the top of BC–1 represents the first and second commutator sections. This was done to reduce the number of lines appearing on each commutator shown in FIG. 15. The same is true in FIG. 16. In the pattern of connection of wires 362 through 366 and wire 360 to the commutators, the number of wires 358 is double that shown. This is apparent when it is seen that the rectangle second from the top in the commutator BC–2 shown in FIG. 15 is actually the 3rd and 4th commutator sections 322 and thus to each of these commutator sections 322, there would be connected wires 358 that are connected to wire 362.

All commutator sections 322 of commutator BC–7 are connected to wire 360 of drum switch 307 by wires 358. The wire 360 is connected by wire 361 of drum 307 to wires 364, 365 and 366 of drum 307 which are connected by wires 358 of drum 307 to some commutator sections 322 of commutators BC–10, BC–11 and BC–12, respectively. Those sections 322 of commutators BC–10, BC–11 and BC–12 that are connected to wires 358 of drum switch 307 are shown in FIG. 16; however, the pattern shown in FIG. 16 is also based on each rectangle of a commutator representing two commutator sections 322. As a result, the number of wires is double when the real pattern is considered as discussed above in connection with drum switch 306.

In the description that follows of the electrical controller of the apparatus, it is assumed that various components, such as cam plates 75, carriage 85, bar 135, single-revolution clutch 112, cutter wheel 231 and snapper assembly 250, are in their home positions. In the illustrative preferred embodiment, it is also assumed that the glass sheet or continuous ribbon to be cut transversely by the apparatus is moving at about 216 inches per minute.

The electrical controller (FIGS. 13A through 13F) of the preferred embodiment of the apparatus has three main pairs of power lines. The electrical lines of one of the pairs are designated LA1 and LB1, which are connected to a 250-volt D.C. source. The electrical lines of the second pair are designated LA2 and LB2, which are connected to a 115-volt D.C. source. The electrical lines of the third pair are designated LA3 and LB3, which are connected to a 110-volt A.C. source.

A coil CR1 (FIG. 13A) of a relay is connected directly to line LB3 and connected through a normally closed push-button switch PB1 and a normally open push-button switch PB2 to line LA3. A subsidiary electrical line LA3a is connected to line LA3 through a normally open contact CR1–1. The electrical control circuits that use the 110-volt A.C. current are connected to line LA3 through subsidiary line LA3a. However, in addition to circuits connecting electronic time delay relays to lines LA3a and LB3, each of these relays is connected directly to line LA3 to operate or heat up its electronic tube before and independent of the energization of the relay having coil CR1.

There are four starter coils, designated MCR1, MCR2, MCR3 and MRC4. The coil MCR1 controls the operation of motor M1 which is connected (FIG. 12) to a 440-volt, 60-cycle, 3-phase power source through normally open contacts MCR1–1. The coils MCR2 and MCR3 control the operation of motors (not shown) that drive the pair of hydraulic pumps (not shown), which are used to operate hydraulic motors 181 and 290 and hydraulic cylinders 69, 217, 259 and 265. The coil MCR4 controls the operation of a motor (not shown) that drives the vacuum pump used to evacuate cups 195 or 216 to move carriage 85 with the glass sheet. The coils MCR1 through MCR4 are in parallel circuits between lines LA3a and LB3.

The circuit to operate motor M that drives belt conveyor 40 is not shown. That circuit is in the controller for all conveyors, i.e., conveyors 25, 31 and 40 that are operated continuously to move glass sheets to and from the apparatus whether or not there is transcuting. It is unnecessary to illustrate this controller.

A normally closed switch VCSW is in series with coil MCR4. The switch VCSW controls the operation of the vacuum pump because switch VCSW opens when air pressure in the main vacuum line from the pump to the vacuum cups 195 or 216 is lowered to the desired value below atmospheric pressure. Of course, when the pressure in the main vacuum line rises above this predetermined value, switch VCSW closes to restart the motor for the vacuum pump.

When an operator momentarily closes switch PB2, coil CR1 is energized. This closes a normally open contact CR1–1 between lines LA3 and LA3a to energize line LA3a. Current flows through coil MCR1 to close a normally open contact MCR1–1 in series with a normally open contact CR1–2 in the holding circuit for coil CR1 so that coil CR1 remains energized when switch PB2 is opened.

After closing switch PB2 to energize coil CR1, the operator momentarily closes a push-button switch PB3 (FIG. 13C) to energize a coil CR2 of a relay. This energizes a normally open contact CR2–1 in a holding circuit. A normally open contact CR3–1 in this holding circuit is closed at the same time by the energization of a coil CR3 of a relay in series with a normally open contact CR2–1. By another electrical circuit to be discussed later the coil CR3 remains energized for two seconds, after which the holding circuit for coil CR2 opens to deenergize coil CR2. The energization of coils CR3 and CR2 for the two-second interval affects other circuits as described later, with the result that various parts of the apparatus are returned to their home positions.

When the glass sheet, being moved downstream toward carriage 85 by feeding conveyor 32 and belt conveyor 40, trips a limit switch LS11 (FIG. 1), this closes a normally open contact LS11–1 (FIG. 13A) in series with a coil CR4 of a relay. The limit switch LS11 is mounted on bridge 95 so that it is tripped by the leading edge of the glass sheet. The switch LS11 in the illustrative embodiment is positioned 18 inches upstream from the transverse vertical plane that passes through cutter wheel 231 when carriage 85 is at its home position.

The leading edge of the moving glass sheet next trips and closes a normally open limit switch LS12 (FIG. 1) which is mounted on carriage 85 so that in the illustrative embodiment it is about 6 inches from the transverse vertical plane passing through cutter wheel 231 on carriage 85. The switch LS12 is closed by the leading edge of the glass sheet to initiate the front edge trim cutting operation, as described later, and when this occurs, carriage 85 is at its home position. In series with switch LS12 is a coil CR5 of a relay. The closing of switch LS12 thus energizes coil CR5 which remains energized until the trailing edge of the glass sheet passes beyond switch LS12. Of course, switch LS12 moves with carriage 85 when the latter is moved for each cycle of cutting operation. The only function for switch LS12 is to initiate the front edge trim, as mentioned above.

Normally open contacts CR5–1 and CR6–1 are in the electrical circuit between an electronic timer relay TR1 and line LA3a. The motor M that drives belts 41 is controlled by a starter relay (not shown) which operates contact CR6–1 so that, when the belts are being moved, contact CR6–1 is closed. The belts 41 are driven continuously during the operation of the apparatus. Thus the closing of contact CR5–1 by the energization of coil CR5 energizes timer relay TR1.

The energization of relay TR1 closes a normally open contact TR1–1 of the on delay type in series with a coil CR7 of a relay. Thus coil CR7 is energized after a predetermined period of time following the closing of switch LS12. This closes a normally open contact CR7–1 in a holding circuit for coil CR7.

The energization of coil CR7 also closes a normally open contact CR7–2 in series with a coil CR8 of a relay. In parallel with contact CR7–2 and in series with coil CR8 is a normally open contact CR8–1 for a holding circuit. A normally closed contact CR9–1 is in series with coils CR8 and CR7 so that, when contact CR9–1 opens as described later, coils CR8 and CR7 are deenergized.

The energization of coil CR8 closes a normally open contact CR8–2 in series with solenoid SV3. This energizes solenoid SV3 to operate air cylinder 133 for the retraction of piston rod 132 to initiate the operation of single-revolution clutch 112 so that cam discs 106 are rotated to provide a rapid acceleration of carriage 85, as described above. The single revolution of shaft 99 operates cam switch 111 to rotate three cams (not shown) that operate three contacts designated CS1–1, CS1–2 and CS1–3. These three contacts are open when the cams of switch 111 are at their home position. One of the cams of cam switch 111 when it rotates 40 degrees closes contact CS1–1 and when it has rotated through 330 degrees of one revolution opens contact CS1–1. During the 360 degrees of a single revolution a second cam switch 111 closes contact CS1–2 at 45 degrees and opens it at 330 degrees. The third cam closes contact CS1–3 at 250 degrees and opens it at 330 degrees.

The contact CS1–1 closes upon the operation of switch 111 to energize solenoid SV10 in series with it. This communicates rear vacuum cups 216 with the vacuum pump. Also in series with solenoid SV10 is a normally open contact CR4–2 which was previously closed when coil CR4 was energized, as explained above.

The solenoid SOL2, which is energized to drop rear vacuum cups 216, is in series with a normally open contact CR4–3 and contact CS1–2. The contact CR4–3 is closed because coil CR4 is previously energized by the closing of contact LS11–1 as described above. The closing of contact CS1–2 very shortly after the closing of contact CS1–1 during the operation of cam switch 111 results in the dropping of rear vacuum cups 216 to engage the glass sheet under them. This happens shortly after carriage 85 is given the rapid acceleration that is described above.

The energization of coil CR8 opens a normally closed contact CR8–3 in the holding circuit for a coil CR10 of a relay. The deenergization of coil CR10 (FIG. 13C) closes a normally closed contact CR10 in series with solenoid SV13A (FIG. 13A) to operate hydraulic cylinders 217. This moves their piston rods in the direction of the movement of the glass sheet for the purpose described above.

When the third cam of switch 111 closes contact CS1–3, as described above, a coil CR9 of a relay in series with contact CS1–3 is energized. This closes a normally open contact CR9–2 in a holding circuit for coil CR9 so that, when contact CS1–3 opens just before the completion of the single revolution of the third cam of switch 111, coil CR9 remains energized.

The solenoid SV4A is in series with normally open limit switch LS5 and normally open contact CR9. The energization of coil CR9, initiated by the closing of contact CS1–3, closes contact CR9–3. The limit switch LS5 is tripped to the closed position by tab plate 241 on carriage 85 which is now moving with the glass sheet because rear vacuum cups 216 are engaging the sheet. The closing of switch LS5 energizes solenoid SV4A. Also in series with switch LS5 is solenoid SV5 and between them is a normally closed contact LS3–1 of limit switch LS3. Because cutter assembly 230 is at its home position when carriage 85 is at its home position, contact LS3–1 is closed.

Thus solenoid SV5 is energized simultaneously with solenoid SV4A upon the closing of switch LS5. The energization of solenoids SV5 and SV4A moves the spools of their associated valves to operate hydraulic motor 181 at fast forward speed. This moves cutter wheel 231 across the glass sheet for the scoring operation while carriage 85 is moving with the sheet. When dog 237 hits one of prongs 236 of limit switch LS3, it opens contact LS3–1 to deenergize solenoid SV5. The motor 181 continues to operate but at slow speed.

While cutter assembly 230 and cutter support assembly 225 are moved at slow speed by motor 181, after tripping switch LS3, plate 232 is pivoted by engagement with cam plate 235 thereby latching plate 230 to maintain cutter wheel 231 in the raised position. When bolt 286 on cutter support assembly 225 abuts plate 221, hydraulic motor 181 can no longer drive cutter support assembly 225 from the right to the left (as viewed in FIG. 7). The energization of solenoid SV4A continues until the completion of the snapping operation described later.

A circuit containing solenoid SV15A and normally closed limit switches LS7 and LS8 is in parallel with the circuit containing switch LS5 and solenoid SV4A but is in series with normally open contact CR9–3 that is in series with the latter circuit. Thus solenoid SV15A is energized simultaneously with the energization of solenoid SV4A. The energization of solenoid SV15A moves the spool of its associated valve to operate hydraulic cylinder 259 thereby moving snapper assembly 250 toward the glass sheet. When arms 260 and 261 are pivoted as they engage the glass sheet, switches LS7 and LS8 are opened. This deenergizes solenoid SV15A and the spool of the valve associated with it returns to its spring-centered position. The snapper assembly 250 is now in its forward or advanced position with snapping head 279 below the glass sheet and moment heads 284 above the glass sheet at the margin of the latter. Although belt conveyor 40 is moving the glass sheet, the latter is on belts 41 with the glass sheet having a small amount of overhang at the side where snapper assembly 250 is located.

When limit switch LS3 is tripped by dog 237 to change hydraulic motor 181 from fast forward speed to slow forward speed, a normally open contact LS3–2 of switch LS3 is closed to energize a coil TR2 of a time relay of the on delay type, that is set for 0.1 second. After the delay, coil TR2 starts to close a contact TR2–1 of the on delay type that is in series with a coil CR11 of a relay. When coil CR11 is energized, a normally open contact CR11–1 in series with a solenoid SV20 is closed. A solenoid, spring-biased, four-way valve (not shown) having solenoid SV20 is mounted on carriage 85. The energization of solenoid SV20 moves the spool of the valve to feed oil to one chamber of hydraulic cylinder 265 and remove oil from the second chamber for the outward movement of piston rod 264 to raise snapping head 279 to run the cut along the score line obtained by cutter wheel 231. The oil flows from the second chamber to the valve through a portion of the piping that has a restricted cross section which is adjusted to provide a speed of retraction so that head 279 is lifted to its maximum raised position within 0.5 second.

The deenergization of solenoid SV20, which occurs as described later, moves the spool of the valve to its spring-biased position, thereby feeding oil to the second chamber and removing it from the first. This feeding of oil to cylinder 265 from the valve is not hindered by the portion of the piping with the restricted cross section because it can flow through a by-pass piping arrangement that includes a check valve positioned to provide flow of oil in that direction but not in the opposite direction.

Shortly after the raising of snapping head 279 by the energization of solenoid SV20, tab plate 242 on moving carriage 85 trips a limit switch LS6 to close its normally open contact LS6, which is in series with a coil CR12 of a relay. This energizes coil CR12 to initiate a restoring operation described below.

The energization of coil CR12 opens a normally closed contact CR12–1 in series with solenoid SV20, thereby deenergizing the latter to lower snapping head 279 by retracting piston rod 264.

The relay having coil CR12 also has a normally open contact CR12–2 in its holding circuit along with normally closed limit switch LS10, which is opened by snapper assembly 250 in its home position. When the snapper assembly 250 is moved from its home position, switch LS10 closes. Thus the energization of coil CR12 initiated by the tripping of switch LS6 is continued by the holding circuit until snapper assembly 250 arrives at its home position to open switch LS10.

The normally open limit switch LS9 is closed by side arm 262 on piston rod 264 of hydraulic cylinder 265 when piston rod 264 arrives at its retracted or home position. A normally open contact CR12–3 in series with switch LS9 closes before this by the energization of coil CR12. The switch LS9 and contact CR12–3 are in series with solenoids SV15B and SV16 and a coil CR13 of a relay which are in parallel with one another.

The energization of solenoid SV16 moves the spool of its associated valve to feed jets of air against snapping head 279. The energization of solenoid SV15B moves the spool of the valve associated with it whereby cylinder 259 returns snapper assembly 250 to its home position where it opens switch LS10 to deenergize coil CR12 thereby opening contacts CR12–2, 3 to deenergize solenoids SV15B and SV16 and coil CR13.

During the energization of coil CR13 it opens a normally closed contact CR13–1 in series with solenoids SV15A, SV4A, SV5 and SV20 and relay TR2. The opening of contact CR13–1 deenergizes relay TR2 thereby opening contact TR2–1 in series with coil CR11. This opens contact CR11–1 in series with coil SV20. Thus the energization of coil CR13, which continues so long as a normally open contact CR12–3, in series with it, is closed, prevents the energization of any of these solenoids until after the completion of the restoring operation, as described below, and then only after the contact CR9–3, in series with these solenoids, is closed as described above.

The energization of coil CR13 closes a normally open contact CR13–2 in series with a normally closed contact TR4–1 of the on delay type and a coil CR14 (FIG. 13C) of a relay. A time delay relay TR4 of the on delay type is in parallel with contact TR4–1 and coil CR14 but it is in series with contact CR13–2. As a result, coils CR14 and relay TR4 are energized at the same time. During the delay of relay TR4 and the delay of contact TR4–1, the coil CR14 is energized. During this interval of energization of coil CR14 it closes a normally open contact CR14–1 in series with solenoid SV12. This energizes solenoid SV12 to move the spindle of the associated valve to feed air to rear vacuum cups 216. Upon the denergization of coil CR14, air is no longer fed to vacuum cups 216.

The energization of coil CR14 for the brief period of time opens a normally closed contact CR14–2 in series with a now closed, normally open contact CR4–4 and solenoid SV8. This deenergizes solenoid SV8. As described earlier, upon the deenergization of solenoid SV8, rear vacuum cups 216 are raised by cylinders 194. When coil CR14 is deenergized, contact CR14–2 closes to energize coil SV8, thereby operating cylinders 194 to extend piston rod 193 and thus lower cups 216. However, the complete lowering of cups 216 is now prevented by latch 207 until solenoid SOL2 is again energized.

In parallel with contact CR13–2, that is in series with relay TR4, are a normally closed contact CR8–4 and a normally open contact TR2–2 to provide a holding circuit for relay TR4. This holding circuit will drop out to deenergize relay TR4 upon the energization of coil CR8 at the initiation of the sequence of operations for the next cut of the glass sheet, as described below, because coil CR8 when energized will open contact CR8-4.

When the coil CR12 is energized by the closing of limit switch LS6, as described above, the snapping operation by snapper assembly 250, if used, is already completed. The energization of coil CR12 closes a normally open contact CR12-4 in series with a coil CR15 (FIG. 13B) of a relay, a normally closed contact CR2-2 and a normally closed contact TR5-1 of the on delay type. A normally open contact CR15-1 is in a holding circuit in parallel with contact CR12-4 to maintain coil CR15 energized after contact CR12-4 opens, when snapper assembly 250 opens switch LS10 as it reaches its home position to drop out the holding circuit for coil CR12.

The energization of coil CR15 closes a normally open contact CR15-2 in series with an electronic time delay relay TR6 of the on delay type. A normally open contact TR6-1 of the on delay type is in series with a time delay relay TR5 of the on delay type. Thus after the delay of relay TR6, contact TR6-1 closes to energize relay TR5. A normally open contact TR5-2 of the on delay type is in series with a time delay relay TR7 of the on delay type, set for two seconds. After the delays of relay TR5 and contact TR5-2, relay TR7 is initiated.

In parallel with relay TR7 is a circuit having a coil CR3 of a relay and a normally closed contact TR7-1 of the on delay type. The latter circuit is in series with normally open contact TR5-2 so that, when contact TR5-2 closes to energize relay TR7, coil CR3 is also energized until relay TR7 after its delay and that of contact TR7-1 opens contact TR7-1. The relay having coil CR3 when energized closes a normally open contact (not shown) in the controller circuitry (not shown) for the first section of receiving conveyor 25. Because the operation described above merely scores and snaps a narrow sheet of glass from the leading portion of the glass sheet to serve as an edge trim, the narrow sheet moves off belts 41 and falls down into the cullet hopper. It is not transferred to receiving conveyor 25. Because the narrow, trim sheet is not moved onto receiving conveyor 25, the sheet does not trip a limit switch LS13 (FIG. 1) which is located just upstream of the first section of receiving conveyor 25. Upstream of each other section of receiving conveyor 25 is located a limit switch (not shown) which is tripped by any glass sheet fed onto conveyor 25. Each of these limit switches, including limit switch LS13, when tripped, converts the drive for the corresponding section of conveyor 25 from its slow speed to its fast speed so that the newly formed glass sheet, that is moved onto receiving conveyor 25, is moved rapidly away from the newly formed leading edge of the sheet that remains after the cutting operation. Of course, as each of these limit switches is passed by the trailing edge of the newly formed glass sheet, the associated section of receiving conveyor 25 after a delay returns to its normal slow speed.

During the energization of coil CR13 it closes a normally open contact CR13-3 in series with a time delay relay TR8 (FIG. 13A) of the 0.1 second on delay and the reset delay type. When contact CR13-3 opens, as described later, the energization of relay TR8 is continued by a now closed, normally open contact TR8-1 in its holding circuit.

After its set delay, the relay TR8 closes a normally open contact TR8-2 of the on delay type that is in series with a coil CR16 (FIG. 13B) of a relay. The energization of coil CR16 opens a normally closed contact CR16-1 in the holding circuit for coil CR9 (FIG. 13A). The deenergization of coil CR9 results in the deenergization of coils CR8 and CR7 as mentioned above.

The energization of coil CR16 closes a normally open contact CR16-2 in series with a coil CR17 (FIG. 13B) of a relay. Also in series with contact CR16-2 and coil CR17 is a normally closed contact CR9-4. Because the energization of coil CR16 deenergized coil CR9, as mentioned above, contact CR9-4 in series with coil CR17 closes. This energizes coil CR17. In parallel with contact CR16-2 and in series with contact CR9-4 and coil CR17 is a holding circuit containing a normally open contact CR17-1, which keeps coil CR17 energized until coil CR9 is energized by the closing of contact CS1-3 during the operation of cam switch 111 in the next cycle of operations for cutting.

The energization of coil CR17 closes a normally open contact CR17-2 in series with solenoid SV4B. This energizes solenoid SV4B. The limit switch LS4 and solenoid SV6 are in series with contact CR17-2 which is in series with solenoid SV4B, but switch LS4 and solenoid SV6 are in parallel with solenoid SV4B. The switch LS4 was tripped to the closed position when the cutter support assembly 225 moved from its home position to move cutter wheel 231 across the glass sheet. Thus switch LS4 is closed when contact CR17-2 closes. The simultaneous energization of solenoids SV4B and SV6 results in the operation of hydraulic motor 181 to drive cutter support assembly 225 toward the home position at fast speed. When assembly 225 nears its home position, dog 238 trips switch LS4 to open it. This deenergizes solenoid SV6, resulting in the change of the operation of motor 181 to the slow speed. The cutter support assembly 225 is driven to and maintained at the home position by the continued energization of solenoid SV4B until contact CR17-2 opens when coil CR17 is deenergized by the opening of contact CR9-4 in its holding circuit. This occurs during the next operation of cam switch 111 with the closing of switch CS1-3 to energize coil CR9 as part of the operation for the next transverse cutting of the glass sheet.

The energization of coil CR16 also closes a normally open contact CR16-3 in series with coil CR10. The coil CR10 was deenergized initially by the energization of coil CR8 as described earlier. A holding circuit containing a normally open contact CR10-2 bypasses contact CR16-3 in series with coil CR10 so that coil CR10 remains energized when coil CR16 is deenergized. The contact CR8-3 in this holding circuit opens during the next cycle of operation for cutting, as described earlier, to deenergize coil CR10 for the energization of solenoid SV13A.

During the energization of coil CR10, it opens a normally closed contact CR10-1 in series with solenoid SV13A to deenergize it and coil CR10 closes a normally open contact CR10-3 in series with solenoid SV13B. As a result the spool of the valve associated with solenoids SV13A and SV13B is moved to the position for feeding oil to hydraulic cylinders 217 to move carriage 85 toward its home position. The carriage 85 is moved initially at a fast speed, because solenoid SV14 is energized. The solenoid SV14 is in series with limit switch LS2. Just before carriage 85 reaches its home position, carriage 85 opens switch LS2, as described earlier, to deenergize solenoid SV14. The movement of the carriage 85 continues but at slow speed, until the carriage reaches its home position. The solenoid SV13B remains energized and solenoid SV13A remains deenergized until coil CR10 is deenergized by the next energization of coil CR8 that is described later. The carriage 85 keeps switch LS2 open until carriage 85 is moved away from its home position in the direction of the moving glass sheet in the next cycle of operation for cutting in which solenoids SV13B and SV13A are deenergized and energized, respectively.

As described earlier, the tripping of limit switch LS11 by the leading edge of the glass sheet closes contact LS11-1 to energize coil CR4 for the initial energization of coils CR7 and CR8 in sequence. This closes contact CR8-2 to energize solenoid SV3 in series with it and opens contact CR8-3 in the holding circuit for coil CR10, thereby energizing solenoid SV13A. The solenoid SV3 initiates the front edge trim cutting operation that has been described. The coils CR7 and CR8 are deenergized during this edge trim cutting operation when contact CS1–3 closes briefly to energize coil CR9 for the opening of contact CR9–1 in series with coils CR7 and CR8. Because coil CR4 remains energized until its holding circuit opens after the glass sheet passes beyond switch LS11, it is necessary to prevent reenergization of coil CR7 until a new glass sheet is moved to the apparatus. For this purpose the controller includes a front-edge, anti-repeat relay having a coil CR18 (FIG. 13A).

In series with coil CR18 are normally open contacts CR4–5, CR7–3 and CR7–5 which are closed by the energization of coils CR4, CR7 and CR8 upon the closing of contact LS11–1 as described above. Thus coil CR18 is energized when contact LS11–1 is closed. The energization of coil CR18 closes a normally open contact CR18–1 of a holding circuit in series with coil CR18 and normally open contact CR4 but in parallel with normally open contacts CR7–3 and CR8–5. The holding circuit with contact CR18–1 keeps coil CR18 energized when coils CR7 and CR8 are deenergized by the opening of contact CR9–1 in series with them through the energization of coil CR9 by the closing of contact CS1–3 during the front edge-trim cycle of cutting operation.

The energization of coil CR18 opens a normally closed contact CR18–2 in series with contacts CR9–1, CR4–1 and TR1–1 and coil CR7 so that coil CR7 cannot be energized when contact CR9–1 is closed by the deenergization of coil CR9 so long as contact LS11–1 keeps coil CR4 energized. When coil CR4 is deenergized by the opening of its holding circuit, which is described later, after the opening of contact LS11–1 as the trailing edge of the glass sheet passes beyond switch LS11, contact CR4–5 in series with coil CR18 opens to deenergize coil CR18 which remains deenergized until the leading edge of the next glass sheet closes switch LS11–1. Then coil CR18 is not re-energized until after coils CR7 and CR8 are energized to initiate a front edge trim cutting operation on this new glass sheet.

In parallel with contacts CR4–1, CR18–2 and TR1–1 and in series with coil CR7 is a push-button switch PB4 which can be closed momentarily by an operator to initiate a cycle of cutting operation through the energization of coil CR7 to energize coil CR8. This manual initiation of a cutting cycle can be initiated at any time except when contact CR9–1 in series with switch PB4 and coil CR7 is open which is its condition during that part of a cutting cycle from the time that contact CS1–3 closes until coil CR16 is energized to deenergize coil CR9 after the snapping part of the cutting cycle.

The energization of coil CR3 (FIG. 13C), which is initiated indirectly, as described earlier, when limit switch LS6 is closed by carriage 85 after the scoring and snapping, closes a normally open contact CR3–2 in series with a coil CR20 of a relay. Although coil CR3 is deenergized a short period later by the opening of the contact TR7–1 in series with it, coil CR20 remains energized because of a holding circuit including a normally open contact CR20–1.

The energization of coil CR20 closes a normally open contact CR20–2 in series with solenoids SV17A and SV18 which are in parallel with each other. Also in series with them and with this contact CR20–2 are normally open contacts CRA–1, CRB–1, CRC–1, CRD–1, CRE–1 and CRF–1 which are in parallel with one another, a normally closed contact CR21–1 and a normally closed contact CR3–3. The contact CR3–3 closes when coil CR3 is deenergized after a delay by the opening of contact TR7–1, as described above. When this occurs, solenoids SV17A and SV18 are energized because one or more of contacts CRA–1 through CRF–1, which are part of the cutting program circuitry to be described later, are closed. When these solenoids are energized, oil is fed to hydraulic motor 290.

The electric clutch MC1 has its coil MC1 in series with a variable resistor R1, to provide the proper voltage to coil MC1, and normally open contacts CR1–3 and CR22–1. The contact CR1–3 is closed because coil CR1 was energized to start the apparatus when the operator closed push-button switch PB2, as described earlier. The contact CR22–1 is closed because a coil CR22 of the relay having contact CR22–1 is in series with a normally closed contact TR9–1 of the on delay type so that coil CR22 was energized when line LA3a was energized by the closing of contact CR1–1 (FIG. 13A) between line LA3a and LA3. Thus the operation of motor 290 by the energization of solenoids SV17A and SV18 operates through energized clutch MC1, gears 291 and 292 to move bar 135 and its rack 137 in the forward direction. When bar 135 has been driven the distance called for by the program, as explained later, contact CR21–1 opens but solenoids SV17A and SV18 remain energized for a very brief period of time because a now closed, normally open contact is in parallel with contact CR21–1. The opening of contact CR21–1 results from the energization of a coil CR21 of the relay having contact CR21–1.

The energization of coil CR21 closes a normally open contact CR21–2 in series with time delay relay TR9 of the on delay type that is set for 0.5 second. After a delay relay TR9 opens contact TR9–1 in series with coil CR22, this deenergizes coil CR22 to open contact CR22–1 in series with coil MC1 to disengage clutch MC1 and opens contact CR22–2 in series with solenoids SV17A and SV18. The drive of bar 135 ceases.

In parallel with coil MC1 is a condenser C1 which is in the parallel circuit to prevent damage to contacts CR1–3 and CR22–1 when coil MC1 is deenergized.

The electric clutch MC1 remains deenergized until coil CR21 is deenergized by the opening of a normally closed contact CR9–5 in series with it. This occurs when coil CR8 is energized by the closing of contact CS1–3 of cam switch 111 during the cycle of cutting operation.

The energization of coil CR21 also closes a normally open contact CR21–3 in series with a solenoid SV21. This energizes solenoid SV21 of a solenoid, spring-biased, four-way valve (not shown) to move the spool of this valve so that compressed air is moved into one chamber of air cylinder 166 and air is removed from the second chamber of cylinder 166. This retracts piston rod 165 to lower pawl 160 so that its extensions 168 move downwardly between knobs 136 on bar 135. When knobs 136 abut extensions 168 of pawl 160, further movement of bar 135 is prevented. Shortly thereafter contact TR9–1 opens to deenergize coil CR22 to open contacts CR22–1, 2 for the deenergization of solenoids SV17A and SV18 and of coil MC1.

The deenergization of coil CR22 opens a now closed, normally open contact CR22–3 in series with coil CR20 to deenergize coil CR20 and open contact CR20–1 in its holding circuit. This contact CR22–3 was closed when coil CR22 was first energized by the closing of contact CR1–3 in series with coil CR22 as described above.

Upon the later deenergization of solenoid SV21 when contact CR21–3 opens through the deenergization of coil CR21 by the opening of a normally closed contact CR9–5, this spool of the valve having solenoid SV21 is moved to its other position so that compressed air is fed to the second chamber and air is removed from the first chamber to extend rod 165, thereby lifting pawl 160.

The later deenergization of coil CR21 also opens contact CR21–2 in series with relay TR9 so that the latter is deenergized and thereby contact TR9–1 closes to re-energize coil CR22 for the re-energization of coil MC1. However, solenoids SV17A and SV18 cannot be re-energized through the closing of contact CR22 in series with them because contact CR20–2 also in series with them is now open. The energization of coil CR22 had deenergized coil CR20 by the opening of contact CR22-3 in series with coil CR20.

The movement of bar 135 to the position for coincidence, in accordance with the program to be described later, places limit switch LS1 on side arm 149 at the one end of bar 135 at the proper position. This position is downstream of the transverse vertical plane passing through cutter wheel 231 when carriage 85 is at its home position. Thus arm 154 is hit by the newly formed leading edge of the glass sheet remaining after the front edge trim described above. The movement of arm 154 results in the closing of switch LS1 at the proper moment.

The closing of switch LS1 energizes a coil CR23 (FIG. 13A) of a relay in series with it and also energizes solenoid SV3 to start the operation of the single-revolution clutch 112. The solenoid SV3 is in series also with a normally open contact CR21-4 between switch LS1 and solenoid SV3. The contact CR21-4 is now closed because the arrival of bar 135 at the coincidence position resulted in the energization of coil CR21. The switch LS1 and contact CR21-4 are in a circuit that is in parallel with the circuit containing contact CR8-2 that was closed to operate the single-revolution clutch 112 by the energization of coil SV3 for the edge trim operation as described above. These parallel circuits for the energization of solenoid SV3 are connected to line LA1 through a now closed, normally open contact CR1-4.

In parallel with solenoid SV3 is a coil CR24 which is energized simultaneously with the energization of solenoid SV3 to close a normally open contact CR24-1 in series with coil CR8. The coil CR8 was first energized by the closing of contact CR7-2 in series with it, and in parallel with contact CR24-1, during the initiation of the edge trimming operation described above. The contact CR7-2 is also in parallel with contact CR8-1 of the holding circuit for coil CR8.

The energization of coil CR8 by the closing of contact CR24-1 opens a normally closed contact CR8-3 in the holding circuit for coil CR10 (FIG. 13C) to deenergize coil CR10 to open contact CR10-3 in series with solenoid SV13B that was energized to return carriage 85 to its home position. At the same time the deenergization of coil CR10 closes contact CR10-1 in series with solenoid SV13A to operate hydraulic cylinders 217 as described above in connection with the cycle of operations for front edge trim cutting.

The energization of coil SV3 starts the functioning of single-revolution clutch 112 to operate cam switch 112 for the closing and opening of contacts CS1-1, CS1-2 and CS1-3. The closing of contact CS1-2 again energizes solenoid SOL2 to drop rear vacuum cups 216 because coil CR4 is still energized, and the closing of contact CS1-1 exhausts cups 216 while the closing of contact CS1-3 initiates the energization of contact CR9-3 to move cutter wheel 231 across the glass sheet for scoring. The energization of contact CR9-3 does not necessarily advance snapper assembly 250 in the same manner, as described above, for the cycle of edge trim cutting operation. The advancement of snapper assembly 250 and the raising of snapping head 279 is dependent on the energization of a coil CR25 of a relay to close normally open contacts CR25-1, 2 in series with solenoids SV15A and SV20. The coil CR25 is energized for the front and rear edge trimming operations and can be energized for each of the main or intermediate cutting operations as described below.

As the carriage 85 moves with the glass sheet, it closes switch LS6 to energize coil CR12, thereby closing contact CR12-4 to energize coil CR15 for the closing of contact CR15-2 to initiate relay TR6, as described above in connection with the edge trimming operation. At the same time the energization of coil CR12 opens contact CR12-1 to deenergize coil SV20 so that snapping head 279 is lowered. The purpose for relay TR6 is to provide a period of delay before the momentary raising of pulleys 42 for the snapping of the scored glass sheet. During this period of delay belts 41 move the glass sheet so that the score line is downstream from the position of the snapping produced by snapper assembly 250 and is now over pulleys 42. After this delay of relay TR6, contact TR6-1 closes to energize solenoid SV1 for the raising of pulleys 42 and for the energization of relay TR5. The energization of relay TR5 after its delay opens contact TR5-1 to deenergize coil CR15, thereby opening contact CR15-2 in series with relay TR6. This deenergizes the latter, which, in turn, opens contact TR6-1 for the deenergization of solenoid SV1 and relay TR5. The deenergization of coil SV1 results in the lowering of pulleys 42.

A selector switch SW1 in either of its two positions connects contact TR6-1 and solenoid SV1. When switch SW1 is in the position shown in FIG. 13B, this connection is through a normally closed contact CR25-3 of the relay having coil CR25.

A selector switch SW2 has contacts SW2-1 and SW2-2. When switch SW2 is in the position indicated in FIG. 13B, contact SW2-2 is closed and contact SW2-1 is open. These contacts are in parallel circuits which are in series with coil CR25. Between contact SW2-2 and coil CR25 are three, parallel subcircuits. In one of these subcircuits is a normally closed contact CR4-6; in another is a normally open contact CR7-4; and in the third are a normally closed contact CR3-4 and a normally open contact CR25-4. The third subcircuit is the holding circuit for coil CR25.

As described earlier, coil CR4 is energized when switch LS11 is tripped by the leading edge of the glass sheet to close contact LS11-1. Thus during the front edge trim cutting operation, contact CR4-6 in the first subcircuit is open and remains open until the trailing edge of the glass sheet being moved passes beyond switch LS11.

The contact CR7-4 in the second subcircuit is closed when coil CR7 is energized for the front edge trim by the closing of contact TR1-1 through the initiation of relay TR1-1 that results from the closing of switch LS12 as described above. The coil CR7 is deenergized when contact CR9-1 opens through the energization of coil CR9 by the closing of contact CS1-3 in the operation for front edge trimming. Although contact CR9-1 closes later when coil CR9 is deenergized through the energization of coil CR16, coil CR7 is not energized by the closing of contact CR9-1 because of normally closed contact CR18-2, in series with coil CR7, is now open as described above. Thus contact CR7-4 in the second subcircuit is closed only during the front edge trimming operation to initiate energization of coil CR25.

The energization of coil CR25 continues until contact CR3-4 in the holding circuit, i.e., the third subcircuit, is opened by the energization of coil CR3, which, when energized, signals the controller for the receiving conveyor 25 to operate the latter at the high speed, if the newly formed glass sheet, at the head of the remaining portion of the initial glass sheet, is partially on the first section of conveyor 25.

Thus during the front edge trimming operation, contact CR25-3, in series with solenoid SV1, is open and solenoid SV1 cannot be energized. However, after the front edge trimming operation, only the first of the subcircuits can energize coil CR25. This occurs for a rear edge trimming operation by the deenergization of coil CR4 to close contact CR4-6 as described later. Accordingly, in the intermediate or main transverse cutting operations on the glass sheet, contact CR25-3 is closed so that, each time contact TR6-1 is closed through the closing of switch LS6 during each cycle of operation for transverse cutting, solenoid SV1 is energized at the proper time to snap the scored glass sheet.

When switch SW1 is in the second position, contact CR25-3 is by-passed so that solenoid SV1 is energized each time that contact TR6-1 is closed. With switch SW1 in this position, pulleys 42 are raised to snap the glass along the score line during the front and rear edge trims as well as the other intermediate or main transverse cutting operations.

If switch SW2 is moved so that contact SW2–1 is closed and contact SW2–2 is open, coil CR25 is always energized. As a result, contact CR25–3 in series with solenoid SV1 is open so that with switch SW1 in the position shown in FIG. 13B, pulleys 42 are not utilized to snap the glass sheet along the score line in each of the intermediate or main cutting operations. In this event, the sole snapping operation is that afforded by the use of snapper assembly 250 including snapping head 279. The energization of solenoid SV20 is possible in this event because the continued energization of coil CR25 keeps closed contacts CR25–1, 2 in series with solenoids SV15A and SV20.

When contact SW2–2 is closed and contact SW2–1 is open, coil CR25 is energized only for the front edge and rear edge trimming operation. Thus solenoids SV15A and SV20 cannot be energized to advance snapper assembly 250 and to raise snapping head 279 during any of the intermediate cutting operations. Instead, solenoids SV15A and SV20 are energized only when coil CR25 closes contacts CR25–1, 2, during the front edge and rear edge trimming operations.

In view of the foregoing description of the circuits containing SW1 and SW2, it is apparent that there are several choices in the utilization of the snapper assembly 250 with its head 279 and the utilization of rolls or pulleys 42 for the snapping operation. The snapper assembly 250 with its head 279 can be utilized to provide a snap either for all cycles or for only the front edge and rear edge trim cycles. The pulleys 42 can be raised to run the cut along all score lines or to run the cut only for those score lines other than those of front and rear edge trim cycles.

Of course, when snapper assembly 250 is utilized during this cycle of operation for intermediate cutting, the energization of coil CR12 through the closing of switch LS6 deenergizes solenoid SV20 to lower snapping head 279 by the opening of contact CR12–1. The energization of coil CR12 also energizes solenoids SV15B and SV16 and coil CR13 through the closing of contact CR12–3 in series with them and these energizations occur when switch LS9 is closed by the return of snapping head 279 to its lowered position. The energization of coil CR13 results through the energization of relay TR8 and coil CR16 in the closing of contacts CR13–2 to energize coil CR14 and relay TR4, the former for a short period until contact TR4–1 opens. The energization of coil CR14 closes normally open contact CR14–1 to energize SV12 and opens normally closed contact CR14–2 to deenergize solenoid SV8.

The energization of coil CR16 closes contact CR16–2 to energize coil CR17 so that solenoids SV4B and SV6 are energized for the return of cutter support assembly 225. Also, the energization of coil CR16 closes a contact CR16–3 to energize coil CR10 which closes a contact CR10–3 to energize solenoid SV13B for return of carriage 85 to its home position.

Thus the closing of switch LS6 initiates the lowering of snapping head 279, the retraction of snapper assembly 250, the return of cutter support assembly 225, the release of vacuum in rear cups 216, the raising of cups 216 and the return of carriage 85 to its home position in the same manner as described above with reference to the front edge trimming operation.

In the case where snapper assembly 250 is not utilized to snap the glass along the score line for the intermediate cutting operation but rather the raising of pulleys 42 is utilized for this purpose, switch LS9 remains closed from the time snapping head 279 is lowered during the front edge trimming operation. As a result, the closing of switch LS6 by carriage 85 to energize coil CR12 closes contact CR12–3 to immediately energize solenoids SV15B and SV16 and coil CR13. The energization of the two solenoids serves no useful function in this instance. However, the energization of coil CR13 results in the vacuum release and lifting of cups 216 and the return of cutter support assembly 225 and carriage 85 to their home positions as described above.

Figure 13C:
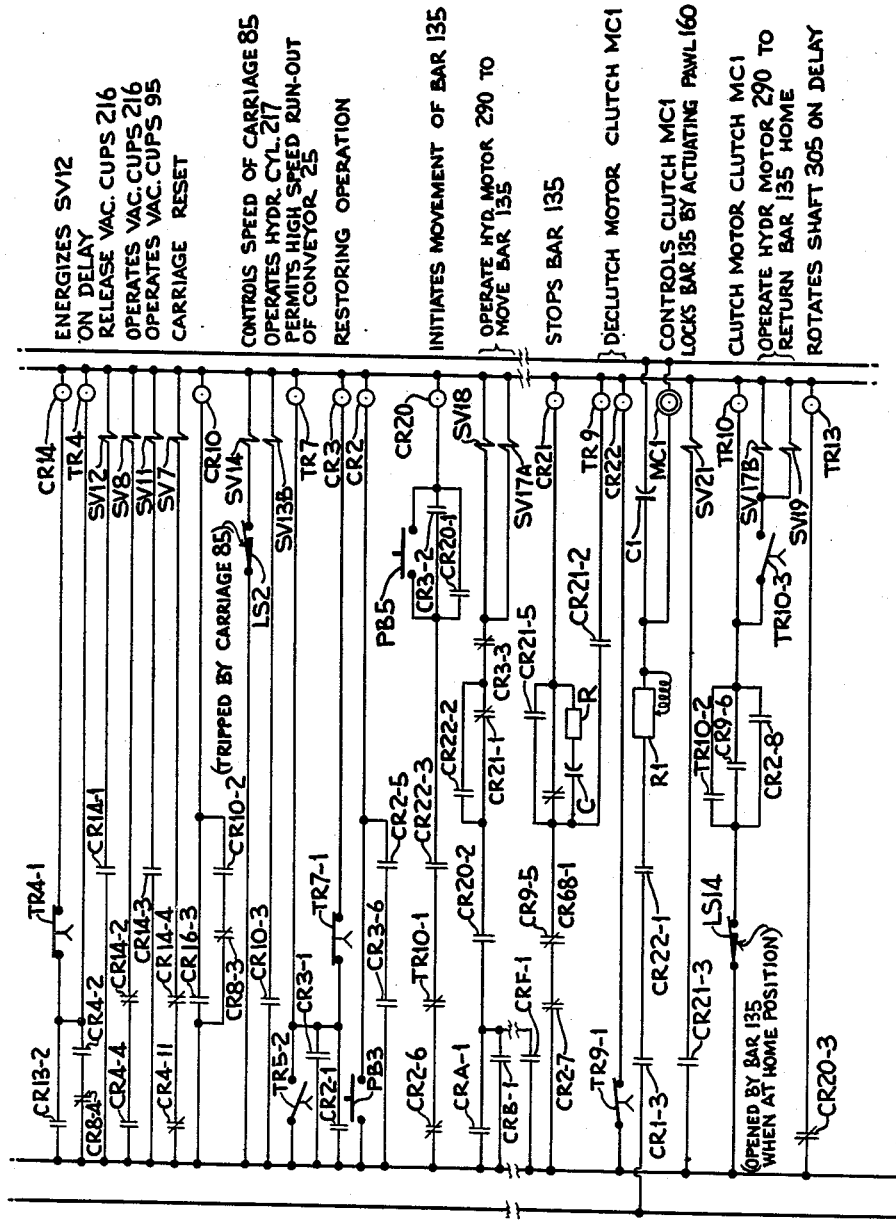

In the cycle of operation for the first main or intermediate cut, the energization of coil CR9 through the closing of cam CS1–3 opens contact CR9–5 in series with coil CR21 (FIG. 13C). This deenergizes coil CR21, thereby opening contact CR21–3 to deenergize solenoid SV21 so that pawl 160 is raised. The deenergization of coil CR21 also opens contact CR21–2 in series with relay TR9. This closes contact TR9–1 for the energization of coil CR22 to close contact CR22–1 for the energization of coil MC1. Clutch MC1 is now engaged. Although the energization of coil CR22 closes contact CR22–3 in series with coil CR20, the latter is not energized at this time because a normally closed contact TR10–1 opened prior to the energization of coil CR22.

A time delay relay TR10 of the on delay type and set for 0.5 second has the contact TR10–1 mentioned above. The relay TR10 is in series with a normally open contact CR9–6 and a normally closed limit switch LS14, which is not shown in FIG. 1 but which is at the extreme right of the apparatus so that bar 135 opens switch LS14 when bar 135 is at its home position. Because bar 135 at the present moment of the cycle of operation is not at its home position, switch LS14 is closed and the energization of coil CR9, which is initiated through the closing of contact CS1–3, closes contact CR9–6 to energize relay TR10. A holding circuit containing a normally open contact TR10–2 keeps relay TR10 energized until switch LS14 is opened by the return of bar 135 to its home position as described below. Accordingly, coil CR20 cannot be energized at this time, and solenoids SV17A and SV18 cannot be energized.

The solenoids SV17B and SV19 are in parallel with each other and in series with a normally open contact TR10–3 of the on delay type. These subcircuits are in parallel with relay TR10 so that, after the delay of relay TR10 and that of contact TR10–3, solenoids SV17B and SV19 are energized to operate motor 290 in the reverse direction. This drives bar 135 to the home position where it opens switch LS14 to deenergize relay TR10 and the opening of contact TR10–3 deenergizes solenoid SV17B and SV19. The motor 290 and bar 135 stop.

Upon the deenergization of relay TR10, contact TR10–1 in series with coil CR20 closes. However, coil CR20 cannot be energized until contact CR3–2, which is also in series with coil CR20, closes. The coil CR3, when energized through the closing of contact TR5–2, provides a signal to the controller for receiving conveyor 25 so that conveyor 25 is changed to high speed. This moves the newly-formed glass sheet away from the remaining portion of the initial glass sheet so that there is a gap between them. The trailing edge of the faster-moving glass sheet moves beyond arm 154 which drops to its lowermost position and bar 135 is now in its home position.

With contact CR3–2 now closed, coil CR20 is energized. If any one of contacts CRA through CRF is closed, coil CR20 energizes solenoids SV17A and SV18 through contact CR20–2. The motor 290 now drives bar 135 in the forward direction until contact CR21–1, in series with solenoids SV17A and SV18, opens through the energization of coil CR21 by the closing of contact CR68–1 in series with it. The contact CR68–1 closes when shafts 305 of binary drum switches 306 and 307 are rotated by motor 290 to the coincidence position called for by the programming to be described later. Arm 154 is now at the position desired to initiate the next cut in the program.

In each cycle of operation for an intermediate or main cut, the reverse operation of motor 290 to return bar 135 to its home position also rotates shafts 305 to their home positions. The contact CR68–1 in series with coil CR21 is opened as described later. The coil CR21 has a holding circuit that includes a normally open contact CR21–5 which is in parallel with contact CR68–1. The deenergization of coil CR21 results from the opening of contact CR9–5 as described earlier.

When switch LS1 (FIG. 13A) is tripped closed by the new leading edge, this initiates the next cycle of operation for an intermediate or main cut. These cycles are performed by the apparatus in accordance with the programming circuits. If the trailing edge of the original glass sheet passes beyond switch LS11 before switch LS1 is closed to initiate a cycle, the cycle of operation when initiated involves the last cut of the glass sheet. The upstream sheet from this last cut is dropped to the cullet hopper by lowering pulleys 42. This cycle of operation for a last cut with a cullet drop is a rear edge trim cut and is described later. It is not necessarily involved in the utilization of the apparatus for the transverse cutting of a glass sheet. Of course, it is never involved when the apparatus is utilized for the transverse cutting of a moving continuous glass ribbon.

During each cycle of operation for a main transverse cut, switch LS1 is closed from the time of its initial tripping by the leading edge of the glass sheet until the time of the return of bar 135 to its home position and the provision of the gap behind the newly-formed glass sheet moving rapidly on receiving conveyor 25. For each cycle, the closing of switch LS1 energizes solenoid SV3 and coil CR24. However, they are deenergized by the opening of contact CR9–7. The contact CR9–7 closes initially upon the deenergization of coil CR9 when contact CR16–1 in the holding circuit for coil CR9 opens in a previous cycle of operation. To prevent the re-energization of solenoid SV3 and coil CR24 during any cycle after initiation by the tripping of switch LS1, a normally closed contact CR26–1 is in series with solenoid SV3 and coil CR24. The contact CR26–1 opens simultaneously with the opening of contact CR9–7 in series with it because coil CR26 of a relay having the contact CR26–1 is in series with a normally open contact CR9–8 which, of course, closes when the normally closed contact CR9–7 opens to deenergize solenoid SV3 and coil CR24.

In parallel with normally open contact CR9–8 is a holding circuit for coil CR26. The holding circuit has normally open contacts CR23–1 and CR26–2. The contact CR23–1 closed when switch LS1 closed to energize coil CR23 simultaneously with the energization of solenoid SV3 and coil CR24. The holding circuit prevents the energization of solenoid SV3 and coil CR24 until contact CR23–1 opens. This occurs only when switch LS1 opens. Then the closing of normally closed contact CR26–1 cannot result in the energization of solenoid SV3 and coil CR24 until switch LS1 is closed to initiate a new cycle.

When the trailing edge of the original glass sheet passes beyond switch LS11, contact LS11–1 (FIG. 13A) opens and a normally closed contact LS11–2 closes. The energization of coil CR4 continues because of its holding circuit, which is in parallel with contact LS11–1 and which includes normally open contacts CR4–7 and CR8–6. In parallel with contact CR8–6 is a normally open contact CR9–9. Contact CR8–6 closes during a cycle of operation for a main cut when switch LS1 closes. The contact CR8–6 opens when coil CR9 is energized through the closing of contact CS1–3 in the cycle of operation. However, at that time contact CR9–9 closes. This holding circuit keeps coil CR4 energized until coil CR9 is deenergized by the energization of coil CR16 during the restoring operation of the cycle. This happens when contact TR8–2 is opened, as described earlier.

The deenergization of coil CR4 opens a normally open contact CR4–1 in series with coil CR7 to prevent the energization of the latter until switch LS11 is tripped by the leading edge of the next glass sheet. The deenergization of coil CR4 opens contact CR4–5 in series with coil CR18 which, when energized, functioned as an edge trim anti-repeat relay.

The deenergization of coil CR4 opens contacts CR4–3, 2 in series with solenoids SOL2 and SV10 and closes normally closed contacts CR4–8, 9 in series with solenoids SOL1 and SV9. The subsequent closing of switch LS1 to energize solenoid SV3 operates single-revolution clutch 112 to accelerate carriage 85, as described above, and to close contacts CS1–1, CS1–2 and CS1–3 in sequence, as described above, to initiate the cutting, snapping, etc. The closing of contact CS1–1 now energizes solenoid SV9 to connect front vacuum cups 195 to the vacuum source. The closing of contact CS1–2 now energizes solenoid SOL1 so that front cups 195 are lowered onto the glass sheet.

As in the previous cycles of operation, the closing of contact CS1–3 energizes coil CR9. This closes a normally open contact CR9–10 which is in series with a normally closed contact CR12–5 and the subcircuits containing solenoid SV9 and SV10 which are also in series with contact CS1–1. As a result, the subcircuit containing contacts CR9–10 and CR12–5 keeps solenoid SV9 energized until contact CR12–5 is opened by the energization of coil CR12 through the closing of switch LS6 by carriage 85, which occurs after the scoring and snapping operations of the cycle. Thus solenoid SV9 is energized for the same period of time that solenoid SV10 is energized during its utilization in the previous cycles of operation for the front edge trim cut and the main cuts.

The contact LS11–2, which is closed simultaneously with the opening of contact LS11–1, is in series with a coil CR27 (FIG. 13B) of a relay, normally closed contacts CR3–5 and CR4–10, and a normally open contact CR11–2. The contact CR4–10 closes when coil CR4 is deenergized (when coil CR9 is deenergized shortly after switch LS9 is closed during the restoring operation). The closing of contact CR11–2 by the energization of coil CR11 happens after a delay through the energization of relay TR2 when switch LS3 is tripped by cutter support assembly 225 after the movement of cutter wheel 231 across the glass sheet. Thus the closing of contact CR4–10 energizes coil CR27. A normally open contact CR27–1 is in a holding circuit that is in parallel with contacts CR4–10, CR11–2 and LS11–2. Thus coil CR27 remains energized until contact CR3–5 opens when coil CR3 is energized to signal the high speed run out.

The energization of coil CR27 closes a normally open contact CR27–2 in series with a normally open contact CR25–5, a time delay relay TR11 of the off delay type and set for one second, and the normally open contact TR6–1 in series with relay TR5 and solenoid SV1. As described earlier, coil CR25 is energized when contact CR4–6 closes, if switch SW2 is in the position shown in FIG. 13B where contact SW2–2 is closed. This is the situation because coil CR4 is now deenergized as described above. Of course, if contact SW2–1 is closed, coil CR25 is always energized. With contact CR25–5 now closed, the subsequent closing of contact CR27–2 through the energization of coil CR27 now permits the energization of relay TR11 when contact TR6–1 closes.

The solenoid SV2 is in series with a normally open contact TR11–1 of the off delay type and a normally closed contact TR11–2. The normally open contact TR11–1 closes simultaneously with the opening of the normally closed contact TR11–2 upon the energization of relay TR11 so that at this time there is no energization of solenoid SV2.

As described earlier, the closing of contact TR6–1 energizes relay TR5 to close contact TR5–2, after a delay, for the energization of relay TR7 which is used to permit the high speed runout operation of receiving conveyor 25 to provide a gap between the newly-formed sheet and the remaining portion of the initial sheet.

When coil CR27 is energized by the closing of contact CR11–2, the operation of snapper assembly 250, including snapping head 279, is completed. At about the time of the raising of snapping head 279, the contact TR6–1 closed to energize solenoid SV1 through switch SW1 if that switch and switch SW2 are positioned to provide a snapping action by the raising of pulleys 42. When pulleys 42 are moved to the maximum raised position, one of plates 58 closes a normally open limit switch LS15 in series with contact TR6–1 and time delay relay TR12 which has a normally closed contact TR12–1 of the on delay type and a normally open contact TR12–2 (both of which are not shown) in the controller circuit for receiving conveyor 25. As a result, the energization of relay TR12 closes normally open contact TR12–2 instantaneously and after a delay opens normally closed contact TR12–1, thereby giving a short pulse of energy to the controller for receiving conveyor 25. This arrangement assures that the controller for receiving conveyor 25 is not converted from slow speed to high speed until plates 58 at their maximum raised position close switch LS15. The pulse is of short duration because normally closed contact TR12–1 opens after its delay.

When contact TR6–1 opens through the deenergization of TR6, as described earlier, relay TR5 is deenergized to open contact TR5–2 in series with relay TR7 and coil CR3, but normally open contact CR3–1 in parallel with contact TR5–2 maintains relay TR7 energized until contact TR7–1 in series with coil CR3 opens. The deenergization of coil CR3 opens contact CR3–5 in series with coil CR27. The deenergization of coil CR27 closes normally closed contact TR11–2 instantaneously but normally open contact TR11–1 does not open until after the one second delay. As a result, solenoid SV2 is energized for one second to drop pulleys 42. During this period of time the rear edge trim sheet is moved to the left (as viewed in FIG. 1) by belts 41 and is dropped into the cullet hopper before pulleys 42 are raised to their intermediate or home position.

Before coil CR24 is deenergized, solenoids SV7 and SV11 are deenergized and energized, respectively, to release the vacuum in the front vacuum cups 195 and to raise these cups. The deenergization and the energization of these solenoids occurs as a result of carriage 85 closing switch LS6 for the energization of coil CR12 to close contact CR12–3 for the energization of coil CR13. The contact CR13–2 closes for the energization of relay TR4 and the brief energization of coil CR14. The latter energization closes a normally open contact CR14–3 in series with solenoid SV11 and opens a normally closed contact CR14–4 in series with solenoids SV7. A normally closed contact CR4–11, also in series with solenoid SV7, is open while contact LS11–1 is closed but closed when the trailing edge of the original glass sheet passed beyond switch LS11. Of course, the carriage 85 and bar 135 are returned to their home positions through the use of the circuits previously described in connection with a cycle of operation for a main cut.

In order to prevent a front edge trim cut of a glass sheet, an operator can open a switch SW3 in series with relay TR1. This prevents the energization of relay TR1 which is required to close contact TR1–1 for the energization of coil CR7 to initiate the front edge trim cutting operation as described earlier.

It is recalled that in series with contact TR1–1, there is a contact CR4–1 that must be closed through the energization of coil CR4 by the closing of contact LS11–1 and a normally closed contact CR18–2 of the anti-repeat front edge trim relay. To avoid the requirement of the closing of contacts TR1–1, CR4–1 and CR18–2 for the energization of coil CR7, a cutting operation can be manually initiated by the energization of coil CR7 through the closing of push-button switch PB4 described earlier.

In order to prevent the apparatus from carrying out any cutting operation on a glass sheet being passed from feeding conveyor 32 to receiving conveyor 25 via belt conveyor 40, a switch SW4 is opened. The switch SW4 is in series with solenoid SV3 and coil CR24. At the same time, to prevent the cutting operation, an operator opens a switch SW5 in series with coils CR7 and CR8 and solenoids SOL1 and SOL2.

As described earlier, coil CR2 is energized to initiate a restoring operation on the apparatus by manually closing switch PB3. This opens a normally closed contact in series with switch SW5, thereby deenergizing coil CR8. The energization of coil CR2 also closes a normally open contact CR2–4 in series with coil CR12, and this initiates the restoring function that would otherwise be initiated by the closing of switch LS6 by carriage 85. The contact CR3–1 in series with relay TR7 and coil CR3 is also closed to permit the high speed run out of receiving conveyor 25 to provide a gap between the two sheets resulting from a cutting operation that might have immediately preceded the closing of switch PB3. Although coil CR2 is deenergized as soon as switch PB3 is opened, contacts CR2–5 and CR3–6 in the holding circuit continue the energization of coil CR2 until contact CR3–6 opens. Of course, after a delay, coil CR3 is deenergized by the opening of contact TR7–1, in series with it, as described earlier.

The energization of coil CR2 opens a normally closed contact CR2–6 in series with coil CR20 which must be energized to move bar 135 forward and the energization of coil CR2 opens a normally closed contact CR2–7 in series with coil CR21 and relay TR9. This results in the engagement of electric clutch MC1 and the deenergization of solenoid SV21 so that pawl 160 is raised. The energization of coil CR2 closes a normally open contact CR2–8 in series with relay TR10 and solenoids SV17B and SV19. The last contact CR2–8 is in parallel with contact TR10–2 of the holding circuit for relay TR10. As a result, after a delay required by the closing of contact TR10–3 of the on delay type, solenoids SV17B and SV19 are energized to return bar 135 to its home position when switch LS14 opens to deenergize relay TR10 and solenoids SV17B and SV19.

When coil CR2 is deenergized through the deenergization of coil CR3, contacts CR2–6 and CR3–2 in series with coil CR20 close and open, respectively. Of course, contact CR20–1 of the holding circuit for coil CR20 opened when contact CR2–6 opened. The contact CR3–2 will not close until contact TR5–2 closes to energize coil CR3. This normally occurs during the completion of a cycle of operation of cutting and serves to move the bar 135 forward from its home position. Because the operator momentarily closes switch PB3 to energize coil CR2 for the purpose of initiating a restoring operation, it is necessary to initiate the circuit for the movement of bar 135 now rather than waiting for the closing of contact CR3. Accordingly, an operator momentarily closes a normally open push-button switch PB5 in series with coil CR20 and in parallel with contact CR3–2. The switch PB5 is also in parallel with contact CR20–1 of the holding circuit.

As described earlier, the coil CR16 is energized during each cycle of operations by the closing of contact TR8–2 through the energization of relay TR8. The relay TR8 is used to provide a delay in the initiation of the return of carriage 85 to its home position. The holding circuit for relay TR8 maintains its energization until the opening of a normally closed contact CR10–4 in series with contact TR8. This occurs when contact TR8–2 after its delay closes to energize coil CR16–3 which closes contact CR16 in series with coil CR10 to energize the latter.

A time delay relay TR13 of the on delay type set for 0.5 second is in series with a normally closed contact CR20–3. As described above, coil CR20 is energized each time that coil CR3 is energized to close a normally open contact CR3–2 in series with coil CR20. The energization of coil CR20 is maintained through a normally open contact CR20–1 in its holding circuit. The coil CR20 is deenergized when a normally closed contact TR10–1, in series with coil CR20 and with the holding circuit having contact CR20–1, opens through the energization of relay TR10 to return bar 135. As described above, this occurs during a cycle of operation when the energization of coil CR9 is initiated by the closing of contact CS1-3. From that moment contact CR20-3, in series with coil TR13, is open so that coil TR13 is deenergized. This condition remains until the bar 135 returns to its home position when the opening of switch LS14 deenergizes relay TR10 to close contact TR10-1 in series with coil CR20. After contact TR10-1 closes, coil CR20 is energized by the closing of contact CR3-2. This opens contact CR20-3 in series with relay TR13 to deenergize the latter. Thus, during the period beginning with the initiation of energization of relay TR10 for the purpose of driving bar 135 to its home position and ending when coil CR3 is energized to close contact CR3-2, coil CR20 is not energized so that contact CR20-3 is closed and relay TR13 is energized.

A stepping switch SS1 has a coil SS1 and three levels, SS1L1, SS1L2 and SS1L3. Eeach level has a bank of 11 contacts and wipers W1, W2 and W3. In each level, wipers W2 and W3 are mounted on the shaft of switch SS1 at an angle of 120° from each other and from wiper W1. With this arrangement, when wiper W1 of level SS1L1 is on the last contact of the bank of contacts of that level, wiper W2 is one step away from the first contact of the bank. When wiper W1 moves one step away from the last contact, wiper W2 is stepped into engagement with the first contact of the bank. When wiper W2 moves one step away from the last contact, wiper W3 steps into engagement with the first contact. When wiper W3 moves one step away from the last contact, wiper W1 steps into engagement with the first contact.

Figure 13D:
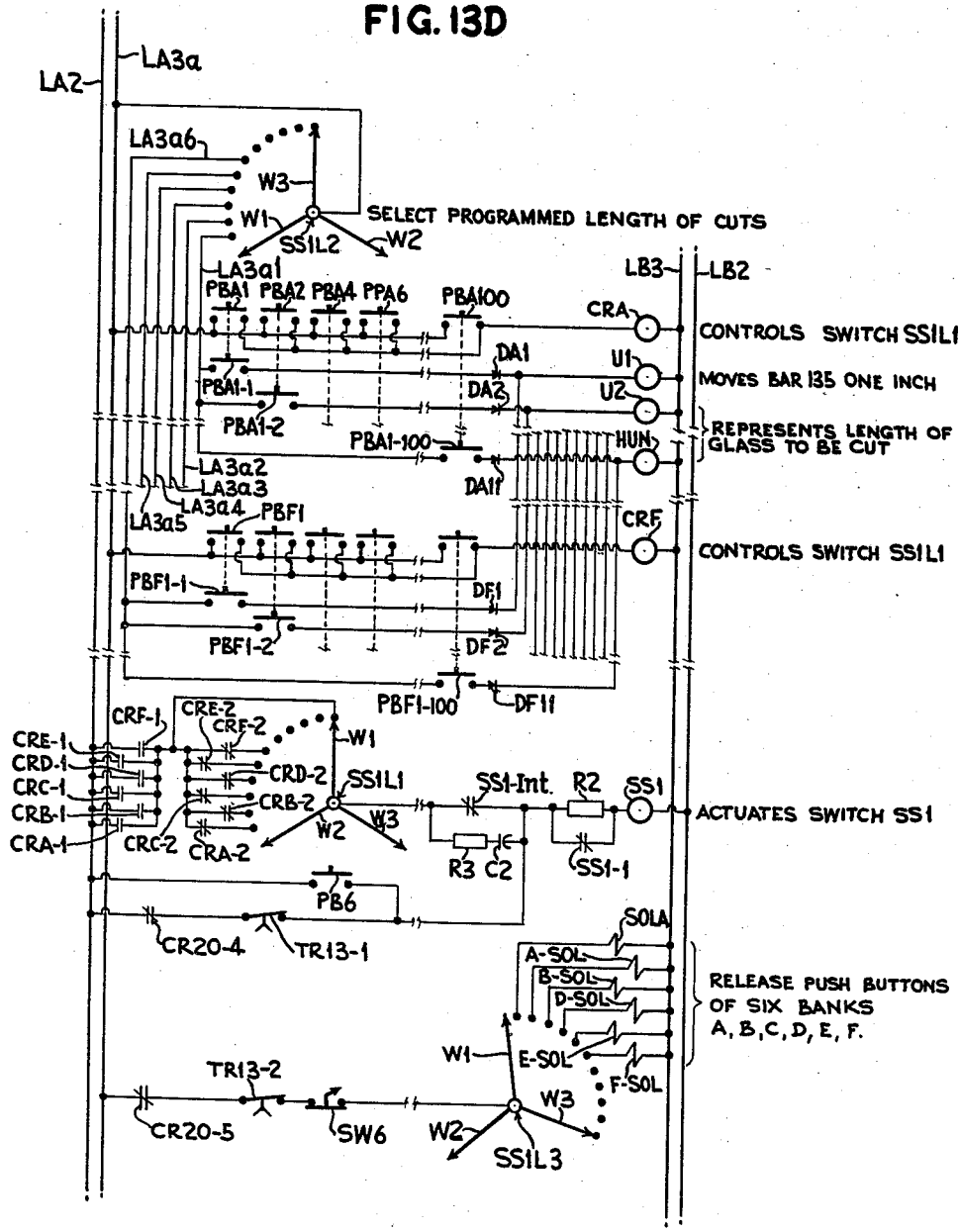
Figure 13E:
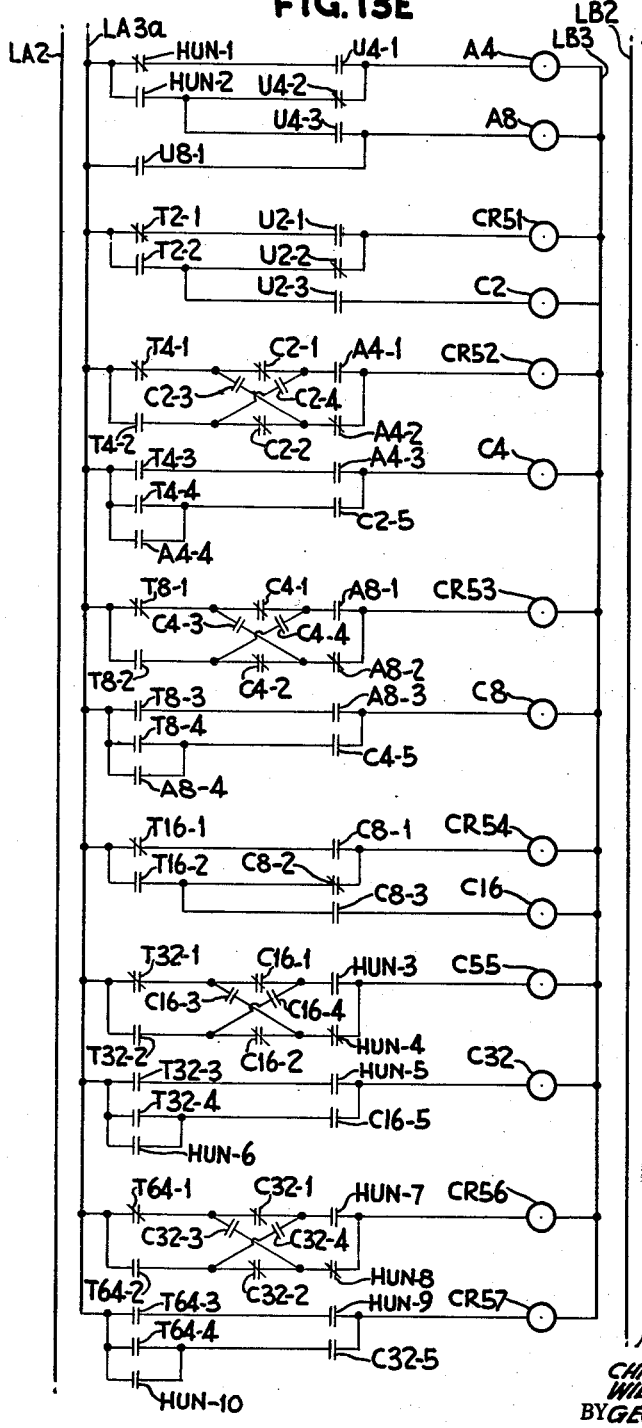

The relay TR13 is used with coil CR20 to change the program of cutting in the following manner. In series with coil SS1 are a normally closed contact CR20-4 and a normally closed contact TR13-1 of the on delay type (FIG. 13D). When coil CR20 is deenergized, as described above, normally closed contact CR20-4, in series with coil SS1, closes to energize coil SS1 to cock switch SS1. At the same time, normally closed contact CR20-3, in series with relay TR13, closes to initiate the latter. As a result, after its delay, normally closed contact TR13-1 opens to deenergize coil SS1 and switch SS1 moves one step. Thus, the circuit containing coil SS1 and normally closed contacts CR20-4 and TR13-1 is used to operate stepping switch SS1 one step. At any time it is desired to advance the program, an operator momentarily closes a normally open push-button switch PB6 which is in parallel with normally closed contacts CR20-4 and TR13-1 and is in series with coil SS1.

Between contact TR13-1 and coil SS1 is a resistor R2. In parallel with resistor R2 is a normally closed contact SS1-1. This arrangement permits the use of a maximum voltage to energize coil SS1 through contact SS1-1, but when coil SS1 is energized, contact SS1-1 opens. The continued energization of coil SS1 is through resistor R2 and thus is at a lower voltage so that if current would flow for an extended period it is at low voltage. This arrangement protects coil SS1. Current continues to flow through resistor R2 until contact TR13-1 opens to deenergize coil SS1. This operates switch SS1 to provide one step of its movement.

Switch SS1 has no home position. It stops only when one of wipers W1, W2 and W3 of level SS1L1 steps to a nonenergized contact of the bank of contacts of that level.

The seventh through eleventh contacts of that bank are connected to one another, and the eleventh contact is connected to line LA3a through six parallel circuits, each of which contains only one normally open contact. These contacts in the six parallel circuits are designated CRA-1, CRB-1, CRC-1, CRD-1, CRE-1 and CRF-1. Thus, if any one of contacts CRA-1 through CRF-1 is closed, the seventh through eleventh contacts are energized.

The six parallel circuits containing the normally open contacts CRA-1 through CRF-1 are connected to the first, second, third, fourth, fifth and sixth contacts of the bank of level SS1L1 through normally closed contacts CRA-2, CRB-2, CRC-2, CRD-2, CRE-2 and CRF-2, respectively. The normally open contacts CRA-1 through CRF-1 and normally closed contacts CRA-2 through CRF-2 are in six relays having coils CRA through CRF.

An interruptor switch SS1-Int is in series with coil SS1 and the wipers of level SS1L1 of the stepping switch. In parallel with switch SS1-Int and in series with coil SS1 and the wipers of level SS1L1 are a resistor R3 and a condenser C2. This parallel circuit containing the resistor R3 and condenser C2 prevents damage to contact SS1-Int when it opens. This occurs each time that coil SS1 is energized to cock the stepping switch. As seen in FIG. 13D, coil SS1 is connected to line LB2 and is connected to Line LA2 either through contacts CR20-4 and TR13-1 or through one of the wipers and one contact of the bank of contacts of level SS1L1 and one or more of the parallel circuits containing normally open contacts CRA-1 through CRF-1. Of course, if one of the wipers engages one of the first six contacts of the bank of contacts, this 115-volt direct current flows through one of the circuits containing normally closed contacts CRA-2 through CRF-2 to energize coil SS1. This results in cocking switch SS1 and opening contact SS1-Int so that switch SS1 moves one step. This operation is repeated until one of the wipers reaches a nonenergized contact of the first six contacts of the bank of contacts.

In the illustrative embodiment, wipers W1, W2 and W3 of level SS1L2 of the stepping switch are connected to line LA3a. The first, second, third, fourth, fifth and sixth contacts of the bank of contacts of level SS1L2 are connected to lines LA3a1, LA3a2, LA3a3, LA3a4, LA3a5 and LA3a6, respectively.

In the illustrative embodiment of the apparatus, a program of cutting can be selected to set up a sequence of six lengths of cutting to be made on a glass sheet or ribbon. To accomplish this the apparatus has six banks of push buttons and associated push-button switches. These banks are designated A, B, C, D, E and F. Each of the banks has 14 push buttons and 14 push-button associated switches which are similarly designated. In the case of bank A, both the 14 push buttons and the 14 push-button switches are designated PBA1, PBA2, PBA4, PBA6, PBA8, PBA10, PBA20, PBA30, PBA40, PBA50, PBA60, PBA70, PBA80, PBA90 and PBA100. Each of these push-button switches of a bank has a stack of contacts. The first contact of each of the push-button switches of a bank is designated the same as that for the push-button switch. Each of the push-button switches has a normal position in which each contact of its stack is open. Each of the push buttons when depressed locks into position where the switch is closed and the contacts of its stack are closed. The push buttons of a bank are accumulative locking with a solenoid-actuated release mechanism that unlocks all of the push buttons of a bank. Thus, an operator can press one or more of the push buttons of the bank in any sequence or together to lock the associated push-button switches and their stacks of contacts in the closed position. All of those thus locked are released upon the energization of the solenoid associated with that bank.

The solenoids that release the push buttons of the six banks, A, B, C, D, E and F, are designated A-SOL, B-SOL, C-SOL, D-SOL, E-SOL, and F-SOL, respectively; the latter are connected to the first, second, third, fourth, fifth and sixth contacts, respectively, of the bank of contacts of level SS1L3 of the stepping switch and are connected to line LB3. The wipers W1, W2 and W3 of level SS1L3 of the stepping switch are connected to line LA3a through a normally closed contact CR20-5, a normally closed contact TR13-2 of the on delay type, and a selector switch SW6 which is in the closed position as indicated in FIG. 13D for the selective operation of cutting using the programming afforded by the banks of contacts. With switch SW6 in the closed position, the closing of contact CR20–5 and the delay in the opening of contact TR13–2 energizes the release solenoid at the same time that coil SS1 is energized.

To convert to an operation known as cordwood cutting, an operator opens switch SW6 so that, when wiper W1 of level SS1L3 is in contact with any one of the first six contacts, the solenoid associated with that contact of the bank of contacts cannot be energized to release the bank of push-button switches associated with that solenoid. As a result, each of the subsequent cutting operations will be carried out with a length of cut equal to that called for by the program initiated immediately before the operator opened switch SW6.

The first contact of each push-button switch of a bank is connected to the first contact of the other push-button switches of that bank and to lines LA3a and LB3 in the manner shown in FIG. 13D so that the closing of any one or more of the first contacts of the push-button switches of a bank results in the flow of current through a coil of a relay because that coil is in series with the first contacts of that bank of push-button switches. These coils for the six banks are coils CRA through CRF described above in connection with the six parallel circuits having normally open contacts CRA–1, CRB–1, CRC–1, CRD–1, CRE–1 and CRF–1 and the six parallel circuits having normally closed contacts CRA–2, CRB–2, CRC–2, RCD–2, CRE–2 and CRF–2. Thus for bank A, the closing of any one of push-button switches PBA1, PBA2, etc., closes the corresponding contacts PBA1, PBA2, etc., resulting in the energization of coil CRA. The energization of any one of coils CRB, CRC, CRD, CRE and CRF results from the closing of any one or more of the push-button switches in the corresponding bank.

Figure 14B:
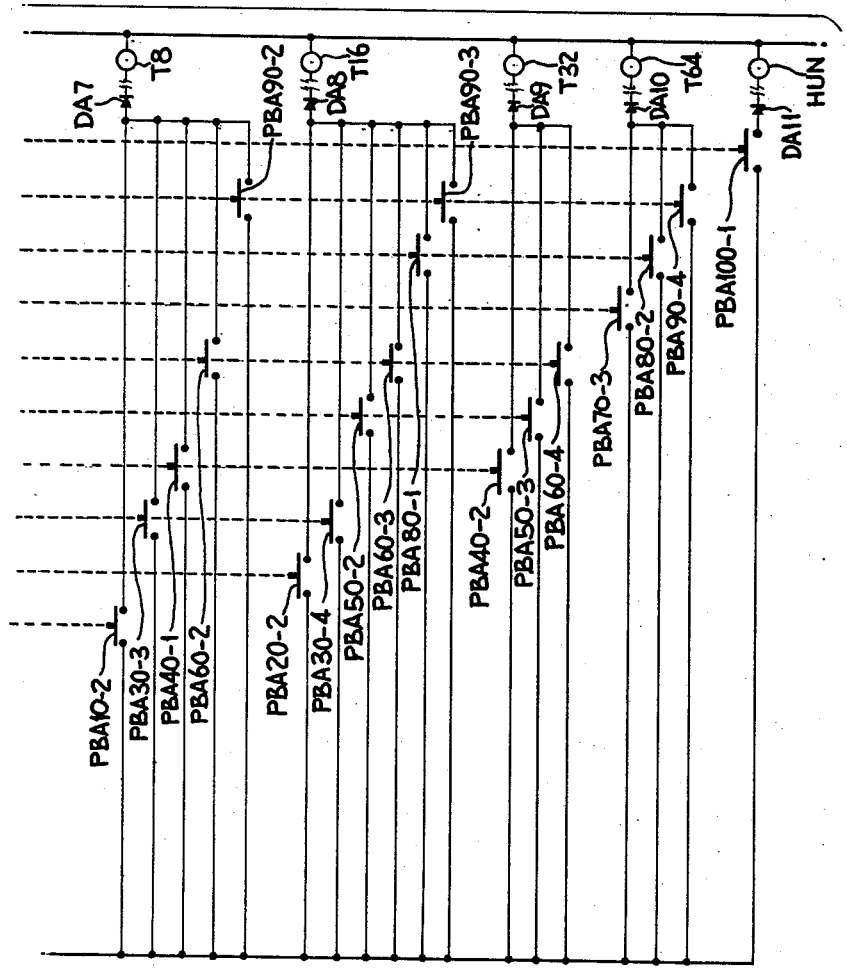

For each bank of push-button switches, the contacts, other than the first contact, of each stack are normally open and are utilized in the manner shown in FIG. 14 of bank A. The contact PBA1–1 in the stack with contact PBA1 is in series with a diode DA1 and line LA3a1 to provide a circuit which is connected through a coil U1 of a relay to line LB3, so that when wiper W1 of level SS1L2 engages the first contact of the bank of contacts of that level of the stepping switch, current flows through line LA3a1 and contact PBA1–1, if closed, to energize coil U1. With wiper W1 of level SS1L2 in this position, line LA3a1 is energized and current can flow also through the other closed contacts of the stacks of contacts of bank A to energize coils of relays as described below.

The closing of push-button switch PBB1 closes contact PBB1 to energize coil CRB. It also closes contact PBB1–1 which is in series with a diode DB1 and line LA3a2 to provide a circuit which is in parallel with the circuit containing contact PBA1–1, diode DA1 and line LA3a1 and which is in series with coil U1. A similar arrangement is provided for the second contact of the stack of contacts of the first push-button switch of the other banks of push buttons and push-button switches. In each case, the current flows unidirectionally through a diode to coil U1. For example, as seen in FIG. 13D, contact PBF1–1 is connected to line LA3a6 and is connected through diode DF1 to coil U1.

The energization of coil U1 operates a means (not shown) to move bar 135 downstream one inch from its position of coincidence after the presence of the bar at the position of coincidence has been utilized to energize coil CR21. The normal program of cutting of a glass sheet is based on the use of one or more of the push-button switches for each bank except the first push-button switch PBA1. The circuits affected by the closing of push buttons are based on the operation of the apparatus to cut transversely a moving glass sheet or moving continuous ribbon to produce a glass sheet having a length of two inches or a multiple of two inches measured in the direction of travel of the glass sheet. The energization of coil U1 is only utilized if the cut to be made is to produce a length that is one inch more than two inches or a multiple of two inches. In this case, an operator closes the appropriate push-button switches of that bank of push buttons to provide a total value equal to the length to be cut minus one inch and then the operator adds one inch to the value by closing the first push button of the bank to energize coil U1. For example, if the length to be cut is 61 inches and the program is to utilize bank C of push buttons, the operator closes switch PBC60 and PBC1.

Instead of utilizing the energization of coil U1 to operate a means for the movement of bar 135 downstream from its position of coincidence, coil U1, when energized, can open a normally closed contact (not shown) in series wtih switch LS1 and close a normally open contact (not shown) in a circuit in parallel with switch LS1. In the latter circuit would be a normally open limit switch which would be closed by an arm similar to arm 154 and located one inch downstream from arm 154. As a result, when coil U1 is energized, the glass sheet produced will be one inch longer than indicated by the coincidence position of bar 135.

The contacts of the stack of contacts associated with the push-button switches of the six banks are connected to coils U2, U4, U8, T2, T4, T8, T16, T32, T64 and HUN of relays. All of these coils are connected to line LB3. The connections of these coils to the contacts of the stacks of contacts of bank A are shown in FIG. 14. The connections of the contacts of the stacks of contacts of the other banks are shown schematically in FIG. 14D.

Referring again to FIG. 14, a second contact PBA2–1 of the stack of contacts associated with switch PBA2 is connected to line LA3a1 and a diode DA2 to provide a circuit in series with coil U2.

A second contact PBA4–1 of the stack of contacts associated with switch PBA4 is connected to line LA3a1 and a diode DA3 to provide a circuit in series with coil U4.

The stack of contacts associated with switch PBA6 has second and third contacts PBA6–1 and PBA6–2. The contact PBA6–1 is in parallel with contact PBA2–1 between diode DA2 and line LA3a1. The contact PBA6–2 is in parallel with contact PBA4–1 between diode DA3 and line LA3a1.

A second contact PBA8–1 of the stack of contacts associated with switch PBA8 is connected to line LA3a1 and a diode DA4 to provide a circuit in series with coil U8.

Second contacts PBA10–1, PBA30–1, PBA50–1, PBA70–1 and PBA90–1 of the stacks of contacts associated with switches PBA10, PBA30, PBA50, PBA70 and PBA90, respectively, are in subcircuits in parallel with one another. These subcircuits are connected to line LA3a1 and a diode DA5 to provide a circuit in series with coil T2.

A second contact PBA20–1, a third contact PBA30–2, a second contact PBA60–1 and a third contact PBA70–2 of the stacks of contacts associated with switches PBA20, PBA30, PBA60 and PBA70, respectively, are in subcircuits in parallel with one another. These subcircuits are connected to line LA3a1 and a diode DA6 to provide a circuit in series with coil T4.

A third contact PBA10–2, a fourth contact PBA30–3, a second contact PBA40–1, a third contact PBA60–2, and a third contact PBA90–2 of the stacks of contacts associated with switches PBA10, PBA30, PBA40, PBA60 and PBA90, respectively, are in subcircuits in parallel with one another. These subcircuits are connected to line LA3a1 and a diode DA7 to provide a circuit in series with coil T8.

A third contact PBA20–2, a fifth contact PBA30–4, a third contact PBA50–2, a fourth contact PBA60–3, a second contact PBA80–1 and a fourth contact PBA90–3 of the stacks of contacts associated with switches PBA20, PBA30, PBA50, PBA60, PBA80 and PBA90, respectively, are in subcircuits in parallel with one another. These subcircuits are connected to line LA3a1 and a diode DA8 to provide a circuit in series with coil T16.

A third contact PBA40–2, a fourth contact PBA50–3 and a fifth contact PBA60–4 of the stacks of contacts associated with switches PBA40, PBA50 and PBA60, respectively, are in subcircuits in parallel with one another. These subcircuits are connected to line LA3a1 and a diode DA9 to provide a circuit in series with coil T32.

A fourth contact PBA70–3, a third contact PBA80–2 and a fifth contact PBA90–4 of the stacks of contacts associated with switches PBA70, PBA80 and PBA90, respectively, are in subcircuits in parallel with one another. These subcircuits are connected to line LA3a1 and a diode DA10 to provide a circuit in series with coil T64.

A second contact PBA100–1 of the stack of contacts associated with switch PBA100 is connected to line LA3a1 and a diode DA11 to provide a circuit in series with coil HUN.

In view of the circuits illustrated in FIG. 14 and described above, it is apparent that an operator can energize one or more of coils U2, U4, U8, T2, T4, T8, T16, T32, T64 and HUN, which represent lengths of 2, 4, 8, 2, 4, 8, 16, 32, 64 and 100 inches, by moving one or more of the push buttons in one of the banks to close the corresponding switches and stacks of contacts. This energization occurs when one of lines LA3a1, LA3a2, LA3a3, LA3a4, LA3a5 and LA3a6 associated with that bank of push buttons is energized through the engagement of wiper W1 of level SS1L2 with the corresponding contact of the bank of contacts of that level of the stepping switch. For example, assuming that the stepping switch is stopped at a position so that wiper W1 of level SS1L2 engages the first contact of the bank of contacts of that level, line LA3a1 is energized. Assuming a transverse cut is to be made 66 inches upstream of the leading edge of the glass sheet, an operator presses buttons PBA6 and PBA60 to lock them. This closes switches PBA6 and PBA60 so that the stack of contacts associated with them are closed. Because contacts PBA6 and PBA60 are closed, coil CRA is energized. Of course, the closing of either one of these contacts energizes coil CRA.

For this 66-inch cut, contacts PBA6–1 and PBA6–2 are closed and coils U2 and U4 are energized. The contacts PBA60–1, PBA60–2, PBA60–3 and PBA60–4 are closed to energize coils T4, T8, T16 and T32.

During the time that these coils are energized through the energization of line LA3a1 and the closing of switches PBA6 and PBA60, the operator may have pressed one or more of the push buttons of one or more of the other banks of push buttons. Assuming that the operator pressed push buttons PBB70 of bank B, PBC80 of bank C, PBD90 of bank D, PBE100 of bank E and button PBF8 of bank F, all of the stacks of contacts associated with the corresponding push-button switches are closed. The lines LA3a2, LA3a3, LA3a4, LA3a5 and LA3a6 are not energized at this time by one of the wipers of level SS1L2, but the closing of these push buttons of banks B through F would result, except for the presence of the 11 diodes in each of the circuits for the banks, in the energization of lines LA3a2, LA3a3 and LA3a4. The resultant energization of coils T2 and T64 is not called for the program in bank A. This undesired condition resulting from the absence of the diodes is explained below.

The closing of switch PBB70 closes contacts PBB70–1, PBB70–2 and PBB70–3. In the absence of diode DB6, current flowing through contact PBA60–1 to energize coil T4 also flows through contact PBB70–2 to energize line LA3a2 so that current flows through contact PBB70–1 to energize coil T2 and through contact PBB70–3 to energize coil T64. Similarly in the absence of the diodes, the closing of switch PBC80 results in the flow of current through contact PBC80–1 to energize line LA3a3 for the flow of current through contact PBC80–2 to energize coil T64. The closing of contact PBD90 would result, in the absence of the diodes, in the reverse flow of current through contacts PBD90–2 and PBD90–3 to energize line LA3a4. As a result, current would flow through contact PBD90–1 to energize coil T2 and would flow through contact PBD90–4 to energize coil T64.

The closing of switch PBE100, in this example, does not result in the energization of line LA3a5 because only two contacts of the stack of contacts associated with switch PBE100 are utilized, and of these only contact PBE100–1 is in a circuit of the type shown in FIG. 14. It is apparent that there is no possibility in this example, in the absence of a diode, of a reverse flow through a contact associated with switch PBE100 to energize line LA3a5 for the energization of coil HUN through contact PBE100–1. Similarly the closing of switch PBF8, in this example, does not result in the energization of line LA3a6 to produce a flow of current through contact PBF8–1 for the energization of coil U8 in the absence of diodes in the circuits.

In the illustrative embodiment, coils U1, U2, U4, U8, T4, T8, T16, T32, T64 and HUN are connected to the stacks of contacts of the push-button switches of the six banks so that the 66 diodes are required for the reason described above. The requirement for the 66 diodes can be avoided by the use of an alternative circuit arrangement using 11 additional levels of the stepping switch, each level of which has three wipers as in the case of level SS1L1. In this instance, the first contact of the bank of contacts of each of these 11 levels is connected to one of the 11 circuits of bank A that are connected in the illustrative embodiment to diodes DA1 through DA11. The 11 circuits that are connected in the illustrative embodiment to diodes DB1 through DB11 are connected to the second contacts of the 11 additional levels of the stepping switch. The 11 circuits of each of banks C, D, E and F are similarly connected in this case to the third, fourth, fifth, and sixth contacts of the bank of contacts of the 11 additional circuits instead of through the additional sets of 11 diodes.

The 11 sets of three wipers of the 11 additional sets of levels of the stepping switch are connected to the 11 coils U1 to HUN. Thus, when any one of the three wipers of level SS1L1 engages the first contact of the bank of contacts of that level, one of the wipers of the 11 sets of wipers of the 11 additional levels of the stepping switch likewise engages the first contact of the bank of contacts associated with that wiper. In this case, there is no possibiliy of energizing one of the 11 coils through the closed contacts of the stack of contacts of banks B through F, because there is a complete isolation between the programs. Of course, the same situation prevails when the second, third, fourth, fifth or sixth contacts of the bank of contacts of level SS1L1 and the 11 additional levels are engaged by the wipers of these levels.

In the case where the stepping switch has an insufficient number of levels available for this arrangement, additional stepping switches can be utilized to provide this type of circuit arrangement; of course, it is then necessary to maintain the different stepping switches in synchronism. The additional circuits necessary for this are well known to those skilled in this art.

Referring to FIG. 14, the values of length to be cut when expressed in 10 or multiples of 10 are converted to the binary system which, of course, involves the values 2, 4, 8, 16, 32 and 64. The following tabulation illustrates the conversion of the decimal units to the binary system:

| Decimal No. | Binary Equivalent | Coils Energized |
| --- | --- | --- |
| 10 | 2 and 8 | T2 and T8. |
| 20 | 4 and 16 | T4 and T16. |
| 30 | 2, 4, 8 and 16 | T2, T4, T8 and T16. |
| 40 | 8 and 32 | T8 and T32. |
| 50 | 2, 16 and 32 | T2, T16 and T32. |
| 60 | 4, 8, 16 and 32 | T4, T8, T16 and T32. |
| 70 | 2, 4 and 64 | T2, T4 and T64. |
| 80 | 16 and 64 | T16 and T64. |
| 90 | 2, 8, 16 and 64 | T2, T8, T16 and T64. |

In the circuitry of FIG. 14, the binary system is not utilized in a pure form. Instead, coil HUN is utilized along with coils U2 and T64. This is to simplify the procedure for an operator who is to press the buttons of a bank for the program. Of course, the numerical value 100 is equivalent to the sum of 4, 32 and 64 on the binary system. The need for a simplification for a length of cut to be programmed arises because, on a system that uses only the binary numbers represented by coils U2, U4, U8, T2, T4, T8, T16, T32 and T64, the operator would be required to subtract four from the numerical value of the length if the latter is more than 98 inches. For example, if the length to be cut is 104 inches, the operator would subtract 96 inches to obtain a balance of eight and this would require the closing, in the case of bank A, of switch PBA8 as well as switches PBA90 and PBA6. Because of the presence of switch PBA100, in the case of bank A, and coil HUN, it is only necessary for the operator to close switch PBA100 and switch PBA4.

The following is a description of the binary addition circuitry (FIG. 13E) of the present invention and illustrates the utilization of coil HUN and the circuits associated with it for the simplification mentioned above. The binary addition circuitry is shown in FIG. 13E along with other circuitry that includes coils CR51, CR52, CR53, CR54, CR55, CR56 and CR57 of relays. The energization of these coils is dependent upon the energization of the coils U2 to HUN and also dependent upon the energized or deenergized condition of coils C2, C4, C8, C16 and C32 of relays in the binary addition circuitry for the reasons that will be apparent from the description which follows.

A coil A4 of a relay and a coil A8 of a relay are connected to line LB3. The coil A4 is connected to line LA3a through a pair of parallel subcircuits. One of these subcircuits has a normally closed contact HUN–1 and a normally open contact U4–1. The other subcircuit has a normally open contact HUN–2 and a normally closed contact U4–2. The coil A8 is connected to line LA3a through a normally open contact U8–1 and is also connected to line LA3a through a normally open contact U4–3 and normally open contact HUN–2 of one of the subcircuits connecting relay A4 to line LA3a.

The coils CR51, CR52, CR53, CR54, CR55, CR56, CR57, C2, C4, C8, C16 and C32 are connected to line LB3.

The coil CR51 is connected to line LA3a through two parallel subcircuits. One subcircuit has a normally closed contact T2–1 and a normally open contact U2–1. The other subcircuit has a normally open contact T2–2 and a normally closed contact U2–2. The coil C2 is connected to line LA3a through a normally open contact U2–3 and the normally open contact T2–2 of the second subcircuit connecting coil CR51 to line LA3a.

The coil CR52 is connected to line LA3a through two parallel subcircuits, each of which includes a normally closed contact C2–1 and C2–2, respectively. The first subcircuit has a normally closed contact T4–1 and a normally open contact A4–1. The second subcircuit has a normally open contact T4–2 and a normally closed contact A4–2. The normally closed contact T4–1 of the first subcircuit is connected to the normally closed contact A4–2 of the second subcircuit through a normally open contact C2–3. Similarly, the normally open contact T4–2 of the second subcircuit is connected to the normally open contact A4–1 of the first subcircuit through a normally open contact C2–4.

The coil C4 is connected to line LA3a through two parallel subcircuits, each containing a normally open contact T4–3 and T4–4. The first and second subcircuits have normally open contacts A4–3 and C2–5, respectively. A normally open contact A4–4 is in parallel with the normally open contact T4–4 of the second subcircuit, thereby providing, in essence, a third subcircuit that includes the normally open contact C2–5 of the second subcircuit and the normally open contact A4–4 in parallel with contact T4–4 of the second subcircuit.

The coil CR53 is connected to line LA3a through two parallel subcircuits, each of which includes a normally closed contact C4–1 and C4–2, respectively. The first subcircuit has a normally closed contact T8–1 and a normally open contact A8–1. The second subcircuit has a normally open contact T8–2 and a normally closed contact A8–2. The normally closed contact T8–1 of the first subcircuit is connected to the normally closed contact A8–2 of the second subcircuit through a normally open contact C4–3. Similarly, the normally open contact T8–2 of the second subcircuit is connected to the normally open contact A8–1 of the first subcircuit through a normally open contact C4–4.

The coil C8 is connected to line LA3a through two parallel subcircuits, each containing a normally open contact T8–3 and T8–4. The first and second subcircuits have normally open contacts A8–3 and C4–5, respectively. A normally open contact A8–4 is in parallel with the normally open contact T8–4 of the second subcircuit, thereby providing, in essence, a third subcircuit that includes the normally open contact C4–5 of the second subcircuit and the normally open contact A8–4 in parallel with contact T8–4 of the second subcircuit.

The coil CR54 is connected to line LA3a through two parallel subcircuits. One subcircuit has a normally closed contact T16–1 and a normally open contact C8–1. The other subcircuit has a normally open contact T16–2 and a normally closed contact C8–2. The coil C16 is connected to line LA3a through a normally open contact C8–3 and the normally open contact T16–2 of the second subcircuit connecting coil CR54 to line LA3a.

The coil CR55 is connected to line LA3a through two parallel subcircuits, each of which includes a normally closed contact C16–1 and C16–2, respectively. The first subcircuit has a normally closed contact T32–1 and a normally open contact HUN–3. The second subcircuit has a normally open contact T32–2 and a normally closed contact HUN–4. The normally closed contact T32–1 of the first sub-circuit is connected to the normally closed contact HUN–4 of the second subcircuit through a normally open contact C16–3. Similarly, the normally open contact T32–2 of the second subcircuit is connected to the normally open contact HUN–3 of the first subcircuit through a normally open contact C16–4.

The coil C32 is connected to line LA3a through two parallel subcircuits, each containing a normally open contact T32–3 and T32–4, respectively. The first and second subcircuits have normally open contact HUN–5 and C16–5, respectively. A normally open contact HUN–6 is in parallel with the normally open contact C16–5 of the second subcircuit, thereby providing, in essence, a third subcircuit that includes the normally open contact C16–5 of the second subcircuit and the normally open contact HUN–6 in parallel with contact T32–4 of the second subcircuit.

The coil CR56 is connected to line LA3a through two parallel subcircuits, each of which includes a normally closed contact C32–1 and C32–2, respectively. The first subcircuit has a normally closed contact T64–1 and a normally open contact HUN–7. The second subcircuit has a normally open contact T64–2 and a normally closed contact HUN-8. The normally closed contact T64-1 of the first subcircuit is connected to the normally closed contact HUN-8 of the second subcircuit through a normally open contact C32-3. Similarly, the normally open contact T64-2 of the second subcircuit is connected to the normally open contact HUN-7 of the first subcircuit through a normally open contact C32-4.

The coil CR57 is connected to line LA3a through two parallel subcircuits, each containing a normally open contact T64-3 and T64-4, respectively. The first and second subcircuits have normally open contacts HUN-9 and C32-5, respectively. A normally open contact HUN-10 is in parallel with the normally open contact T64-4 of the second subcircuit, thereby providing, in essence, a third subcircuit that includes the normally open contact T64-4 of the second subcircuit and the normally open contact HUN-10 in parallel with contact T64-4 of the second subcircuit.

The utilization of the binary addition circuit of FIG. 13E is illustrated below with reference to the 66-inch cut if programmed by bank A of push buttons. As detailed earlier, the result of this program is that coils U2, U4, T4, T8, T16 and T32 are energized when line LA3a1 is energized. As a result, the contacts of the relays having these coils are not in their normal condition shown in FIG. 13E; rather, they are in the opposite condition, i.e., a normally closed contact is open and a normally open contact is closed. In this example, coils U1, U8, T2, T64 and HUN are not energized so that the contacts of the relays having these coils are in their normal condition shown in FIG. 13E.

The coil A4 is energized because current flow through normally closed contact HUN-1 and now closed contact U4-1. The coil A8 is not energized because contact U8-1 is open. The coil A8 in series with now closed contact U4-3 and normally open contact HUN-2 is also not energized because the latter contact is open.

The coil CR51 is energized through normally closed contact T2-1 and now closed contact U2-1. The coil C2 is not energized through now closed contact U2-3 because contact T2-2 is open.

The coil CR52 is not energized, because contact T4-1 in the first subcircuit is open and contact A4-2 in the second subcircuit is open. With coil C2 deenergized, contact C2-4 between now closed contacts T4-2 and A4-1 of the second and first subcircuits, respectively, is open and coil CR52 cannot be energized by this route.

The coil C4 is energized because contacts T4-3 and A4-3 in one of the subcircuits are closed. The energization of coil C4 results from the addition of the two numerical values of 4 units expressed by the energization of coils U4 and T4.

The coil CR53 is not energized because normally closed contacts C4-1 and C4-2 in the two parallel subcircuits are open through the energization of coil C4. The normally open contacts C4-3 and C4-4 are closed, but one of these connects now opened contact T8-1 to normally closed contact A8-2 and the other connects now closed contact T8-2 to normally open contact A8-1 which is open.

The coil C8 is energized because contacts T8-4 and C4-5 in the second subcircuit are closed. The energization of coil C8 results from the addition of the two numerical values of 8 units expressed by the energization of coils T8 and C4.

The coil CR54 is not energized because the first subcircuit contact T16-1 is open, and in the second subcircuit contact C8-2 is open.

The coil C16 is energized because contacts T16-2 and C8-3 in series with it are closed. The energization of coil C16 results from the addition of the two numerical values of 16 units expressed by the energization of coils T16 and C8.

The coil CR55 is not energized because in the first subcircuit contacts HUN-3 and C16-1 are open and in the subcircuit contact C16-2 is open. The now closed contacts C16-3 connect now open contact T32-1 of the first subcircuit to contact HUN-4 of the second subcircuit and contact T32-2 of the second subcircuit to open contact HUN-3 of the first subcircuit. Thus, coil CR55 is not energized by the closing of contacts C16.

The coil C32 is energized because contacts T32-4 and C16-5 of the second subcircuit are closed. The energization of coil C32 results from the addition of the numerical values of 32 units expressed by the energization of coils T32 and C16.

The coil CR56 is energized, even though contacts C32-1 and C32-2 in the two parallel subcircuits are open, because contact C32-3 connecting contact T64-1 of the first subcircuit and contact HUN-8 of the second subcircuit is closed.

The coil CR57 is not energized because contacts T64-3 and T64-4 in the first and second subcircuits are open and contact T31-2 of the second subcircuit to open contact subcircuits are open.

It is seen that the energization of coils U2, U4, T4, T8, T16 and T32 results in the energization of coil CR51 and, through the binary addition circuitry, in the energization of coil CR56. The energization of coils CR51 and CR56 represent numerical values of 2 and 64 inches, respectively, so that the total numerical value remains at 66 inches.

The following illustrates the utilization of the binary addition circuit when coil HUN is energized along with one or more of the coils shown in FIG. 14. If a 164-inch cut is to be made, push buttons PBA4, PBA60 and PBA100 are pressed to locking position with the result that coils U4, T4, T8, T16, T32 and HUN are energized.

For the 164-inch cut, coil A4 is not energized because both coils U4 and HUN are energized. However, because the latter coils are energized, coil A8 is energized.

In this example, coil CR51 is not energized because neither one of coils T2 and U2 is energized, and coil C2 is not energized because both of coils T2 and U2 are required to be energized for the energization of coil C2.

The coil CR52 is energized because coil T4 is energized, and coils C2 and A4 are not energized. However, for the same reason, coil C4 is not energized.

The coil CR53 is not energized in this example, even though coil C4 is not energized because coils T8 and A8 are energized. However, coil C8 is energized through the closing of contacts A8-3 and T8-3 in the first subcircuit. This adds the numerical values of 8 units represented by coils T8 and A8. The energization of coil A8 resulted from the addition of 4 units represented by coil U4 and the 4 units, above 96 units, represented by the energization of coil HUN.

The energization of coils T16 and C8 prevents the flow of current to coil CR54 for its energization but results in the energization of coil C16 to add the numerical values of 16 units represented by the energization of coils T16 and C8.

Because coil HUN is energized for the 164-inch cut and because coils C16 and T32 are energized, coil CR55 is energized by current passing through contact T32-2 of the second subcircuit, contact HUN-3 of the first subcircuit and contact C16-4 between them. The energization of coil CR55 represents a numerical value of 32 inches.

The energization of coils HUN and C16 results in the energization of coil C32 through contacts HUN-6 and C16-5 of the third subcircuit. The contact HUN-6, when closed, represents 32 of its 100 units. The energization of coil C32 represents the addition of two numerical values of 32 units.

The energization of coils C32 and HUN do not result in the energization of coil CR56 because coil T64 is not energized. However, coil CR57 is energized through contacts HUN-10 and C32-5 of the third subcircuit in series with it. The energization of coil CR57 represents a similar value of 128 units obtained by the addition of two numerical values of 64 units represented by the energization of coils HUN and C32.

The numerical values of 4, 32 and 128 units or inches are represented in the circuitry by the energization of coils CR52, CR55 and CR57. Of course, the sum of these values is 164 units.

Reference is made now to FIG. 13F, which shows that part of the circuitry which utilizes the flow of energy through the brushes and contacts of binary drum switches 306 and 307 to energize one or more of coils CR61 through CR67 of relays and which compares their condition with the state of energization or deenergization of coils CR51 through CR57. This comparison is made as bar 135 is moving forward. When a condition known as coincidence is reached during this comparison, coil CR68 of a relay is energized to close contact CR68-1 in series with coil CR21 (FIG. 13C). This stops the forward drive of the bar 135 and drops pawl 160, as described earlier.

The coils CR61 through CR63 and a coil CR69 of a relay are connected to line 2BL. The coils CR61, CR62, CR63 and CR64 are also connected to binary brushes BB-3, BB-4, BB-5 and BB-6, respectively. The coil CR69 is also connected to binary brush BB-6 so that coils CR64 and CR69 are energized and deenergized together. The coil CR65 is connected to leading and trailing binary brushes BB-10A and BB-10B through a normally closed contact CR69-1 and a normally open contact CR69-2, respectively. Each of coils CR66 and CR67 is connected to the associated leading and trailing binary brushes BB-11A and BB-11B and BB-12A and BB-12B, respectively, through normally closed and open contacts CR69 in the same manner.

In parallel with each of the six contacts CR69-1 to CR69-6 are subcircuits, each of which contains a resistor, e.g., R4, R5 etc., and condenser, e.g., C3, C4, etc. These subcircuits prevent arcing damage to contacts CR69-1 to CR69-6 when coils CR65, CR66 and CR67 are deenergized through the opening of contacts CR69-1 to CR69-6.

The line 355 is connected to line LA3 through a normally open contact CR20-6. The line 355 is connected to line 341 of binary drum switch 306 and to line 347 of binary drum switch 307. The line 341 is connected to binary commutators BC-2 through BC-6 in the manner shown in FIG. 15 and described earlier. The line 347 is connected to binary commutators BC-10 through BC-12 in the manner shown in FIG. 16 and described earlier. The normally open contact CR20 prevents the energization of commutator sections of commutators BC-2 through BC-6 and BC-10 through BC-12 until coil CR20 is energized by the energization of coil CR3 to close contact CR3-2 (FIG. 13C) near the end of a cycle of a cutting operation, as described earlier.

The binary brush BB-2 is connected to coil CR68 through 7 sets of parallel subcircuits. The sets are in series with one another. The first subcircuit of each set has a pair of normally open contacts and the second subcircuit of each set has a pair of normally closed contacts. In the first through seventh sets are normally open and closed contacts CH51-1 and CR51-2 through CR57-1 and CR57-2, respectively, and normally open and closed contacts CR61-1 and CR61-2 through CR67-1 and CR67-2, respectively. With this arrangement, both of coils CR51 and CR61 must either be energized or deenergized at the moment when contact CR20-6 is closed and brush BB-2 engages an energized commutator section of commutator BC-2 for current to pass through one of the parallel subcircuits of the first set. In order to permit current flow through the other sets, there must be at that moment the same state of energization or deenergization between coils CR52 and CR62, between coils CR53 and CR63, between coils CR54 and CR64, between coils CR55 and CR65, between coils CR56 and CR66 and between coils CR57 and CR67. When this condition is attained, current flows to coil CR68 for its energization.

This closes a normally open contact CR68-2 in its holding circuit which is in series with contact CR20 connecting line 355 to line LA2. In parallel with contact CR68-2 of the holding circuit are a resistor R10 and a condenser C9 to protect contact CR68-2 against arcing damage.

As mentioned earlier, the gear drive for bar 135 and shafts 305 of binary drum switches 306 and 307 is constructed so that the movement of bar 135 a distance of 256 inches results in eight complete revolutions of shaft 305 of binary switch 306 and one complete revolution of shaft 305 of binary switch 307. Thus, for each two-inch movement of bar 135 from its home position, shaft 305 of binary switch 306 rotates to move three of the 96 commutator sections of each of commutators BC-1 through BC-6 past brushes BB-1 through BB-6, respectively. For the same movement of commutator sections of commutators BC-7 and BC-10 through BC-12 past their associated brushes, the measuring bar is moved 16 inches.

In view of the wiring pattern for the energization only of designated commutator sections of commutator BC-2, the rotation of shaft 305 of binary switch 306 during the forward movement of bar 135 results in the engagement of brush BB-2 with energized commutator sections of commutator BC-2 for a ⅔-inch of movement of bar 135 to produce a pulse of energization of brush BB-2. This pulse occurs in the central portion of each two-inch increment of forward movement of bar 135 from its home position.

The wiring pattern for the energization only of designated commutator sections of commutator BC-2 results in the engagement of brush BB-3 of commutator BC-3 for the first two inches of movement of bar 135, then the engagement of nonenergized commutator sections for two inches of travel of bar 135. Thereafter, for each four inches of movement of bar 135, brush BB-3 alternately engages energized commutator sections for the first half movement and nonenergized commutator sections for the second half. In the case of brush BB-4, it engages nonenergized commutator sections of commutator BC-4 for the first two inches of travel of bar 135. The brush BB-4 engages energized commutator sections for the first half of each subsequent eight-inch travel of bar 135 and nonenergized commutator sections for the second half.

Similarly, brushes BB-5 and BB-6 are energized for eight and 16 inches, respectively, of travel of bar 135. Between the periods of energization of brush BB-5, bar 135 travels eight inches. Between the periods of energization of brush BB-6, the bar 135 travels 16 inches. The first energization of brushes BB-5 and BB-6 starts when bar 135 has moved six and 14 inches, respectively, from its home position.

If coils CR65 and CR67 were connected directly to leading brushes BB-10A, BB-11A and BB-12A and trailing brushes BB-10B, BB-11B and BB-12B rather than through contacts CR69-1 to CR69-6, these coils would be energized through the brushes for periods corresponding to 32, 64 and 128 inches, respectively, of travel of bar 135 and would be deenergized for similar periods of travel of bar 135. The first energization of any one of coils CR65, CR66 and CR67 would occur when bar 135 has moved 30, 62 and 126 inches, respectively, from its home position. When bar 135 is at these distances from its home position, all of brushes BB-3 through BB-6 are leaving the last of sets of energized commutator sections of commutators BC-3 through BC-6. Until bar 135 is moved a short distance farther where coils CR61 through CR64 are energized, coils CR65, CR66 and CR67 are prevented momentarily from being energized. For this purpose, contacts CR69-1 to CR69-6 are used so that the energization leading brushes BB-10A, BB-11A and BB-12A cannot energize these coils until coil CR69 is deenergized with coil CR64. The normally closed contacts CR69-2, 4 and 6, in series with the leading brushes, then close and the coil associated with the now energized leading brush is energized. In the illustrative embodiment of the apparatus, bar 135 travels about ⅙ of an inch after the energization of one or more of brushes BB-10A, BB-11A and BB-12A before one or more of coils CR65 through CR67, respectively, can be energized.

Each of trailing brushes BB-10B, BB-11B and BB-12B has normally open contact CR69-1, CR69-3 and CR69-5, respectively, in series with it because the corresponding leading brushes are passed by a set of energized commutator sections before the bar has travelled the desired distance. However, before this occurs, brush BB-6 engages energized commutator sections of commutator BC-6 to energize coil CR64 and CR69. The trailing brush maintains engagement with energized commutator sections of the set until bar 135 has moved the full desired distance from that position when the set engaged the leading brush.

The following is a tabulation which shows the coil or coils of coils CR61 through CR65 that are energized during each two inches of travel of bar 135 from its home position until it has travelled 32 inches:

| Inches of Travel of Bar 135 | Coil or Coils Energized | | | | |
| --- | --- | --- | --- | --- | --- |
| 0-2 | CR61 | | | | |
| 2-4 | | CR62 | | | |
| 4-6 | CR61 | CR62 | | | |
| 6-8 | | | CR63 | | |
| 8-10 | CR61 | | CR63 | | |
| 10-12 | | CR62 | CR63 | | |
| 12-14 | CR61 | CR62 | CR63 | | |
| 14-16 | | | | CR64 | |
| 16-18 | CR61 | | | CR64 | |
| 18-20 | | CR62 | | CR64 | |
| 20-22 | CR61 | CR62 | | CR64 | |
| 22-24 | | | CR63 | CR64 | |
| 24-26 | CR61 | | CR63 | CR64 | |
| 26-28 | | CR62 | CR63 | CR64 | |
| 28-30 | CR61 | CR62 | CR63 | CR64 | |
| 30-32 | | | | | CR65 |

It is noted from the tabulation that only coil CR65 is energized as the bar moves between a position 30 to a position 32 inches from its home position. As bar 135 moves from a position 32 inches to a position 62 inches away from its home position, the tabulated pattern of energization of coil CR61 through CR64 is repeated. The coil CR65 is energized during each of these two-inch increments of bar movement. When the bar moves from a position 62 inches to a position 64 inches from its home position, only coil CR66 is energized. As bar 135 moves from the latter position to a position 126 inches from its home position, coils CR61 through CR65 are energized in this pattern for the movement from 0 to 62 inches and during each of these two-inch increments of travel of bar 135, coil CR66 is energized. As bar 135 moves from a position 126 inches to a position 128 inches away from its home position, only coil CR67 is energized. For the next 126 inches of travel, this pattern of energization of coils CR61 through CR66 for the first 126 inches of travel of the bar 135 from its home position is repeated and coil CR67 is energized.

In the example utilizing bank A to indicate a 66-inch cut, only some of the coils shown in FIG. 14 are energized and through the binary addition and other circuitry shown in FIG. 13E, only two of coils CR61 and CR66 are energized. Accordingly, of the seven sets of parallel subcircuits connecting brush BB-2 and coil CR68, only two sets are affected. In the first set, normally open contact CR51-1 in the first subcircuit closes and normally closed contact CR51-2 of the second subcircuit opens. In the sixth set, normally open contact CR56-1 in the first subcircuit closes and normally closed contact CR56-2 in the second subcircuit opens. It is necessary to energize coils CR61 and CR66 to close normally open contacts CR61-1 and CR66-1 in the first subcircuit of the first and sixth sets. The coils CR61 and CR66 are energized during the movement of bar 135 between positions 64 and 66 inches from its home position. In the central portion of this two-inch movement brush BB-2 engages energized commutator sections of commutator BC-2 to send a short pulse of energy through now closed, normally open contacts CR61-1 and CR51-1, through normally closed contacts CR62-2, CR52-2, CR63-2, CR53-2, CR64-2, CR54-2, CR65-2 and CR55-2, through now closed, normally open contacts CR66-1 and CR56-1 and through normally closed contacts CR67-2 and CR57-2 to initiate the energization of coil CR68. When this energization is initiated, bar 135 has traveled almost 65 inches from its home position. The forward drive for bar 135 ceases and pawl 160 drops so that arm 154 is now at the required position to be tripped later by the leading edge of the glass sheet for the initiation of a 66-inch cut.

In FIGS. 15 and 16, the commutators BC-1 through BC-12 of the two binary drum switches are shown schematically in their position at the initiation of a 146-inch cut.

In addition to the safety devices mentioned above, for the electrical circuits, normally closed overload contacts OL-1 to OL-8 are in series with coils MCR1, MCR2, MCR3 and MCR4 for the protection of the motors operated through the starter coils as is well known.

The foregoing description of the illustrative embodiment of the apparatus of the invention utilizes push buttons which are manually operated to set up a program of different lengths of cuts to be made on a moving glass sheet or a moving continuous glass ribbon. The apparatus of the invention can be used in conjunction with an automatic inspection and computing device that determines the program of cuts to be made on a glass sheet or ribbon in accordance with the positioning of different types of defects in the glass. The computer uses the system of binary numbers to signal a length of cut and the circuits of FIGS. 13D and 13E are not required. Instead, the computer controls and operates contacts that replace contacts CR51-1 and CR51-2 through CR57-1 and CR57-2 of the seven sets of subcircuits of FIG. 13F.

Any number is a quantity represented by a group of digits. For any system of numbers, the usual relationship between the number and the digits utilized is based on the equation $$N = d_0 R^0 + d_1 R^1 + d_2 R^2 + d_3 R^3 \ldots$$

where R is the radix of the number system. The number is usually expressed by the digits written in the following order . . . $d_3 d_2 d_1 d_0$.

In the case of the decimal number system, the radix is 10 and the digits substituted for the coefficients $d_0$, $d_1$, $d_2$, etc., are chosen from the digits 0, 1, 2, 3, 4, 5, 6, 7, 8 and 9. In the decimal system the digits substituted for the coefficients $d_0$, $d_1$, $d_2$, $d_3$, etc., represent the units, tens, hundreds, thousands, etc., respectively.

In the case of the binary number system, the radix is 2 and the digits substituted for the coefficients $d_0$, $d_1$, $d_2$, etc., are chosen from 2 digits which in the usual case are 0 and 1, but any other digits may be used for either 0 or 1. For example, the digits substituted for the coefficients may be 0 and 2, and in the illustrative embodiment these digits are used.

In the illustrative embodiment of the apparatus, the sensing means, which includes arm 154 and switch LS1, is moved to a predetermined position where it will be activated by the leading edge of the glass sheet or ribbon to be cut when the leading edge is at a predetermined distance from a vertical plane that extends transversely of the apparatus. The sensing means is moved to the predetermined position by the movement of bar 135. The distance that bar 135 moves from its home position to place the sensing means at the predetermined position equals the predetermined distance from the transverse vertical plane to the leading edge when it activates the sensing means plus or minus a constant length. The shafts 305 for binary drum switches 306 and 307 are rotated so that their degrees of rotation bear a fixed relationship with the linear movement of bar 135 from its home position. The switches 306 and 307 are constructed so that they can affect relays associated with them to indicate by the state of energization or deenergization of the coils of the associated relays for any given position of the sensing means the distance from the transverse vertical plane that the leading edge of the glass sheet must be to actuate the sensing means. This is accomplished because the coils of the relays associated with the binary drum switches represent, by their state of energization or deenergization, the coefficients of the mathematical expression that is equal to the distance in which the mathematical expression has a radix of 2. When any one of the coils of the associated relays is deenergized, it indicates that the digit for the coefficient that it represents is 0, and when any one of the coils is energized, it indicates that the digit for that coefficient is 2. It is apparent that as bar 135 is moved away from its home position the rotation of shafts 305 of switches 306 and 307 changes the binary digital number represented by the states of energization or deenergization of the coils of the associated relays.

Each bank of push-button switches and associated stacks of contacts is utilized by an operator pressing one or more of the push buttons of the bank to predetermine a length of glass sheet to be cut. When a particular bank is being utilized, it determines the amount of linear movement of bar 135 to position the sensing means for actuation by the leading edge of the glass sheet to be cut. For any given bank of push buttons and push-button switches, an operator presses those push buttons that are marked to correspond to the digits appearing in the units, tens and hundreds parts of the decimal digital number that represents the length of glass sheet to be cut. Of course, if any one of the digits in the decimal digital number is 0, there is no push button corresponding to 0 that is required to be pressed.

In addition to the push buttons that represent the digits in the units, tens and hundreds parts of the decimal digitary number for the length to be cut, there is another push button. In all cases it is the first push button and in bank A is designated PBA1. When a bank of push-button switches is being utilized to indicate a desired position for the sensing means, the first push button of each bank, if used, energizes coil U1 to add one inch to the length indicated by the pressing of other push buttons of that bank, as described above. The first push button is not utilized for the purpose of determining the position of bar 135 for the proper position of the sensing means.

The other push buttons of a bank can be considered as being in three groups. Each push button in a group represents one or more digits that are coefficients in the binary number that is a quantity equal to a quantity expressed by one of the digits of the decimal digital number. For example, if the length of glass sheet to be cut is to be determined by the push-button switches and associated contacts of bank A and the length to be cut is 116 inches, an operator will press push buttons PBA6, PBA10 and PBA100 to correspond to the digits representing the coefficients $d_0$, $d_1$ and $d_2$ in the decimal digital number. Through the use of these appropriate push-button switches of bank A, their associated contacts and all of the associated coils shown in FIG. 14, except coil U1, as well as through the binary adder circuitry shown in FIG. 13E, the decimal digital number is converted to a binary digital number that is indicated by the state of energization or deenergization of each of coils CR51 through CR57.

The conversion of the decimal digital number representing the length of glass sheet to be cut is accomplished by separately converting the unit and tens parts of the decimal digital number to binary digital numbers. These binary numbers are represented by the state of energization or deenergization of coils U2 through T64 of relays. The state of energization or deenergization of a coil HUN is determined by whether or not the hundred push button is pressed. This state determines the open or closed condition of contacts HUN-1 to HUN-10 in the circuits shown in FIG. 13E. The condition of these contacts represents the digits in the binary number that equals in quantity the hundred part of the decimal digital number.

The pressing of switch PBA6 to represent the digit 6 of the units part of the decimal digital number 116 closes contacts PBA6-1 and PBA6-2, thereby energizing coils U2 and U4 when line LA3a1 is energized. Coil U8 is not energized. The coils U2, U4 and U8 symbolically represent the coefficients $d_0$, $d_1$ and $d_2$ in the binary number system. The deenergized and energized states represent digits of 0 and 2, respectively, in the illustrative embodiment. Thus, $d_0$ is 2, $d_1$ is 2 and $d_2$ is 0.

The pressing of push button PBA10 to indicate in a program the tens part of the number 116 closes contacts PBA10-1 and PBA10-2. As a result, with line LA3a1 energized coils T2 and T8 are energized. The coils T4, T16, T32 and T64 are not energized. The coils T2, T4, T8, T16, T32 and T64 represent the coefficients $d_0$, $d_1$, $d_2$, $d_3$, $d_4$ and $d_5$ of the binary digital number for the quantity represented by the tens part of the decimal digital number which represents the length of glass sheet to be cut. The deenergized and energized states of these coils also represent digits 0 and 2, respectively, in the illustrative embodiment. Thus, $d_0$ is 2, $d_2$ is 2, and each of $d_1$, $d_3$ and $d_5$ is 0. The $d_0R^0$ is $2 \times 1$ or 2 and $d_2R^2$ is $2 \times 2^2$ or 8, and the sum is the quantity of 10 which agrees with the tens part of the decimal digital number.

The hundred part of the decimal digital number is recorded by pressing push button PBA100 to energize coil HUN. The hundred part of the decimal number is not separately converted to the corresponding binary digital number as would be represented by separate relays. However, the energization of coil HUN affects associated contacts HUN-1 and HUN-2 in circuits with contacts U4-1, 2 and 3, affected by the state of energization or deenergization of coil U4, and thus affects coils A4 and A8. The state of energization or deenergization of coils A4 and A8 affects the rest of the circuitry in FIG. 13E as do other contacts HUN-3 to HUN-10 in series with coils C32, CR55, CR56 and CR57. Thus, the binary addition circuitry of FIG. 13E adds the binary digital numbers representing the units, tens and hundreds parts of the decimal digital number for the desired length of the glass sheet to be cut.

When a digit is 2 for the same coefficient in at least two of the three binary digital numbers being added, the digit 2 appearing twice is cancelled from that coefficient and the digit 2 is carried to the coefficient of the next order of significance. For example, if the digits for $d_0$ in the three binary numbers that are equal in quantity to the units, tens and hundreds parts of a decimal number are 2, 2 and 0, respectively, the addition of these coefficients results in the digit for $d_0$ being 0. The digit 2 is carried by energization of coil C2 to indicate a value of 2 for $d_1$ that is to be considered with the digits of coefficient $d_1$ of the three binary numbers.

The circuitry of FIG. 13E for binary adidtion adds the binary numbers that are equivalent in quantity to the units, tens and hundreds of the decimal number to produce a state of energization or deenergization of coils CR51 through CR57. These coils represent the coefficients $d_0$ through $d_6$ of the mathematical expression in which the R is 2 and each coefficient is 0 or 2. In the case of the 116-inch cut, only coils CR52, CR54, CR55 and CR56 are energized to indicate that the digit for coefficients $d_1$, $d_3$, $d_4$ and $d_5$ is 2. The digit for coefficients $d_0$, $d_2$ and $d_6$ is 0. Accordingly, the quantity is the summation of $$0 \times 2^0 + 2 \times 2^1 + 0 \times 2^2 + 2 \times 2^3 + 2 \times 2^4 + 2 \times 2^5 + 0 \times 2^6$$

i.e. $0+4+0+16+32+64+0$, which is 116 inches.

With these push-button switches and circuit arrangements in the illustrative embodiment, it is unnecessary for an operator, who has a decimal digital number that represents a length of the glass sheet to be cut, to make any computation or to refer to any table before determining for any bank the push button in each of sets for the units, tens and hundreds that is to be pressed. In each of these sets the operator merely presses the push button that has a digital marking corresponding to the digit in that order of significance in the decimal digital number.

This arrangement can be utilized for other lengths of cut where the unit of length is an integer other than 2 inches. For example, if the unit of length is 3 inches, the lengths of the glass sheets to be cut will be 3 inches or a multiple thereof, i.e., 3, 6, 9, 12, 15, 18, 21, 24, 27, 30, 33, etc. inches. The set of push buttons to indicate the tens part of the quantity remains unchanged. The circuitry for the units part is modified. Push buttons marked 3, 5, 7 and 9 are added. The contacts associated with these additional push buttons are utilized as follows. One contact of each is used, when closed, to energize coil U1. The other contacts are used, when closed, to energize coils U2, U4 and U8 in the same manner as push buttons marked 2, 4, 6 and 8, respectively, are used by their associated contacts to energize one or more of these coils.

To program a length of cut of 12 inches, the operator presses the conventional push button PBA2 for units 2 and button PBA10 for units 10. To program a length of 15 inches, the operator presses PBA10 and a new push button representing units 5. The latter push button closes a contact to energize coil U4 and a contact to energize coil U1 that indicates a quantity of 1 inch. It is noted the basic features shown in FIG. 14 in which digits of the units and tens of a decimal digital quantity are separately converted to the binary system. The coil U1, when energized, moves bar 135 one inch beyond the position of coincidence or renders switch LS1 ineffective and utilizes another limit switch that is closed by an arm 1 inch downstream from arm 154, as described above.

Instead of cutting a glass sheet or ribbon into lengths which are the products of numbers and a unit of length in inches, the unit of length can be expressed in some other system of linear measurement, e.g., in centimeters or millimeters.

It is not necessary that any length be represented by an integer. If it is a quantity that can be represented by a decimal digital number having a decimal point, the digits of that number can be converted separately to binary digital numbers by circuitry shown basically in FIG. 14. In other words, the digits of the units, tens and hundreds of the decimal number are separately converted to binary numbers and the digits of the tenths, hundredths and thousandths are similarly converted separately. The latter conversion would require additional sets of push-button switches in each bank, but the conversion is readily accomplished because the operator is not required to make any calculations or to refer to any conversion tables before determining the additional push buttons to be pressed. Then the binary numbers are added to obtain a binary number with a binary point.

Instead of converting the decimal number, which represents a length of glass sheet to be cut, to a binary number, the number can be divided by a unit of length, of which all sheet lengths are a multiple, to produce a new number which is converted to the corresponding binary number. The digits of the latter are indicated by the state of deenergization or energization of coils CR51 through CR57. In this case the digit of each coefficient is 0 or 1. The length of travel of bar 135 from its home position is indicated as a binary number by switches 306 and 307 and coils CR61 through CR67. Of course, the relationship between the degrees of angular rotation of shafts 305 and the linear movement of bar 135 would be changed in an appropriate manner. In this case an operator would divide the desired length by the unit of length or would refer to a table to determine the number that is to be converted to the binary system.

The state of energization or deenergization of each of coils CR61 through CR67 is compared to the state of energization or deenergization of each of coils CR51 through CR57, respectively, by the 7 sets of parallel subcircuits in series with coil CR68 shown in FIG. 13F. When all of the sets of compared states are in coincidence, arm 154 is at the position called for by the cutting program so that the electrical circuitry of the apparatus stops the motor drive for bar 135.

Instead of converting the program for a length of cut from a decimal digital number to a binary digital number, the former can be converted to a ternary digital number or a number based on any other scale of notation. In this case the binary drum switches would be replaced by a device which would be operated along with the operation of the drive means for bar 135 so that the position of the sensing means during the drive of bar 135 can be indicated by a number on the same ternary or other number system. In this case the latter number would indicate the length of glass sheet that will be cut when the sensing means is activated.

In another modification, the decimal digital number representing the programmed length of cut can be converted from a decimal digital number to a binary number which is a reflected binary and the length that would be cut because of the position of the sensing means would be similarly converted.

In a further modification of the apparatus, the programmed length of cut can be indicated as a binary digital number directly by an operator examining a table of conversions from decimal numbers to digital numbers and then closing appropriate switches to energize relays for the indication of the digits in the binary digital number that represents this length. As described above, the energization of the appropriate relays to indicate the binary digital number can be accomplished automatically from a program of different lengths. In this case the device that accomplishes this is the automatic inspection and computing device which signals in sequence the lengths of cuts expressed as binary digital numbers. Of course, in these instances the circuits of FIGS. 13D and 13E are not used.

In utilizing the apparatus of the invention, it is not necessary that the decimal digital number representing a length of cut be converted to a number in another scale of notation. The digits of the decimal digital number representing a desired length can be represented by the energization of appropriate relays. The position of the sensing means during the movement of bar 135 can be similarly represented by a decimal digital number that represents the distance between the transverse vertical plane and the point at which the leading edge of the glass sheet will activate the sensing means. The digits of the latter decimal digital number will also be represented by the state of energization or deenergization of other relays. The state of energization or deenergization of the programmed decimal digital number and the decimal digital number representing the other distance can be compared, and when coincidence between the coefficients of the two numbers is obtained, bar 135 is stopped.

In the illustrative embodiment, a number of lengths of glass sheets to be cut can be programmed at one time by pressing the push buttons in several or all of the banks of push buttons. Each programmed length of cut is then utilized in sequence through the use of stepping switch SS1 and the circuits associated with it. The contacts of the stacks of contacts of all the banks of push-button switches are connected to relays U1 through U8, T2 through T64 and HUN through diodes that prevent the energization of relays that should not be energized during the reading of one program of length to be cut. The combination of the stepping switch and the diodes provides a simple means of isolating each program of length of cut from one another so that only one program at a time indicates the length for a cycle of cutting operation through the state of energization or deenergization of the coils that indicate separately the units, tens and hundreds parts of a decimal digital number.

Instead of utilizing the single stepping switch and the diodes between the contacts of the banks and the coils that represent the units, tens and hundreds parts of decimal digital number, other means can be used to isolate from one another the various programs of lengths to be cut. For example, the lines LA3a1 through LA3a6 can be connected directly to line LA3a rather than through level SS1L2 of the stepping switch. The various contacts of the stacks of contacts of the push-button switches of the banks are connected to contacts of banks of contacts of various levels of one or more stepping switches instead of being connected to the diodes DA1 through DF11. The contacts of bank A, which in the illustrative embodiment are connected to diodes DA1 through DA11, are connected to the first contact of these various levels of contacts of the stepping switch or switches. The contacts of bank B are connected to the second contacts of these various levels of the stepping switch or switches. The contacts of banks C, D, E and F are similarly connected to the third, fourth, fifth and sixth contacts of these various levels. Of course, the wipers of these various levels are connected to coils U1 through HUN in the same arrangement in which diodes DA1 through DA11 are connected to these coils as shown in FIG. 14.

Because this arrangement requires a number of levels of banks of contacts and associated wipers, that is greater than the number of levels commercially available in a stepping switch, three stepping switches, for example, can be utilized. In this case, two of the levels of one of the stepping switches are utilized to provide the levels SS1L1 and SS1L3 shown in FIG. 13D. Other levels of the three stepping switches are used in the manner described above. A conventional circuitry can be utilized to maintain the three stepping switches in this synchronous stepping operation. This circuitry utilizes additional levels of the three stepping switches and additional relays.

Various modifications of the apparatus will be apparent to one skilled in the art from the description of the preferred embodiment presented above and in the drawings. Thus, the invention is not to be limited by this description but only by the claims that follow.

We claim:
1. An apparatus for glass cutting which comprises conveyor means to move in a rectilinear path a glass sheet having a leading edge, a glass scoring tool, means to move the tool transversely of the path of movement of the glass sheet, means to sense the position of the leading edge of the moving glass sheet, motor means to move the sensing means in a rectilinear path parallel to the path of movement of the glass sheet toward and away from a reference position of said sensing means independently of operation of said sensing means and said conveyor means, means to control operation of said motor means to move said sensing means to a predetermined position, said control means including means responsive to movement of said sensing means to said predetermined position to stop operation of the motor means, and means actuated by the sensing means to initiate the operation of the tool-moving means.

2. An apparatus for glass cutting which comprises conveyor means to move in a rectilinear path a glass sheet having a leading edge, a glass scoring tool, means to move the tool transversely of the path of movement of the glass sheet, means to sense the position of the leading edge of the glass sheet, motor means to move the sensing means in a rectilinear path parallel to the path of movement of the glass sheet, means to initiate operation of the motor means, means to stop operation of the motor means, means to indicate positions of the sensing means in its rectilinear path of movement, means to indicate a predetermined position of the sensing means in its rectilinear path of movement, said means to stop operation of the motor means being responsive to a coincidence between the two indicating means, and means actuated by the sensing means to initiate the operation of the tool-moving means.

3. An apparatus for glass cutting which comprises conveyor means to move in a rectilinear path a glass sheet having a leading edge, a glass scoring tool, means to move the tool transversely of the path of movement of the glass sheet, means to sense the position of the leading edge of the glass sheet, motor means to move the sensing means in a rectilinear path parallel to the path of movement of the glass sheet, means to initiate operation of the motor means, means to stop operation of the motor means, digit-signifying means to indicate by numbers actual positions of the sensing means in its rectilinear path of movement, digit-signifying means to indicate by a number a predetermined position of the sensing means in its rectilinear path of movement, means to determine a coincidence in quantity between the number indicated by the digit-signifying means for the actual position of the sensing means and the number indicated by the digit-signifying means of the predetermined position for the sensing means, said means to stop operation of the motor means being responsive to the coincidence-determining means, and means actuated by the sensing means to initiate the operation of the tool-moving means.

4. An apparatus for glass cutting which comprises conveyor means to move in a rectilinear path a glass sheet having a leading edge, a glass scoring tool, means to move the tool transversely of the path of movement of the glass sheet, means to sense the position of the leading edge of the moving glass sheet, motor means to move the sensing means in a rectilinear path parallel to the path of movement of the glass sheet, means to initiate operation of the motor means, means to stop operation of the motor means, digit-signifying means to indicate by numbers actual positions of the sensing means in its rectilinear path of movement, digit-signifying means to indicate by numbers predetermined positions of the sensing means in its rectilinear path of movement, means to determine in sequence a coincidence in quantity between the number indicated by the digit-signifying means for the actual position of the sensing means and each of the numbers indicated by the digit-signifying means of the predetermined positions for the sensing means, said means to stop operation of the motor means being responsive to the coincidence-determining means, and means actuated by the sensing means to initiate the operation of the tool-moving means.

5. An apparatus for glass cutting which comprises conveyor means to move in a rectilinear path a glass sheet having a leading edge, a glass scoring tool, means to move the tool transversely of the path of movement of the glass sheet, means to sense the position of the leading edge of the moving glass sheet, motor means to move the sensing means in a rectilinear path parallel to the path of movement of the glass sheet, means to initiate operation of the motor means, means to stop operation of the motor means, digit-signifying means to indicate by binary digital numbers actual positions of the sensing means in its rectilinear path of movement, said digit-signifying means being operated by said motor means and said numbers indicating actual positions of the sensing means representing distances from a plane normal to the path of movement of the sensing means to positions of the leading edge of the glass sheet for activation of the sensing means at the actual positions, digit-signifying means to indicate by a decimal digital number a length of glass sheet to be cut by the apparatus, digit-signifying means responsive to the digit-signifying means indicating a decimal digital number to provide an indication of the predetermined length by a binary digital number, means to determine coincidence in quantity between the binary digital number indicated by the digit-signifying means for the actual position of the sensing means and the binary digital number indicated by the responsive digit-signifying means for indicating the predetermined length of glass sheet to be cut, said means to stop operation of the motor means being responsive to the coincidence-determining means, and means actuated by the sensing means to initiate the operation of the tool-moving means.

6. An apparatus for glass cutting which comprises conveyor means to move in a rectilinear path a glass sheet having a leading edge, a glass scoring tool, means to move the tool transversely of the path of movement of the glass sheet, means to sense the position of the leading edge of the moving glass sheet, said sensing means including an elongated bar, a side arm extending laterally of the bar and above the conveyor means, a trip arm pivotally supported by the side arm in a position to be moved pivotally by the leading edge of the glass sheet from an untripped position to a tripped position and a limit switch mounted on the side arm for engagement of the limit switch by the trip arm in the untripped position, whereby the limit switch is closed when the leading edge of the glass sheet trips the trip arm, motor means to move the elongated bar in a direction parallel to the path of movement of the glass sheet, means to initiate operation of the motor means, means to stop operation of the motor means, binary drum switch means to indicate by binary digital numbers actual positions of the elongated bar, each of said binary digital numbers representing the distance between a plane normal to the path of movement of the glass sheet and the trip arm for an actual position of the bar, means to indicate separately by binary digital numbers quantities represented by units and tens parts of a decimal digital number representing a predetermined length of glass sheet to be cut, means to add the binary digital numbers to provide a binary digital number representing the decimal digital number, digit-signifying means to indicate the binary digital number provided by the binary addition means, means to determine a coincidence in quantity between the binary digital number indicated by the binary switch means and the binary digital number indicated by the digit-signifying means operated by the binary addition means, said means to stop operation of the motor means being responsive to the coincidence-determining means, and means actuated by the closing of the limit switch to initiate the operation of the tool-moving means.

7. An apparatus for glass cutting which comprises conveyor means to move in a rectilinear path a glass sheet having a leading edge, a carriage, a pair of rails to support the carriage, means to move the carriage from a home position in the direction of travel of the moving glass sheet, said carriage-moving means including vacuum cups mounted on the carriage above the conveyor means, means to move the vacuum cups from a raised position to a lowered position in engagement with the glass sheet, means to evacuate the cups in the lowered position and means to accelerate the movement of the carriage from the home position, a glass scoring tool mounted on the carriage, means to move the glass scoring tool across the carriage in a direction normal to the direction of movement of the carriage to provide a score line on the sheet normal to the direction of travel of the sheet, means to snap the sheet along the score line during the movement of the sheet by the conveyor means, means to sense the position of the leading edge of the moving glass sheet, and means actuated by the sensing means to initiate the operation of the carriage-moving means and the operation of the tool-moving means.

8. The apparatus of claim 7 wherein the means to snap the sheet along the score line during the movement of the sheet includes a snapping head and a pair of moment heads mounted on the carriage, said snapping head and moment heads having surfaces opposing the glass sheet that are convexly curved about axes in parallel with the score line and being positioned with the snapping head having the highest portion of its convex surface directly below the score line at the margin of the sheet and the lowermost portion of the convexly curved snapping heads flanking the score line at said margin of the sheet when the vacuum cups engage the glass sheet, means to raise the snapping head, and means initiated by the movement of the tool-scoring means to operate the snapping-head-raising means.

9. The apparatus of claim 8 and further including motor means to move the sensing means in a rectilinear path parallel to the path of movement of the glass sheet.

10. The apparatus of claim 9 and further including means to move the snapping head and the pair of moment heads laterally between a position opposing the margin of the glass sheet and a position away from the path of travel of the glass sheet.

11. The apparatus of claim 10 and further including means to initiate operation of the motor means, means to stop operation of the motor means, means to indicate positions of the sensing means in its rectilinear path of movement, and means to indicate a predetermined position of the sensing means in its rectilinear path of movement, said means to stop operation of the motor means being responsive to a coincidence between the two indicating means.

12. An apparatus for glass cutting which comprises a supporting structure, a belt conveyor to move in a horizontal rectilinear path a glass sheet having a leading edge, said belt conveyor including a belt, pulleys and motor means to drive one of the pulleys whereby the belt moves about the pulleys, said pulleys being mounted on the supporting structure for rotation about horizontal axes and two of the pulleys being normally positioned to provide a horizontal top run for the belt, a conveyor to receive the glass sheet from the belt conveyor for the continuation of the movement of the glass sheet in the horizontal path, a carriage, a pair of rails to support the carriage, means to move the carriage from a home position in the direction of travel of the moving glass sheet at the velocity of the sheet, a glass scoring tool mounted on the carriage, means to move the glass scoring tool across the carriage to provide a score line on the sheet normal to the direction of travel of the sheet, means to raise one of the pulleys supporting the belt at the ends of its top run, said pulley to be raised being adjacent the receiving conveyor, means to sense the position of the leading edge of the moving glass sheet, and means actuated by the sensing means to initiate the operation of the carriage-moving means, the operation of the tool-moving means and the operation of the pulley-raising means.

13. The apparatus of claim 12 and further including means to lower the pulley adjacent the receiving conveyor, means to sense the movement of a rear edge of the moving glass sheet past a position on the belt and means actuated by the rear-edge-sensing means to initiate operation of the pulley-lowering means.

14. The apparatus of claim 13 and further including a snapping head and a pair of moment heads mounted on the carriage, said snapping head and moment heads having surfaces opposing the glass sheet that are convexly curved about axes in parallel with the score line and being positioned with the snapping head having the highest portion of its convex surface directly below the score line at the margin of the sheet and the lowermost portion of the convexly curved snapping heads flanking the score line at said margin of the sheet, means to raise the snapping head, and means initiated by the movement of the tool-scoring means to operate the snapping-head-raising means.

15. The apparatus of claim 14 and further including motor means to move the sensing means in a rectilinear path parallel to the path of movement of the glass sheet, means to initiate operation of the motor means, means to stop operation of the motor means, means to indicate positions of the sensing means in its rectilinear path of movement, and means to indicate a predetermined position of the sensing means in its rectilinear path of movement, said means to stop operation of the motor means being responsive to a coincidence between the two indicating means.

16. An apparatus for glass cutting which comprises conveyor means to move in a horizontal rectilinear path a glass sheet having a leading edge, a supporting structure, a bridge mounted on the supporting structure above the conveyor means, a carriage having a home position, a pair of rails to support the carriage, a horizontal shaft rotatably mounted on the bridge about an axis normal to the path of movement of the glass sheet, a cam fixed on the shaft, means to provide a single revolution of the shaft, a cam follower mounted on the carriage to engage the cam on the bridge with the carriage in the home position, vacuum cups mounted on the carriage above the conveyor means, means to move the vacuum cups from a raised position to a lowered position in engagement with the glass sheet, means to evacuate the cups in the lowered position, a glass scoring tool mounted on the carriage, means to move the glass scoring tool across the carriage to provide a score line on the sheet in a direction normal to the direction of travel of the sheet during the engagement of the cups with the glass sheet, means to snap the sheet along the score line during the movement of the sheet by the conveyor means, means to sense the position of the leading edge of the moving glass sheet, and means actuated by the sensing means to initiate the operation of the means to provide a single rotation of the shaft, the operation of the means to move the vacuum cups to the lowered position, the operation of the means to evacuate the cups and the operation of the tool-moving means.

17. The apparatus of claim 16 and further including motor means to move the sensing means in a rectilinear path parallel to the path of movement of the glass sheet, means to initiate operation of the motor means, means to stop operation of the motor means, means to indicate positions of the sensing means in its rectilinear path of movement, and means to indicate a predetermined position of the sensing means in its rectilinear path of movement, said means to stop operation of the motor means being responsive to a coincidence between the two indicating means.

References Cited in the file of this patent
UNITED STATES PATENTS

| | | |
|---|---|---|
| 1,973,723 | Owen | Sept. 8, 1934 |
| 2,309,191 | Helsel | Jan. 26, 1943 |
| 2,550,191 | Godat | Apr. 24, 1951 |
| 2,672,067 | Hansell | Mar. 16, 1954 |
| 2,710,934 | Senn | June 14, 1955 |
| 2,747,280 | Kurata | May 29, 1956 |
| 2,806,553 | Eames | Sept. 17, 1957 |
| 2,866,506 | Hierath et al. | Dec. 30, 1958 |
| 2,876,835 | Catalano et al. | Mar. 10, 1959 |
| 2,892,526 | Devand | June 30, 1959 |
| 2,932,365 | Hornung | Apr. 12, 1960 |
| 2,943,393 | Insolio | July 5, 1960 |
| 2,948,991 | Walters et al. | Aug. 16, 1960 |
| 3,027,646 | Brichard et al. | Apr. 3, 1962 |